United States Patent [19]
Katayama et al.

[11] Patent Number: 5,715,105
[45] Date of Patent: Feb. 3, 1998

[54] METHOD OF AND APPARATUS FOR RECORDING ON AND REPRODUCING FROM DISK-TYPE RECORDING MEDIUM HAVING RECORDING TRACKS WITH SECTORS EACH HAVING AN ID AREA AND A DATA AREA

[75] Inventors: Yukari Katayama; Hitoshi Ogawa, both of Yokohama; Motoyasu Tsunoda, Fujisawa; Tsuneo Hirose; Akira Kojima, both of Odawara; Eisaku Saiki; Yasunori Kaneda, both of Yokohama; Katsuhiro Tsuneta, Odawara; Shoichi Miyazawa, Yokohama; Terumi Takashi, Odawara, all of Japan

[73] Assignee: Hitachi, Ltd., Tokyo, Japan

[21] Appl. No.: 128,072

[22] Filed: Sep. 28, 1993

[30] Foreign Application Priority Data

Sep. 28, 1992 [JP] Japan ................. 4-257781
Feb. 1, 1993 [JP] Japan ................. 5-014781
May 20, 1993 [JP] Japan ................. 5-118593

[51] Int. Cl.⁶ .............................. G11B 5/09
[52] U.S. Cl. .............................. 360/48; 360/53
[58] Field of Search ........................ 360/48, 53

[56] References Cited

FOREIGN PATENT DOCUMENTS

A-63-86160   4/1988  Japan.
A-63-142513  6/1988  Japan.
A-63-308772  12/1988 Japan.
3-160675     7/1991  Japan.
3-254953     10/1991 Japan.

OTHER PUBLICATIONS

Nikkei Electronics, Sep. 30, 1991, pp. 77-106.

Primary Examiner—Aristotelis M. Psitos
Assistant Examiner—Alan Faber
Attorney, Agent, or Firm—Antonelli, Terry, Stout, & Kraus, LLP

[57] ABSTRACT

A magnetic disk recording and reproducing apparatus including a unit for inserting an error correcting code relating to control information in the control information, the control information relating to data, a recording control unit for recording the control information and the data in a recording area of a magnetic disk, the recording area having a plurality of sectors, each of the sectors having an ID area for recording the control information and a data area for recording the data, the data area corresponding to the ID area and being provided adjacent to and behind the ID area in the same sector as the ID area, and an error correcting unit for correcting errors in the control information in the ID area using the error correcting code before the data in the data area corresponding to the ID area and provided in the same sector as the ID area is read or recorded.

22 Claims, 37 Drawing Sheets

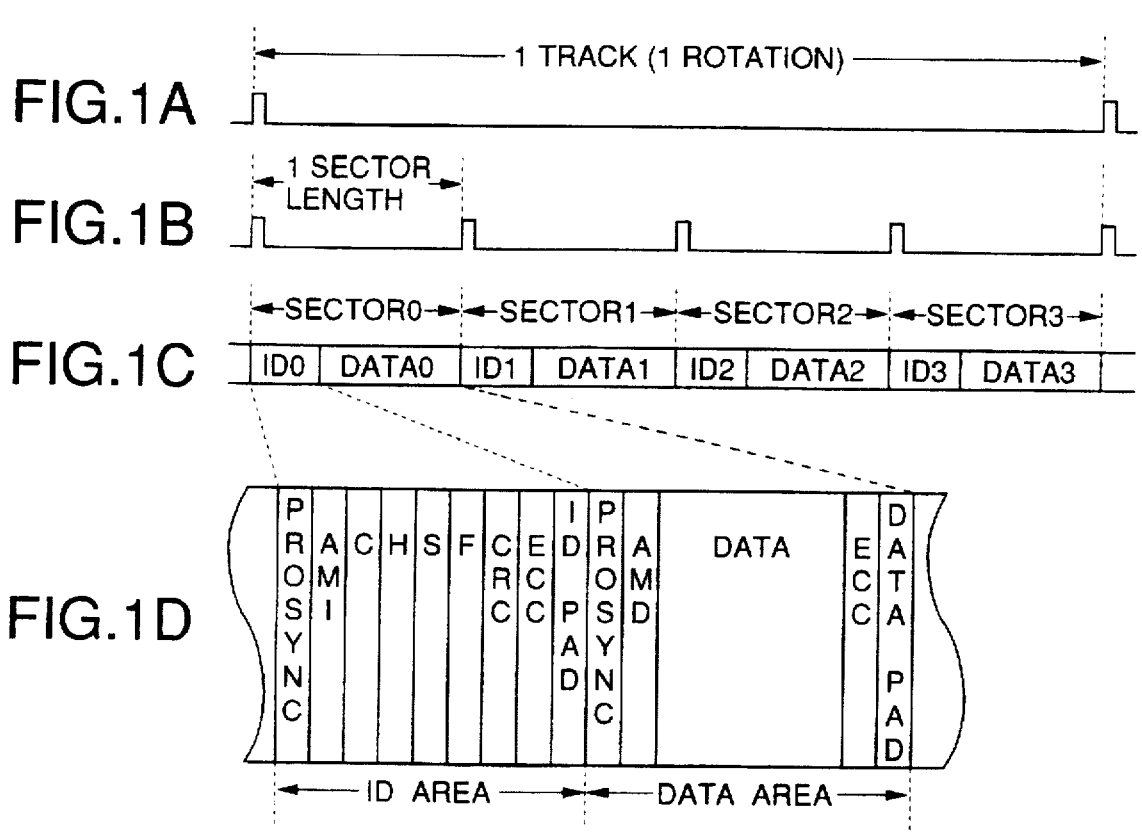

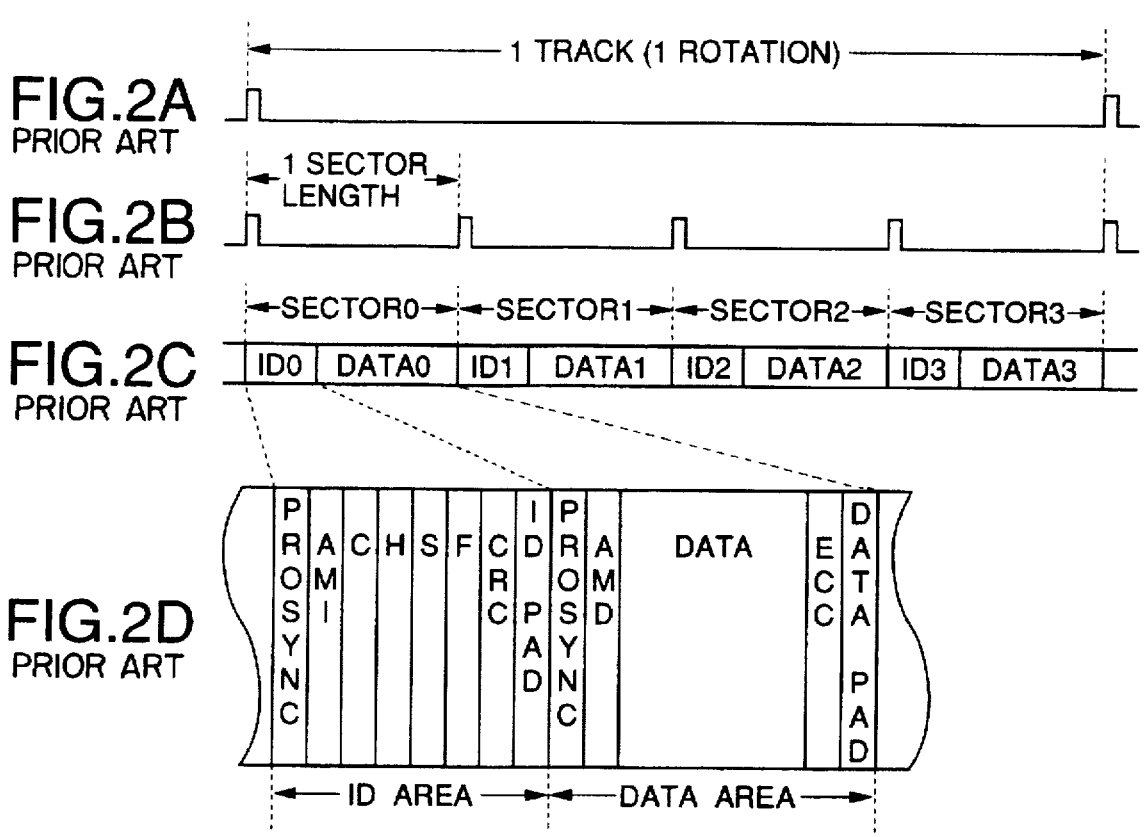

FIG. 3A PRIOR ART
FIG. 3B PRIOR ART
FIG. 3C PRIOR ART
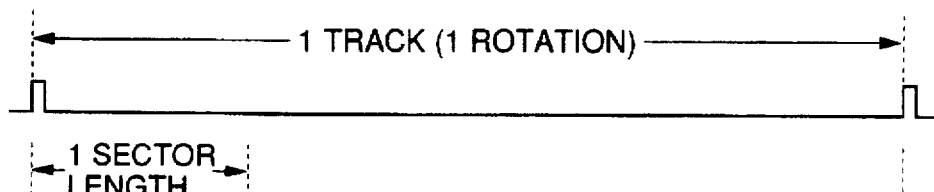
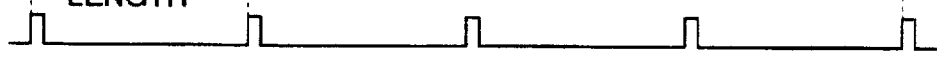
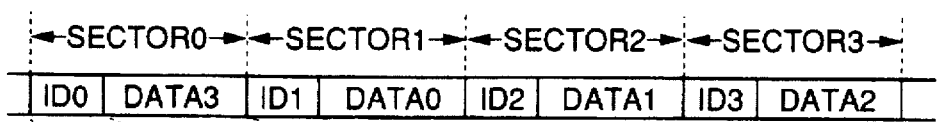
FIG. 3D PRIOR ART
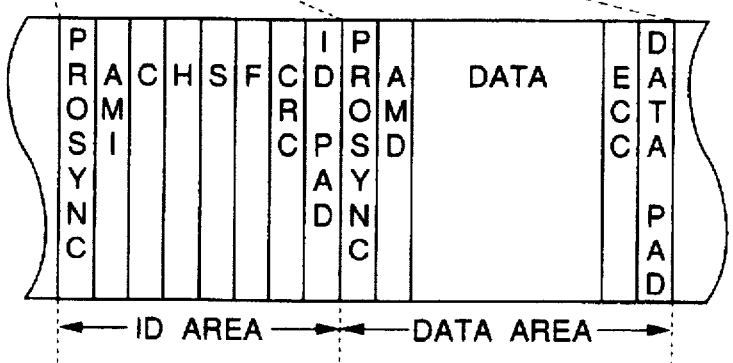

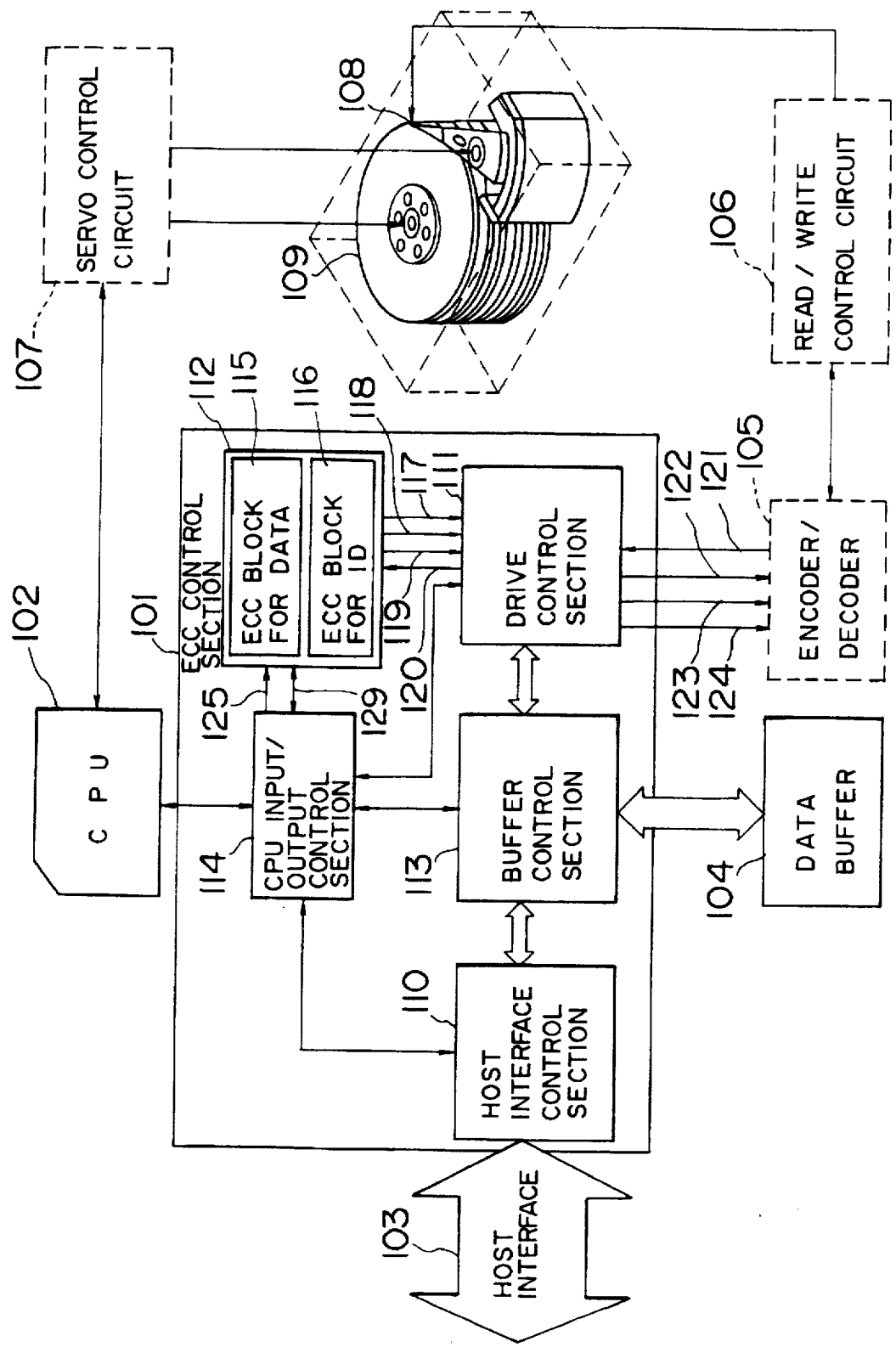

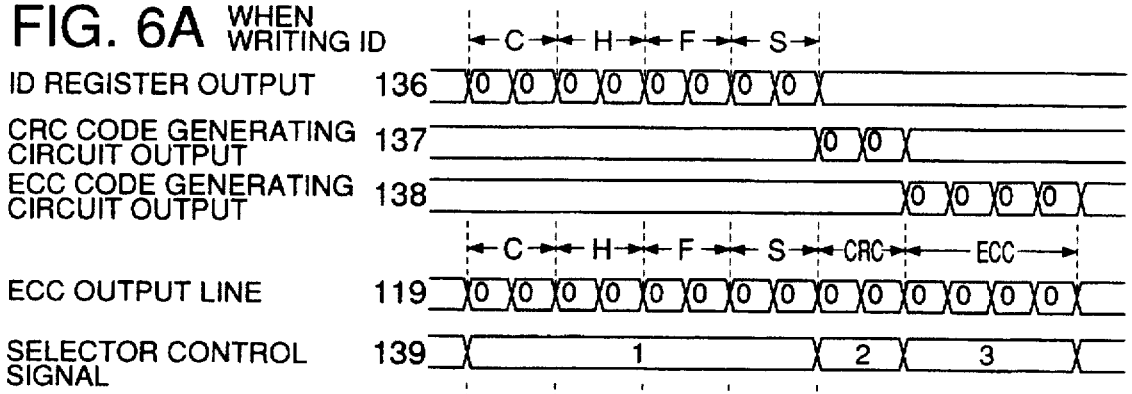
FIG. 6A WHEN WRITING ID
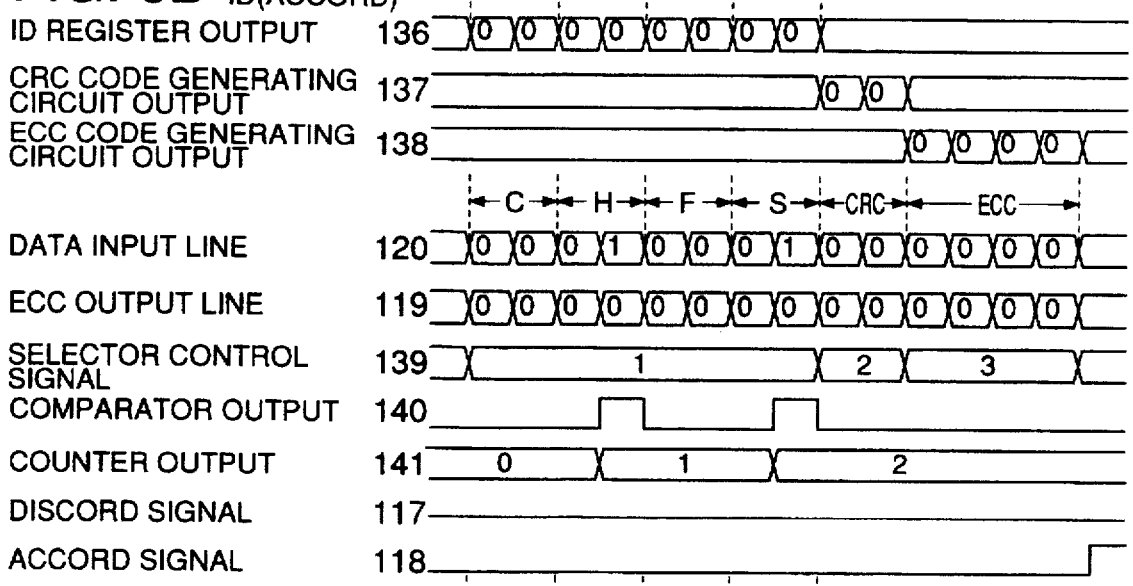
FIG. 6B WHEN READING ID(ACCORD)
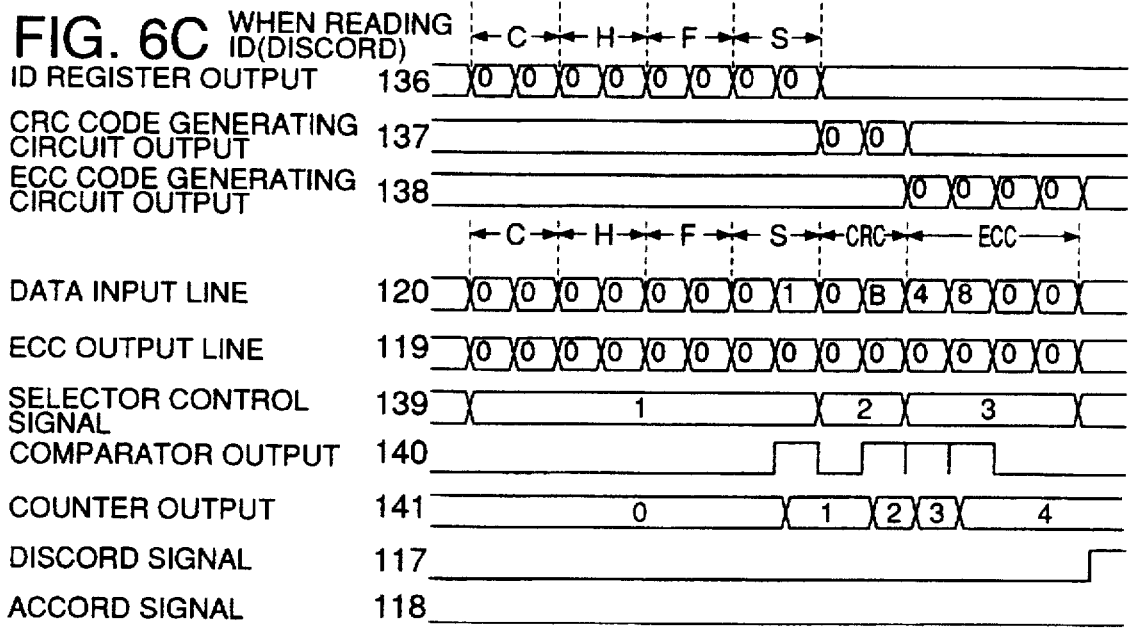
FIG. 6C WHEN READING ID(DISCORD)

FIG. 7

ID AREA EXAMPLE 1: | PROSYNC | AMI | C | H | S | CRC1 | ECC1 | F | CRC2 | ECC2 | ID PAD |

ID AREA EXAMPLE 2: | PROSYNC | AMI | C | H | S | F | CRC | ECC1 | ECC2 | ID PAD |

ID AREA EXAMPLE 3: | PROSYNC | AMI | C | H | S | CRC | ECC1 | F | ECC2 | ID PAD |

ID AREA EXAMPLE 4: | PROSYNC | AMI | C | H | S | ECC1 | F | ECC2 | CRC | ID PAD |

ID AREA EXAMPLE 5: | PROSYNC | AMI | C | H | S | F | ECC | CRC | ID PAD |

(a) (b) (c) (d)

3001 ··· SERVO SIGNAL DIVISION
3002 ··· ID DIVISION
3002-1 ··· ID DIVISION FOR REPRODUCTION
3002-2 ··· ID DIVISION FOR RECORDING
3003 ··· DATA DIVISION
3004 ··· REPRODUCING HEAD (R)
3005 ··· RECORDING HEAD (W)

3001 ⋯ SERVO SIGNAL DIVISION
3002 ⋯ ID DIVISION
3002-1 ⋯ ID DIVISION FOR REPRODUCTION
3002-2 ⋯ ID DIVISION FOR RECORDING
3003 ⋯ DATA DIVISION
3004 ⋯ REPRODUCING HEAD (R)
3005 ⋯ RECORDING HEAD (W)
3014 ⋯ ID WRITE LINE FOR RECORDING
3015 ⋯ ID WRITE LINE FOR REPRODUCTION

3001 ⋯ SERVO SIGNAL DIVISION
3002 ⋯ ID DIVISION
3002-1 ⋯ ID DIVISION FOR REPRODUCTION
3002-2 ⋯ ID DIVISION FOR RECORDING
3003 ⋯ DATA DIVISION
3004 ⋯ REPRODUCING HEAD (R)
3005 ⋯ RECORDING HEAD (W)
3014 ⋯ ID WRITE LINE FOR RECORDING
3015 ⋯ ID WRITE LINE FOR REPRODUCTION

FIG.30A TRACK

FIG.30B SECTOR FORMAT

FIG.30C SERVO AREA

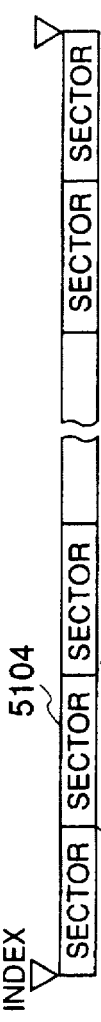
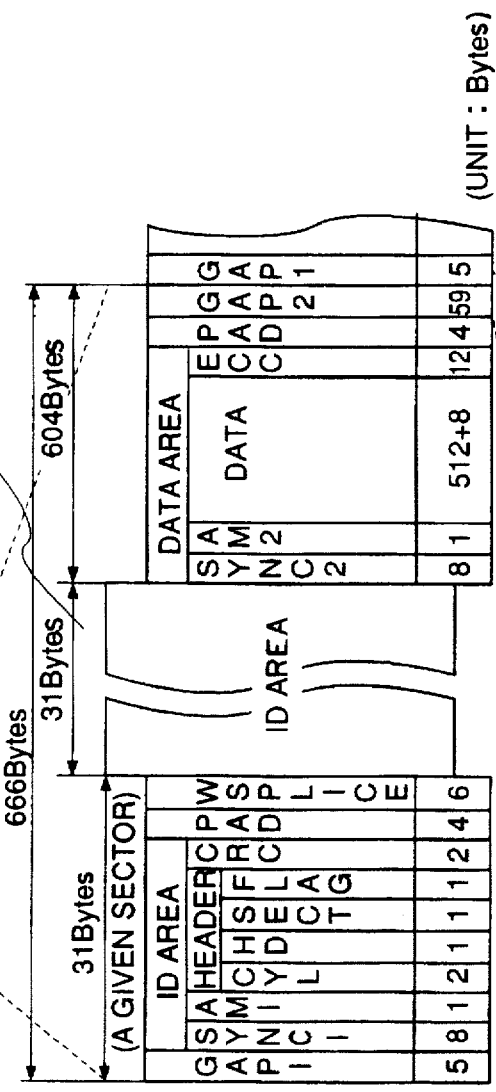
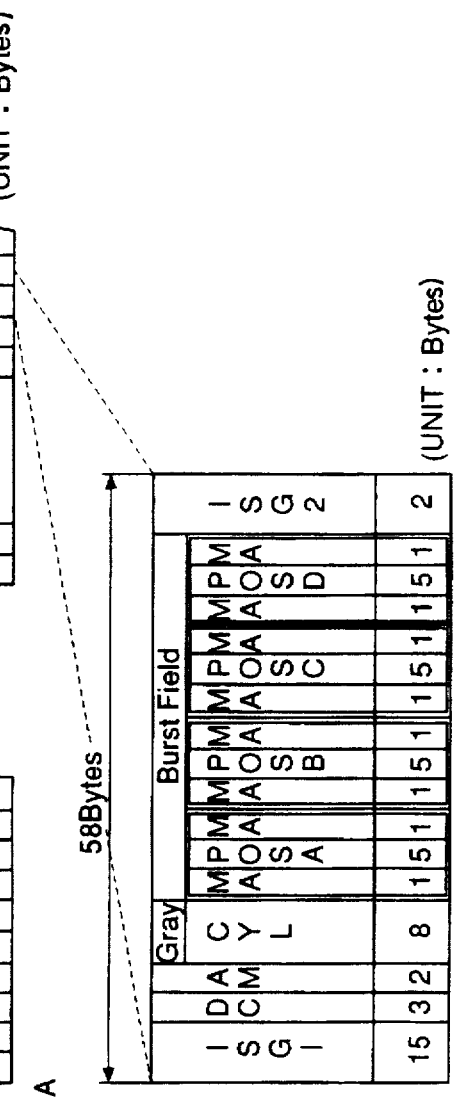
FIG.34A  TRACK
FIG.34B  SECTOR FORMAT
FIG.34C  SERVO AREA

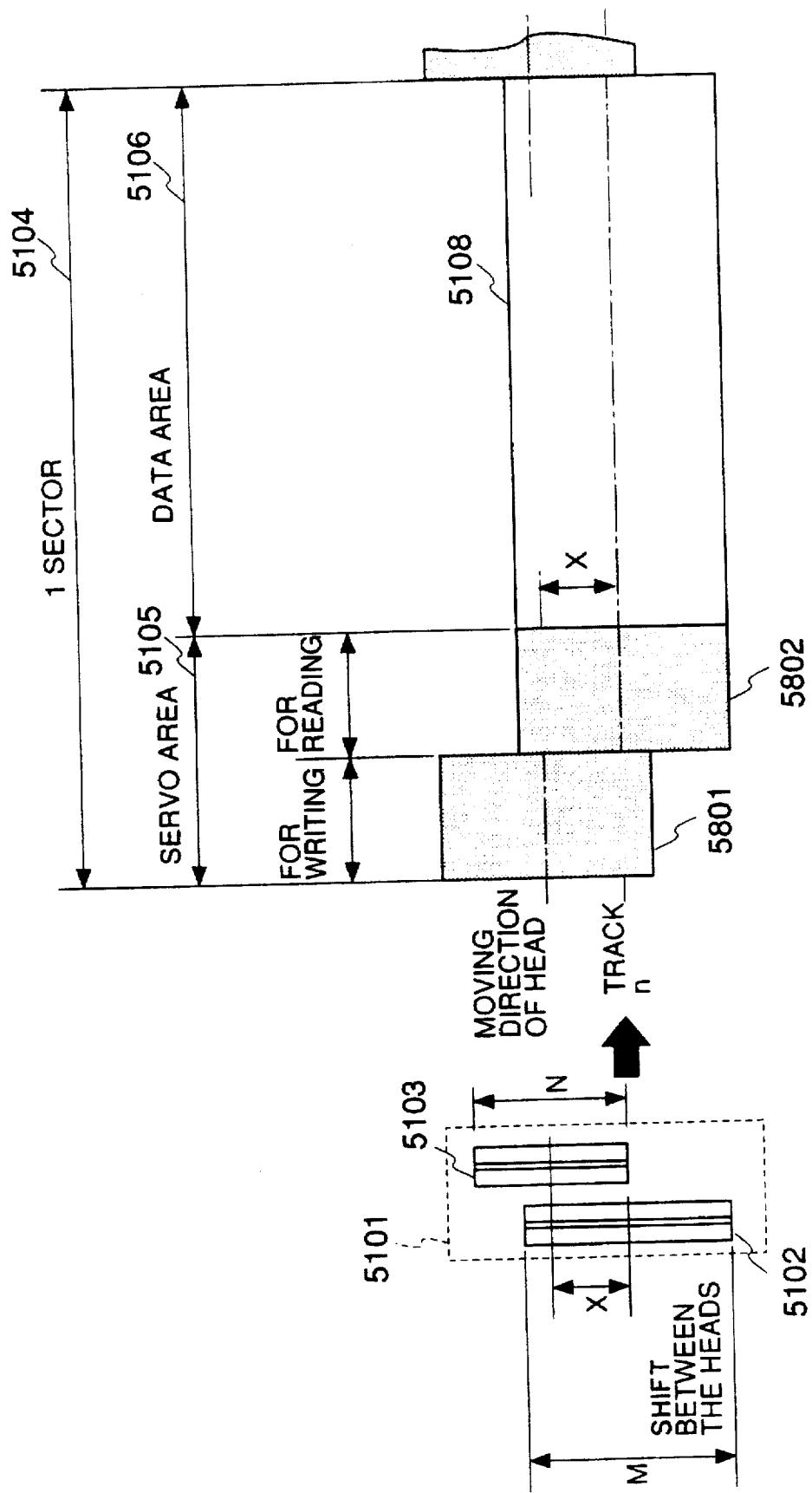

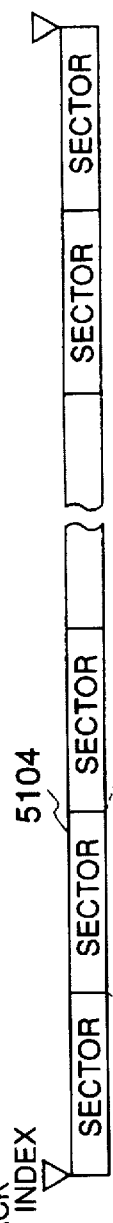
FIG.39A TRACK INDEX
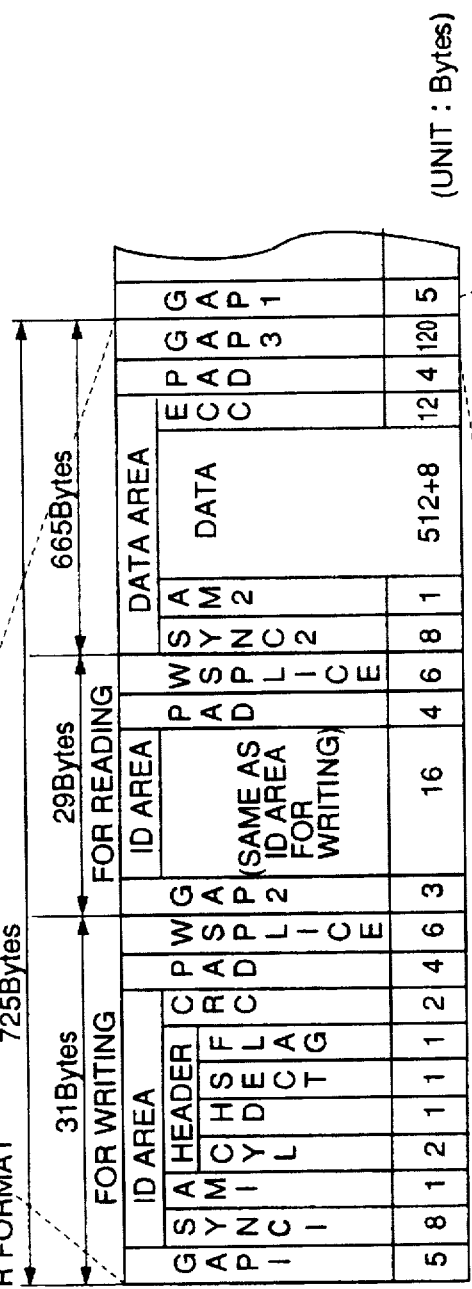
FIG.39B SECTOR FORMAT
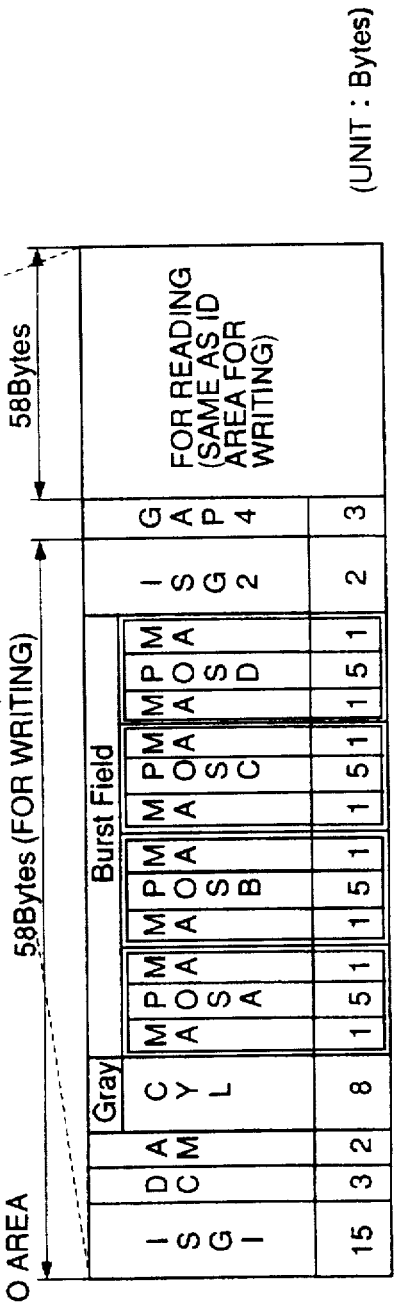
FIG.39C SERVO AREA

METHOD OF AND APPARATUS FOR RECORDING ON AND REPRODUCING FROM DISK-TYPE RECORDING MEDIUM HAVING RECORDING TRACKS WITH SECTORS EACH HAVING AN ID AREA AND A DATA AREA

BACKGROUND OF THE INVENTION

This invention relates to a method and an apparatus for recording on and reproducing from a magnetic disk having its recording area divided into a plurality of sectors, each sector including an ID area and a data area, and more particularly to a method for recording on or reproducing from a magnetic disk, which method contributes to increasing the access speed.

This invention relates to a magnetic recording and reproducing apparatus for recording on a magnetic disk having a plurality of divided recording areas, each divided recording area including an identification area and a data area, and more particularly to a magnetic recording and reproducing apparatus, a control circuit for the magnetic recording and reproducing apparatus and a magnetic recording and reproducing method, which are most suitable for magnetic recording and reproduction with a dual head (hereafter referred to the dual head) combining a reproducing head, such as an MR (magnetoresistive) head and a recording head.

The bit error rate of data transferred from a magnetic disk unit to a computer is generally desired to be 1.0E–14 or less. However, it is virtually impossible to keep the bit error rate of data read from the magnetic disk at a level of this order. Therefore, normally, redundant bits for error check or error correction are added to recorded data, and a magnetic disk controller (hereafter referred to as the controller), provided between the magnetic disk unit and the computer, is used to detect or correct errors of data which is read by the controller so as to limit the bit error rate of data from the controller to the computer to 1.0E–14 or less even when the tolerance limit for the bit error rate of data from the magnetic disk unit is about 1.0E–9. Incidentally, in view of the error correction capability of the controller, it is possible to tolerate an increased bit error rate of data read by the controller. If more errors can be tolerated, in accordance with the difference between the current bit error rate and the increased bit error rate, for example from the current 1.0E–9 to 1.0E–6, in compliance with an increase in the so-called window margin, the recording density, or the recording capacity of the magnetic disk, can be increased. However, as the bit error rate is increased, the number of times error bits must be corrected also increases. If the correction process time for one error is long, a large overhead for the error correction process causes the performance of the apparatus to deteriorate. Heretofore, there has been a problem that correcting errors takes time for the reason described below, and as a result, the bit error rate of data read from the magnetic disk into the controller cannot be improved after all. Specifically, the magnetic disk is normally divided into a plurality of sectors for a more effective access. FIGS. 2A to 2D show a recording format for each of the sectors 0, 1, 2, . . . The sectors 0, 1, 2, . . . are divided into the ID areas ID0, ID1, ID2, . . . and the data areas DATA0, DATA1, DATA2, . . . The ID areas ID0, ID1, ID2, . . . are each divided into information PROSYNC for phase synchronization of a PLL (phase lock loop), AMI indicating the leading end of the ID area, C for a cylinder number of data, H for a head number of data, S for a sector number of data, CRC for checking whether or not an error has occurred, and ID PAD indicating a border between the ID area and the data area. Recording or reproduction of the recording format on a data area of the magnetic disk is executed after information of the ID area of the same sector is verified. Error detection of the ID information is performed by comparing an error check code generated by using the ID information which has been read and the error check code CRC recorded in advance. This error detection can be done at high speed, but if an error is detected, data has to be read again (by retry), for which a waiting time corresponding to one rotation of the disk is required. In order to solve this problem, it has been proposed to correct errors in the information of the ID area by adding an error correcting code to the ID area as disclosed in JP-A-63-86160 (Prior Art 1). However, the conventional method for error correction takes time. Unless the error correction of the ID area is finished by the time data is written in the data area specified by the ID, a disk rotational delay occurs. To avoid this problem, there has been proposed a method for placing the corresponding ID areas and data areas in different sectors instead of placing them in the same sectors to thereby secure time for correcting errors, as shown in FIGS. 3A to 3D.

In the past, magnetic heads, such as the inductive head or the MIG (Metal In Gap) head capable of both reading and writing, were used to read data from or write onto the magnetic disk unit.

Recently, dual heads, containing a magnetic head for writing (inductive, MIG, etc.) and a magnetic head for reading, have been used. In addition, an MR (magnetoresistive) head, which is not dependent on the rotating speed of the disk and which is compatible with small disks, has began to be used as the magnetic head for reading.

The dual head as described has a problem that because it is generally manufactured in a monolithic body including the writing head and the reading head, a discordance occurs invariably between the core centers of the two heads in the manufacturing process.

According to a technique revealed in JP-A-3-160675, in the magnetic disk unit using a dual head, servo information is provided separately for writing and reading in areas on the magnetic disk which are shifted with respect to each other by the distance of a radial shift between the reading head and the writing head, and with this head configuration, data can be written into the data area without moving the magnetic head. (See FIG. 38.)

Though not disclosed in the above-mentioned patent publication, the format pattern that the inventors presumed from the description of the patent publication is shown in FIGS. 39A to 39C. Description will now be made of WSPLICE in FIG. 39B. When writing data, it is confirmed by reading information in the ID area whether or not a target sector has been accessed by reading information of the ID area, and the magnetic head unit writes data in the next area. It is necessary to gain time from this reading until the electronic circuit for writing becomes ready for operation. The area provided for gaining this time is WSPLICE.

SUMMARY OF THE INVENTION

An object of the present invention is to provide a high-speed error correction method wherein correction of an error in the ID area can be finished by the time data is written in the data area specified by the ID information provided physically in the same sector, and the corresponding ID area and data area can be placed in the same sector.

A second object of the present invention is to provide a magnetic recording and reproducing apparatus which uses a dual head and finishes error correction of the identification information by the time of starting writing data into the data area corresponding to the identification information placed in the same recording area.

A third object of the present invention is to provide a magnetic recording and reproducing apparatus which uses a dual head, decodes coded data using a technique such as maximum likelihood decoding, and which is free from a decrease in formatting efficiency.

A fourth object of the present invention is to provide a large-capacity small-size disk-type recording and reproducing apparatus which uses a dual head.

A fifth object of the present invention is to provide a disk-type recording and reproducing apparatus which uses a dual head and which is capable of high-speed formatting.

The above-mentioned object of the present invention (hereafter referred to as the first object) will be described.

The above-mentioned prior art has a problem that since the ID area and the corresponding data area are not disposed in the same sector but are disposed in physically different sectors, the control operation of the controller is complicated and malfunctioning is liable to occur.

In order to achieve the above-mentioned first object, a first means is provided to finish error correction in the ID area before data is read from or written into the data area corresponding to the ID area. More specifically, there is provided means whereby when an expected value of the ID of the sector where information is to be read or written, added to an expected value of an error correcting code calculated from the expected value of the ID, is compared with a value actually read from the magnetic disk, if the discordant quantity of data exceeds the correctable quantity of data, the expected value of the ID and the read-out value are regarded as discordant.

Further, to achieve the first object, a second means is provided to finish the error correction of the ID area before data is read from or written into the data area corresponding to the ID area. To be more specific, when an expected value of the ID in the sector where information is to be read or written, added to an expected value of an error correcting code calculated from the expected value of the ID, is compared with a value actually read from the magnetic disk, if a discordant quantity of data does not exceed a correctable quantity of data, the expected value of the ID and the read-out value are regarded as accordant.

Further, to achieve the first object, there is provided a third means to finish the error correction of the ID area before data is read from or written into the data area corresponding to the ID area. To be more specific, an error correcting code in the ID area is formed by being interleaved with a Hamming code, for example, which is instantly correctable and relatively short and simple.

Further, to achieve the first object, as a fourth means, the error correcting code in the ID area is arranged to have the same value as in the ID area.

In the first means, when an expected value of the ID of the sector where information is to be read or written, added to an expected value of the error correcting code calculated from the expected value of the ID, is compared with a value actually read from the magnetic disk, if a discordant quantity of data exceeds a correctable quantity t of data, the expected value of the ID and the read-out value are regarded as discordant. According to coding theory, a t symbol error correcting code should have the minimum Hamming distance of 2t+1 or more, and the distance from one code to another should be 2t+1 symbols or more. Therefore, data which, after being corrected, can accord with a code including the expected value of the ID and the expected value of the error correcting code is never corrected erroneously to other data and regarded as discordant data. In addition, an accord/discord decision can be made taking into account a result of correction when the last data is read, and therefore, even if a data area corresponding to an ID area is placed just behind the ID area, data can be read from or written in the data area corresponding to the ID area after the value in the ID area has been corrected by ECC.

In the second means, when an expected value of the ID in a sector where information is to be read or written, added to an expected value of the error correcting code calculated from the expected value of the ID, is compared with a value actually read from the magnetic disk, if a discordant quantity of data does not exceed a correctable quantity of data, the value of the ID and the read value are regarded as accordant. According to coding theory, a t symbol error correcting code should have the minimum Hamming distance of 2t+1 or more, and the distance from one code to another should be 2t+1 symbols or more. Therefore, data which, after being corrected, can accord with a code including the expected value of the ID and the expected value of the error correcting code is never corrected erroneously to other data and regarded as discordant data. In addition, an accord/discord decision can be made taking into account a result of correction when the last data has been read, and therefore, even if a data area corresponding to an ID area is placed just behind the ID area, data can be read from or written in the data area corresponding to the ID area after the value in the ID area has been corrected by ECC.

In the third means, an error correcting code of the ID area is formed by being interleaved with a Hamming code, for example, which is instantly correctable. Since an accord/discord decision can be made taking into account a result of correction when the last data has been read, even if a data area corresponding to an ID area is placed just behind the ID area, data can be read from or written in the data area corresponding to the ID area after the value in the ID area has been corrected by ECC.

In the fourth means, an arrangement is made so that the error correcting code of the ID area has the same value as the value of the ID area, and that when either one or both of the IDs agrees with the value read from the magnetic disk, a decision is made that the two compared values are regarded as accordant. Even if one of the IDs cannot be read in a normal manner, an accord/discord decision is made when the last data is read. Therefore, even if a data area corresponding to the ID area is placed just behind the ID area, data can be read from or written in the data area corresponding to the ID area.

According to the present invention, even when a data area corresponding to the ID area is placed just behind the ID area, data can be read from or written in the data area corresponding to the ID area by finishing an error correction of the ID area by ECC without a rotational delay, so that even with a system of a high bit error rate, a read/write operation can be conducted on the data area without increasing the access time and furthermore, the control operation by the controller does not become complicated.

The second and third objects of the present invention will be described. A technique which uses a dual head is disclosed in Japanese Patent Application No. 3-254953, the contents of which will be described with reference to FIG. 16.

FIG. 16 is a schematic diagram showing a track format. The ID division 3002 in FIG. 16 corresponds to the ID area mentioned above. As shown in FIG. 16, an ID division 3002 includes two ID divisions 3002-1 and 3002-2, in which the same contents are written as in the conventional magnetic disk. The two ID divisions 3002-1 and 3002-2 are shifted with respect to each other by the shift ($\delta$) between the recording head 3005 and the reproducing head 3004. At track No. N, by using a servo signal division 3001 set before the ID division 3002 (at this time, the center line of the servo signal division is assumed to coincide with the center line of the recording head), the recording head 3005 is positioned to the center line of writing (the center line of a data division 3003), and under this condition, the ID division for recording 3002-2 is reproduced (read) by the reproducing head 3004 and data is written in the data division 3003 by the recording head 3005. At track No. N+1, by using the servo signal division, the reproducing head 3004 is positioned to the center line of reading (the center line of the ID division for reproduction and the data division). In this case, the ID division for reproduction 3002-1 and the data division 3003 are reproduced by the reproducing head 3004. In the manner described, by selectively using the two ID divisions 3002-1 and 3002-2, even if the positions of the heads are changed between the recording and reproducing operations, the ID divisions can be detected without any positional shift at all times.

As mentioned in the description of the prior art, it has been proposed to add an error correcting code (ECC) to the ID area to correct errors in information in the ID area. However, in the prior art, the ID area and the corresponding data area are not placed in the same sector but are placed in physically different sectors, which results in problems that the control operation of the controller is complicated and malfunctioning is liable to occur.

Also in the technique described in Japanese Patent Application No. 3-254953, unless error correction of the ID division for recording is finished by the time data starts to be written into the data division corresponding to the ID division for recording, the recording head will pass the leading end of the data division, so that it becomes necessary to wait for the head to complete one rotation, thus producing a rotational delay time. For this reason, a gap needs to be provided just behind the ID division for recording.

The foregoing process takes place after the signal read by the head has been decoded to reproduce a digital value. With regard to decoding, as described in Nikkei Electronics, Sep. 30, 1991 (No. 537), pp. 77–106, it has been proposed to combine an MR head, which is a read-only head, and maximum likelihood decoding (Viterbi decoding) in order to improve the reliability of data. However, a problem with this technique is that the maximum likelihood decoding (Viterbi decoding) requires a long decoding time, and therefore, the data area cannot be placed just behind the ID area, with the result that the formatting efficiency deteriorates.

The second and third objects of the present invention are to solve the above-mentioned problems.

In order to achieve the second and third objects of the present invention, there is provided a magnetic recording and reproducing apparatus for magnetically recording and reproducing on a magnetic disk with a dual head including separate recording and reproducing heads, wherein the recording area on the magnetic disk is divided into a plurality of recording areas, each divided recording area including an identification area having recorded therein information for identifying the divided recording area, wherein the identification area is further divided into an identification area for recording, used when recording, and an identification area for reproduction, used when reproducing, wherein there is provided read-out means for reading identification information from the identification area for recording when recording and reading identification information from the identification area for reproduction when reproducing, and wherein in the same divided recording area, an identification area for reproduction is placed between an identification area for recording and a data area.

Further, the identification area for reproduction includes an error correcting code, and the magnetic recording and reproducing apparatus comprises identification information memory means for storing identification information supplied from outside to specify a data area from which data is to be reproduced; data memory means for processing on a first-in first-out basis reproduced data from a magnetic disk; a data buffer for storing data output from the data memory means; error correcting means for correcting errors in the identification information for reproduction read from the magnetic disk by using the error correcting code, and outputting a "not correctable" signal when error correction is impossible; and data transfer control means for transferring data stored in the data memory means to the data buffer when the error-corrected identification information for reproduction accords with the identification information supplied from outside, and not transferring data to the data buffer when the error-corrected identification information for reproduction does not accord with the identification information supplied from outside or when a "not correctable" signal is output from the error correcting means.

Further, the identification area for reproduction includes an error correcting code, and the magnetic recording and reproducing apparatus comprises identification information memory means for storing identification information supplied from outside to specify a data area from which data is to be reproduced; a data buffer for storing reproduced data read from the magnetic disk; error correcting means for correcting errors in the identification information for reproduction read from the magnetic disk by using the error correcting code, and outputting a "not correctable" signal when error correction is impossible; and data invalidating means for invalidating the data transferred to the data buffer when the error-corrected identification information for reproduction does not accord with the identification information for reproduction supplied from outside or when a "not correctable" signal is output from the error correcting means.

Further, decoding the identification information for recording is conducted while the magnetic head passes the identification area for reproduction and is finished before data is to be written into the data area corresponding to the identification area for recording.

Further, the identification information for reproduction and data are recorded respectively in the identification area for reproduction and the data area without having intervene between those areas at least any one of a data area indicating a border between the identification area for reproduction and the data area, a gap area between the identification area for reproduction and the data area, a synchronization pattern area, and an area indicating a leading end of the data area.

Further, formatting means is provided by which when formatting, identification information for recording is written during a first rotation, then the written identification information for recording is reproduced during a second rotation, and if the information has been written correctly, during the same second rotation, identification information for reproduction is written just behind the identification information for recording.

In the present invention, an error correcting code is added to identification information for recording, the identification area for recording is placed ahead of the identification area for reproduction, and after the identification information for recording is read, while the magnetic head passes the identification area for reproduction, error detection and correction of the identification information for recording are finished, and therefore, after errors of the identification area for recording have been corrected, data can be written in the data area corresponding to the identification area for recording. If error correction of the identification information for recording fails, or if the identification information for recording that has been read differs from what is expected, writing of data is terminated, so that data is prevented from being written into a wrong sector.

After the identification information for reproduction has been read, error detection and correction of the identification information for reproduction is conducted, and data which has been read during the error detection and correction of the identification information for reproduction is stored in a FIFO (first-in first-out) unit (data memory means for processing on a first-in first-out basis), and after the error correction is finished if the identification information is determined to be identification information of the object sector, the data in the FIFO unit is transferred to the data buffer for storing data to be sent to a host computer, or if error correction is impossible or the error-corrected identification information is determined not to be identification information of the object sector, the data in the FIFO unit is invalidated, so that the data area corresponding to the above-mentioned identification area can be read, and wrong data is not transferred to the host computer.

Further, after the identification information for reproduction has been read, error detection and correction of the identification information for reproduction is conducted, and data which has been read during the error detection and correction of the identification information for reproduction is sent to the data buffer. When error correction is impossible or the error-corrected identification information is determined not to be identification information of the object sector, the data in the data buffer is invalidated, so that the data area corresponding to the above-mentioned identification area can be read, and wrong data is not transferred to the host computer.

Further, in the present invention, since the identification area for recording is placed ahead of the identification area for reproduction, after the identification information for recording is read, Viterbi decoding of the identification information for recording can be executed and finished while the magnetic head passes the identification area for reproduction, and it is not necessary to provide an invalid area to provide time for Viterbi decoding and error correction between the identification area for recording and the data area, with the result that the formatting efficiency is improved.

Further, an identification area for reproduction and a data area are successively placed after a gap and a synchronization pattern area, so that the gap, the synchronization pattern area, etc., which are conventionally provided between an identification area and a data area can be omitted, and the decrease of the formatting efficiency attributable to the use of two identification areas can be reduced.

Further, when formatting, identification information for recording is written during a first rotation, the identification information for recording is read during a second rotation, and after the identification information is compared with its expected value and if its accuracy is verified, identification information for reproduction is written during the same second rotation. For this reason, in the same manner as in the conventional formatting method, in the second rotation, only the identification information for recording is checked, so that formatting can be completed with a smaller number of rotations than the method in which the identification information for reproduction is written during a third rotation after the second rotation.

According to an aspect of the present invention, in a magnetic disk apparatus which uses a dual magnetic head and changes the position of the magnetic head for recording and reproducing operations, and under a system of separately providing identification information for recording and identification information for reproduction, designed not to deteriorate the accuracy of detecting an address division when positioning the magnetic head for recording or reproduction, respective ECC codes are added to the identification information for recording and the identification information for reproduction and an identification area for recording is placed ahead of an identification area for reproduction, and therefore, a little leeway is provided for error correction between the recording identification area and the data area, and when writing data, after errors of the identification area for recording are corrected by ECC, data can be written in the data area placed physically in the same sector without deteriorating the formatting efficiency. It ought to be noted that even in the case where an error correcting code is not added, an effect is obtained that the formatting efficiency is high because no gap is required after the recording identification area.

According to another aspect of the present invention, while errors of the identification area for reproduction are being corrected by ECC, data is stored in the FIFO unit, and after the correction by ECC is finished, and if the identification area for reproduction accords with an object identification information, data is transferred from the FIFO unit to the data buffer, and if the identification area for reproduction does not accord with the object identification information, the data in the FIFO unit is invalidated, and therefore, when reading data, after errors of the identification area for reproduction have been corrected by ECC, since no invalid area needs to be provided to gain time, data can be read from the data area placed physically in the same sector without reducing the formatting efficiency.

Further, according to yet another aspect of the present invention, since the identification area for recording is placed physically ahead of the identification area for reproduction, time can be provided for maximum likelihood decoding (e.g., Viterbi decoding) and a digital filter process between the recording identification area and the data area, when writing data, after the maximum likelihood decoding of the identification area for recording and the digital filter process are conducted, data can be written in the data area placed in the same sector without reducing the formatting efficiency.

According to a still further aspect of the present invention, since the identification area for recording is placed physically ahead of the identification area for reproduction, before an identification area for reproduction is to be recorded during formatting, the identification area for recording is read and the identification information for recording is compared with an expected value and its accuracy is checked, and then identification information for reproduction can be recorded during the same rotation, with the result that the formatting time can be reduced and the reliability of the identification areas can be enhanced.

The fourth and fifth objects of the present invention will now be described.

According to a technique revealed in JP-A-3-160675, there is a problem in decreasing the size and increasing the capacity of a magnetic disk unit because it is necessary to provide twice as much servo information and ID information as in the case where a single head is used both for reading and writing.

Since there exists twice as much servo information, an expensive servo writer used for formatting the magnetic disk has to be occupied for a long period of time. Because the formatting process using such a servo writer continues for a long time, the production cost of the magnetic disk unit increases and it is difficult to provide a less expensive disk unit, which has been a problem.

The fourth and fifth objects of the present invention are to solve this problem.

In order to achieve the above object, according to the present invention, there is provided a disk type recording and reproducing apparatus comprising a disk type recording medium, and a dual head including a reading head for reading from the disk type recording medium and a writing head for writing on the disk type recording medium, wherein the disk recording medium has a plurality of recording tracks, each track having a plurality of sectors, wherein each of the sectors has a data division and an ID division provided ahead of the data division disposed in the circumferential direction of the disk type recording medium, wherein the ID division has recorded therein identification information of the sector, wherein the ID divisions are provided in positions shifted with respect to each other in the radial direction of the disk type recording medium by a shift between the core centers of the reading head and the writing head, and wherein the data division having identification information of the sector stored therein is placed in a position ahead of data to be recorded and reproduced.

According to an embodiment of the disk type recording and reproducing apparatus, by providing only a servo area for reading, a greater portion of the memory area of the disk type recording and reproducing apparatus can be utilized to store user data. In this case, to read data, the dual head has only to be controlled such that the reading head is positioned to the center of the track. To write data, it is only necessary to realize control such that the reading and the writing heads of the dual head are offset-positioned by the shift between the two heads with the reading head positioned to the center of the track. Meanwhile, if head positioning is done in a range where linearity of a position signal cannot be maintained, the accuracy with which the magnetic head is positioned to a target position deteriorates, and the track density cannot be increased. So, considering the linearity of the position signal, both the write ID area and the read ID area may be positioned offset with respect to the position signal.

According to this embodiment, both ID areas for writing and reading are provided, but, since ID information for reading is recorded in the data area, in contrast to the case where an ID division for reading is provided independently of the data area, the SYNC area, etc., required to read the ID information for reading can be eliminated, so that the storage space for user data is increased.

In this embodiment, the ID divisions need to be recorded on the recording medium by being shifted with respect to each other accurately by the shift between the core centers of the reading and writing heads, and under this condition, offset positioning of the heads is performed. When writing servo data, if a laser length measuring system is used to record the ID divisions, the ID divisions can be recorded in accurate positions and the heads can be offset-positioned to the accurate positions. Also in this case, if the area for ID information and the data area are placed taking the range of linearity of the position signal into consideration, the track density can be increased, and the capacity of the disk type recording and reproducing apparatus can be increased, so that it is possible to provide a large-capacity disk type recording and reproducing apparatus.

Moreover, when writing servo data, data is recorded on the medium by completing one track after another, but owing to a blur in writing between adjacent tracks, when positioning the reading head, there is a possibility that the track center deviates a little from where it was when servo data was written. In anticipation of such a case, if a pattern for measuring a shift between the core centers is recorded on a specific track of the medium and if this pattern is read with the reading head and the writing head, the shift between the core centers can be measured, and by writing the ID division based on the shift, offset positioning of the heads can be achieved.

According to another embodiment, the apparatus is provided with another head with a core width which covers the circumferential widths of the writing head and the reading head, for example. With this head, the ID area is recorded on the medium. By this arrangement, recording the ID area on the medium or rewriting the ID division in an alternate sector process, for example, can be finished in a single operation, so that high-speed processing becomes possible.

According to the present invention described above, it is possible to provide a disk type recording and reproducing apparatus of a large capacity and a small size. The present invention has been described as being applied to the magnetic disk unit for example, but the present invention can be applied to disk type recording media in general, including an optical disk.

BRIEF DESCRIPTION OF THE DRAWINGS

FIGS. 1A to 1D are configuration diagrams showing the format of the magnetic disk according to a first embodiment of the present invention;

FIGS. 2A to 2D are configuration diagrams showing the format of a conventional magnetic disk;

FIGS. 3A to 3D are configuration diagrams showing the format of another conventional magnetic disk;

FIG. 4 is a configuration diagram of a system according to the first embodiment of the present invention;

FIGS. 6A to 6C are operation timing charts of the first embodiment of the present invention;

FIG. 7 shows other examples of a format of the magnetic disk according to the first embodiment of the present invention;

FIGS. 30A to 30C are explanatory diagrams showing details of a track format in the ninth embodiment of the present invention;

FIGS. 34A to 34C are explanatory diagrams showing details of the track format in the tenth embodiment of the present invention;

FIG. 38 is an explanatory diagram showing a format pattern; and

FIGS. 39A to 39C are explanatory diagrams showing details of a track format.

DESCRIPTION OF THE PREFERRED EMBODIMENTS

Figure 5:
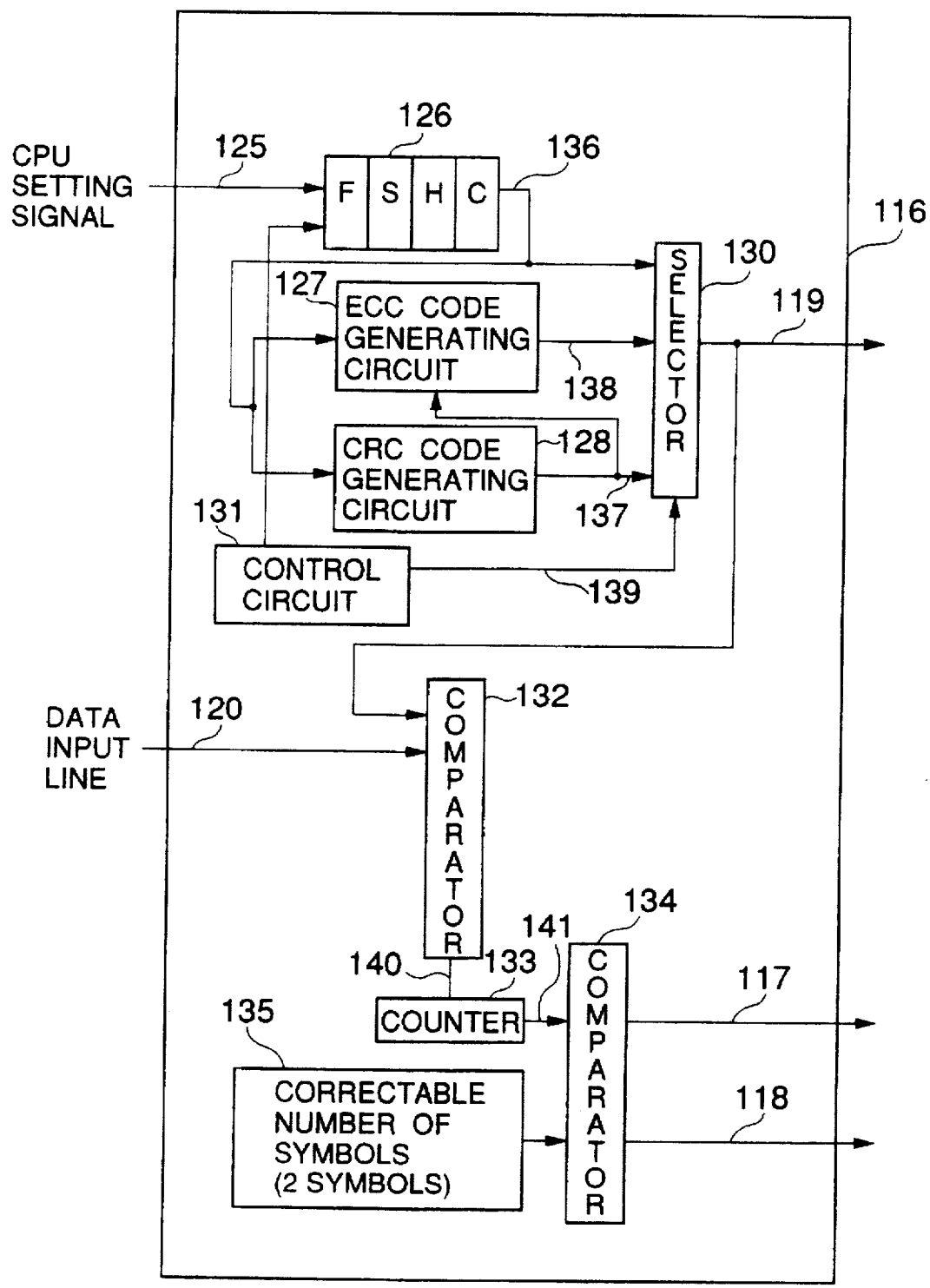
FIG. 5 is a block diagram of an ECC block for ID according to the first embodiment of the present invention.

A first embodiment of the present invention will be described with reference to FIGS. 1A to 1D, 4, 5, 6A to 6C, and 7.

FIGS. 1A to 1D are diagrams showing a record format of the magnetic disk according to the first embodiment of the present invention. FIG. 1A shows an index signal, one period of which corresponds to one rotation of the disk. The pulse spacing of the index signal corresponds to a track length, and the track length is divided into a plurality of sectors. FIG. 1B shows sector pulses which occur at every sector. FIG. 1C is a diagram showing a record format, and FIG. 1D is an enlarged view of the record format in each sector.

FIG. 4 is a diagram showing the configuration of a system which realizes the first embodiment. Reference numeral 101 denotes a hard disk controller (HDC) for controlling the format and read/write operation of the hard disk, 102 denotes a CPU for controlling a servo control circuit 107 and the HDC 101, 103 denotes a host interface for transferring data to a host computer via an SCSI bus, 104 denotes a data buffer for temporarily storing data received through the SCSI bus from the host computer or data received from the drive, 109 denotes a hard disk, 108 denotes a head for reading magnetic information on the hard disk and converting it into electrical signal information, 106 denotes a read/write control circuit for converting an analog signal read by the head 108 into a digital signal, 105 denotes an encoder/decoder for converting a digital signal such as a 1–7 code converted by the read/write circuit 106 into an NRZ signal or an NRZ signal supplied from the HDC 101 into a code formed taking the characteristics of the hard disk into consideration, such as a 1–7 code.

The HDC 101 comprises a host interface control section 110 for controlling the host interface, a drive control section 111 for controlling the encoder/decoder 105 and controlling writing and reading on the hard disk, an ECC control section 112 for calculating an error correcting code to be added to data which is to be written on the hard disk or performing an error detection calculation on data read from the hard disk, and correcting an error in the data, a buffer control section 113 for controlling the data buffer 104, and a CPU input/output control section 114 for controlling transmission of information from CPU 102 to the host interface control section 110, the drive control section 111, the ECC control section 112 and the buffer control section 113. The ECC control section 112 includes an ECC block 115 for data and an ECC block 116 for ID. Numeral 121 denotes a drive data input line for inputting a signal read from the hard disk to the drive control section in the form of an NRZ signal, 122 denotes a drive data output line for outputting data to be written on the hard disk in the form of an NRZ signal, 123 denotes a write gate which becomes active when data is going to be written on the hard disk, 124 denotes a read gate which becomes active when data is going to be read from the hard disk, 120 denotes a data input line for inputting data for ECC calculation to the ECC control section, and also serves as a signal line for inputting data from the hard disk or data sent through the SCSI bus from the host computer into the ECC control section. Numeral 119 denotes an ECC output line for transferring an ECC calculation result, which is to be written on the disk in a write operation, to the drive control section. 118 denotes an accord signal indicating that the ECC calculation result of an ID area accords with an ID being searched for, and 117 denotes a discord signal indicating that the ECC calculation result of an ID area does not accord with an ID being searched for. Numeral 125 denotes a CPU setting signal line by which the CPU sets an expected value of an ID or the like. Numeral 129 denotes data transferred between the ECC control section 112 and the CPU input/output control section 114. FIG. 5 is a block diagram of the ECC block for ID. Numeral 126 denotes an ID register for storing an ID number of a sector set by the CPU setting signal line 125 where data is to be read or written, and outputting the ID number as an ID signal 136, and 128 denotes a CRC code generating circuit for generating a CRC code to be added to the ID area from the ID signal 136 and outputting the CRC code as a CRC signal 137. Numeral 127 denotes an ECC signal generating circuit for generating an ECC code from the ID signal 136 and the CRC signal 137 and outputting the ECC code as an ECC signal 138. Numeral 130 denotes a selector for selecting one of the ID signal 136, the CRC signal 137, and the ECC signal 138 to be output onto the ECC output line 119. Numeral 131 denotes a control circuit for controlling output timing of the ID register 126 and the selector 130. Numeral 132 denotes a comparator which compares ID information read from the hard disk and input from the data input line 120 with an expected value of ID information input from the ECC output line 119, and if they accord with each other, controls an increment signal 140 to be "false" and if they do not accord with each other, controls the increment signal 140 to be "true". Numeral 133 denotes a counter which counts up when the increment signal 140 is "true" and outputs the count as a count signal 141. 134 denotes a comparator which compares the count signal 141 and a correctable number of symbols 135 and when the count signal 141 is greater than the correctable number of symbols 135 at the end of code comparison, outputs the discord signal 117, and when the count signal 141 is smaller than or equal to the correctable number of symbols 135, outputs the accord signal 118.

The ECC block for ID operates as shown in FIGS. 6A to 6C. When writing an ID, as shown in FIG. 6A, the control circuit 131 controls a selector control signal 139 to be 1 so that the value of the ID register set by the CPU is first output onto the ECC output line 119. In the cases shown in FIGS. 6A to 6C, "00000000" in hexadecimal notation is output onto the ECC output line 119. At the same time, the CRC code generating circuit 128 and the ECC code generating circuit 127 respectively divide the supplied value of the ID register by a generating polynomial GCRC(x) of the CRC code and a generating polynomial GECC(x) of the ECC code and obtain the remainder. On completion of outputting the value of the ID register, the control circuit 131 controls the selector control signal 139 so as to be 2 so that the calculation result of the CRC code is output onto the ECC output line 119. In the cases of FIGS. 6A to 6C, since the remainder of the division of "00000000" by GCRC(x) is "00", "00" is output onto the ECC output line 119. The ECC code generating circuit 127 further divides the calculation result of the CRC code by the generating polynomial GECC (x) and obtains the remainder. On completion of outputting the calculation result of the CRC code, the control circuit 131 controls the selector control signal 139 to be 3 so that the calculation result of the ECC code is output onto the ECC output line 119. In the cases of FIGS. 6A to 6C, since the remainder of a division of "0000000000" by GECC(x) is "0000", "0000" is output onto the ECC output line 119. The drive control section 111 asserts the write gate 123 so that "00000000000000" on the ECC output line 119 is output on the drive data output line 122 and "00000000000000" is written on the hard disk.

When an ID is read and data is read or written on the hard disk, operations take place as shown in FIGS. 6B and 6C. Synchronized with a timing of reading ID data from the data input line 120, the control circuit 131 controls the ECC code generating circuit 127, the CRC code generating circuit 128 and the selector 130, and outputs an expected value of ID information onto the ECC output line 119. In the cases of FIGS. 6A to 6C, "00000000000000" is output onto the ECC output line 119. The comparator 132 compares ID information read from the hard disk with the expected value of ID information on the ECC output line 119, and if those pieces of information discord with each other, the counter 133 increments by one. In the case of FIG. 6B, since data read from the hard disk is "0001000100000000" in hexadecimal notation, supposing that one symbol is four bits, the count of the counter is 2 at the end of comparison. If an ECC code which is of a two-symbol-correctable type, in the case of FIG. 6B, because the count 2 of the counter does not exceed the correctable number of symbols 2, the comparator 134 outputs the accord signal 118 at the end of the comparison. In response to this signal, the drive control section 111 asserts the write gate or the read gate to enable data to be read or written on the hard disk. By control arranged as described, in this first embodiment, the ECC correction of the ID area can be finished before access is made to the data area placed just behind the ID area, and therefore, even if a data area corresponding to the ID area is placed just behind the ID area, after ECC error correction of the ID area has been finished, data can be read from or written into the data area corresponding to the ID area without any rotational delay. In the case of FIG. 6C, since the data read from the hard disk is "00000000010B4800", supposing that one symbol is four bits, the count of the counter at the end of the comparison is 4. In the case of FIG. 6C, since up to two symbols can be corrected, the comparator 134 outputs the discord signal 117 at the end of the comparison. In response to this signal, the drive control section 111 does not assert the write gate or the read gate, nor does it perform a read/write operation of data on the hard disk. By such control, in the first embodiment, the ECC error correction of the ID area is limited to the number of correctable symbols, leaving no chance of malfunctioning. This embodiment is possible even if any of the ID area formats shown in FIG. 7 are used. The contents of ECC1 and ECC2 is that ECC1 is the ECC code for the C, H and S records and ECC2 is the ECC code for the F record. This embodiment is compatible with any of these ID area formats.

A second embodiment of the present invention will be described with reference to FIGS. 4, 8A to 8D, 9, 10 and 11.

Figure 8:
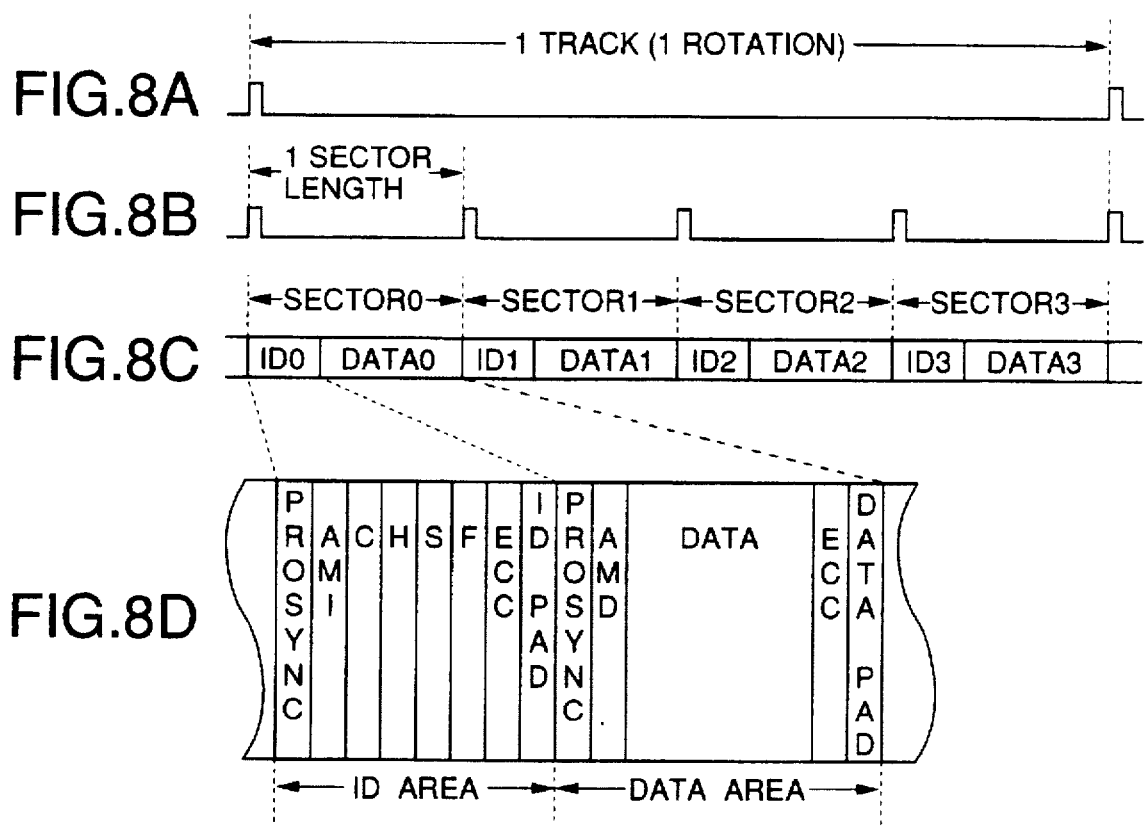
FIGS. 8A to 8D are configuration diagrams showing the format of the magnetic disk according to a second embodiment of the present invention.

FIGS. 8A to 8D are diagrams showing a recording format of the magnetic disk according to the second embodiment of the present invention. FIG. 8A shows an index signal, one period of which corresponds to one rotation of the magnetic disk. The pulse spacing of the index signal corresponds to a track length, and one track length is divided into a plurality of sectors. FIG. 8B shows sector pulses which occur at every sector. FIG. 8C shows a recording format, and FIG. 8D shows an enlarged view of the recording format of each sector.

FIG. 4 is a diagram showing the configuration of a system which realizes the first embodiment, and FIG. 4 also serves as a diagram showing the system configuration which realizes the second embodiment.

Figure 9:
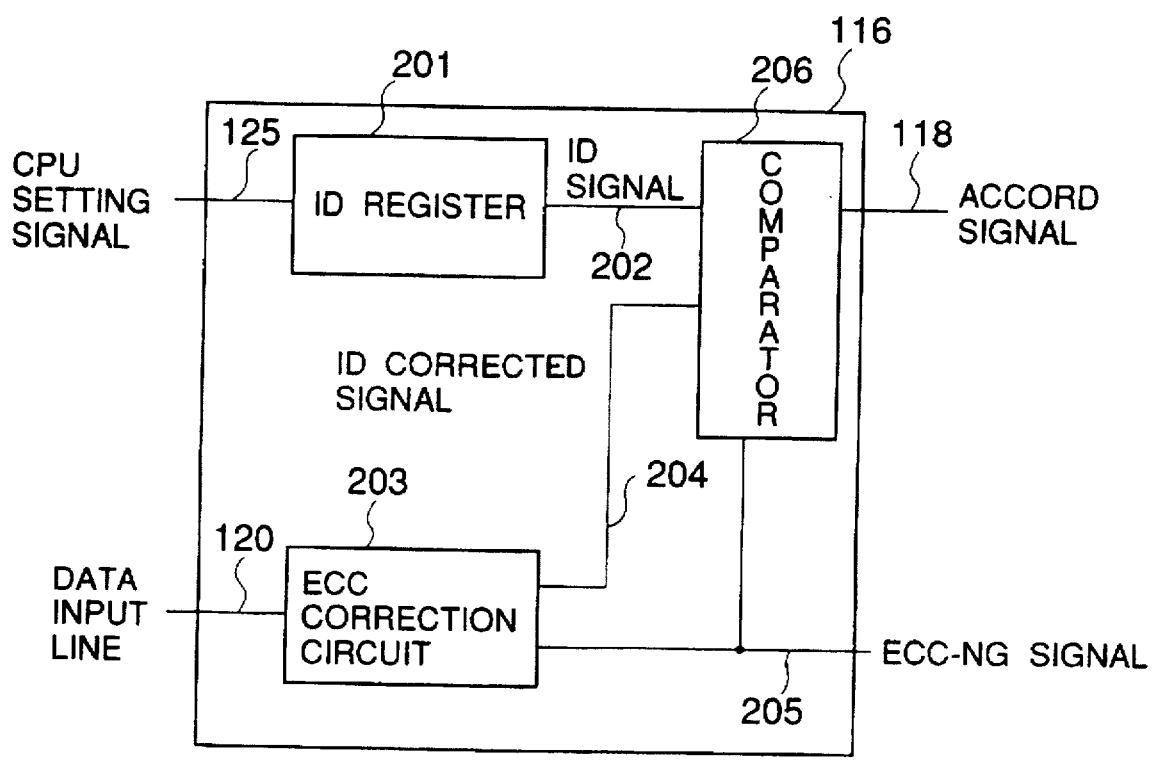
FIG. 9 is a block diagram showing an ECC block for ID according to the second embodiment of the present invention.
Figure 10:
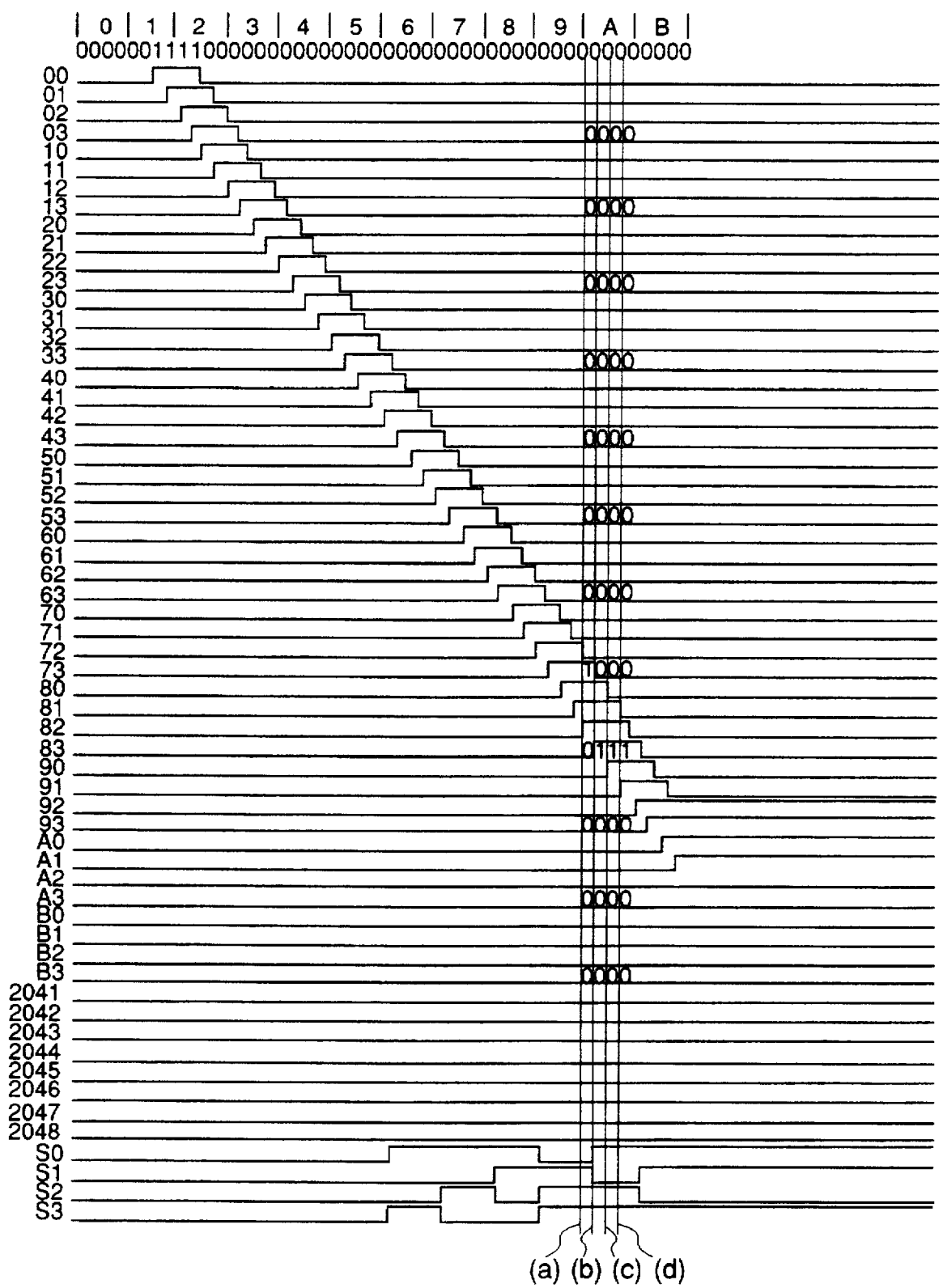
FIG. 10 is an operation timing chart of the second embodiment of the present invention.
Figure 11:
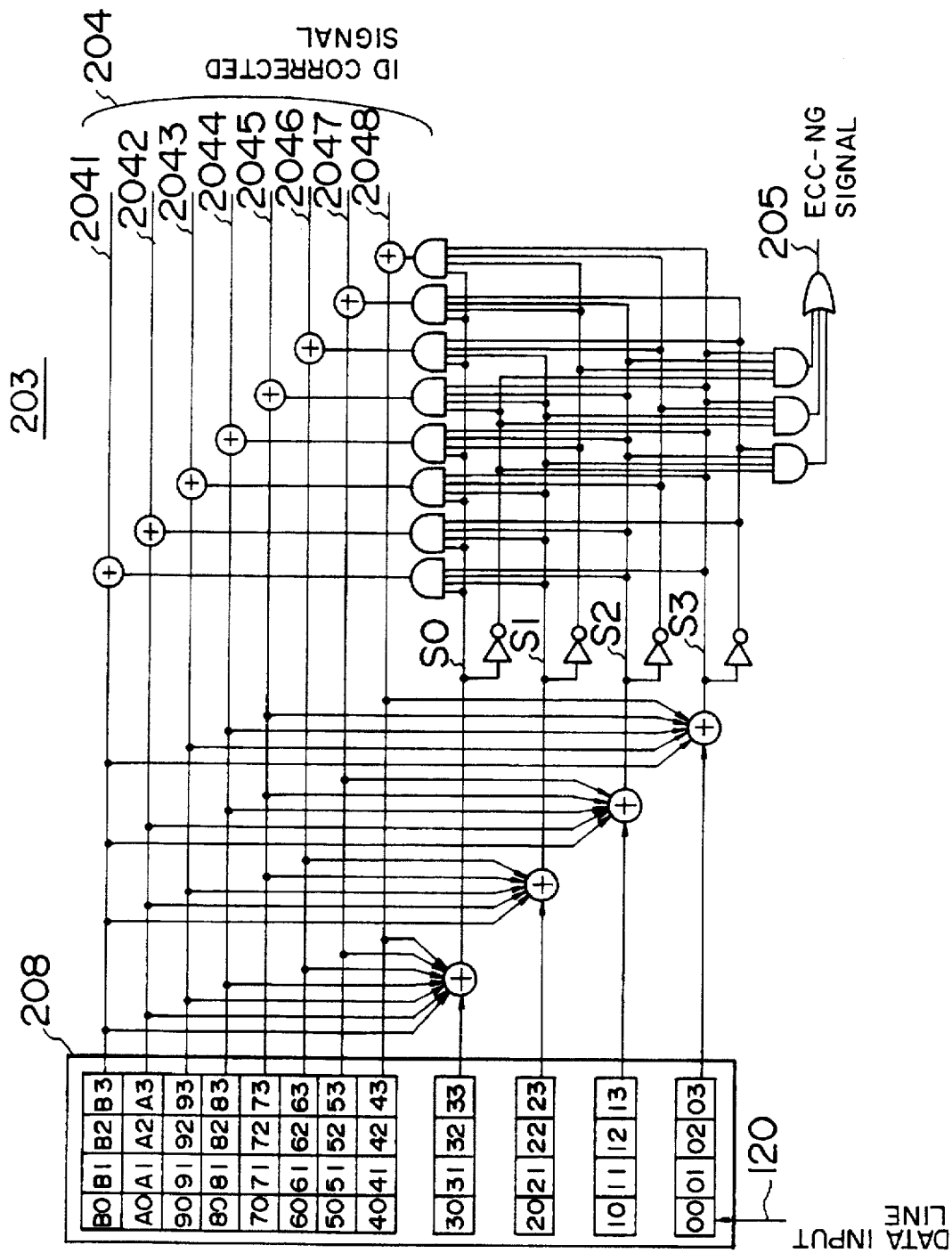
FIG. 11 is a detailed block diagram of an ECC correction circuit according to the second embodiment of the present invention.

FIG. 9 is a block diagram of the ECC block for ID. Numeral 201 denotes an ID register for storing an ID number of a sector set by the earlier-mentioned CPU setting signal 125 where data is to be read or written, and outputting the ID number as an ID signal 202, and 203 denotes an ECC correction circuit which performs ECC correction on ID information read out through the data input line 120. When the ID information is correctable, the ECC correction circuit instantly corrects its error and outputs the error-corrected ID information as an ID corrected signal 204, or if the ID information is not correctable, the ECC correction circuit outputs an ECC-NG signal 205 to the CPU. Numeral 206 denotes a comparator which compares the ID signal 202 and the ID corrected signal 204, and if those signals accord with each other and the ECC-NG signal 205 is not "true", the comparator asserts the accord signal 118. FIG. 11 is a detailed block diagram of the ECC correction circuit 203. Numeral 208 denotes a shift register, and data is shifted in the order of 00→01→02→03→10→11→12→13→... FIG. 10 is the operation timing chart of the detailed block diagram in FIG. 11, and shows a case where a burst error of "000000111100 . . . " is superposed on a code of "0000000000000000 . . . ". In the elements 03, 13, 23, 33, 43, 53, 63, 73, 83, 93, A3, B3 of the shift register 208, bits "000000010000" are stored at the timing (a) in FIG. 10. At S0, S1, S2 and S3, the binary voltage levels are 0,1,1,1, and as a result, at 2045 the signal is at an inverted level of the level at 73. The points 2041, 2042, 2043, 2044, 2046, 2047 and 2048 have the binary digits in the elements B3, A3, 93, 83, 63, 53, and 43. By the operation as described, the ID corrected signal 204 has a code "0000000000000000 . . . " as the result of correction and is output at timings (a), (b), (c), and (d) in FIG. 10. By control implemented as described, in the second embodiment, the ECC error correction of the ID area can be finished before access is made to the data area placed just behind the ID area. Therefore, even when the data area corresponding to the ID area is placed just behind the ID area, after the ECC error correction of the ID area has been finished, a read/write operation on the data area corresponding to the ID area can be conducted without any rotational delay.

Next, a third embodiment of the present invention will be described with reference to FIGS. 4, 12A to 12D, 13, and 14.

Figure 12:
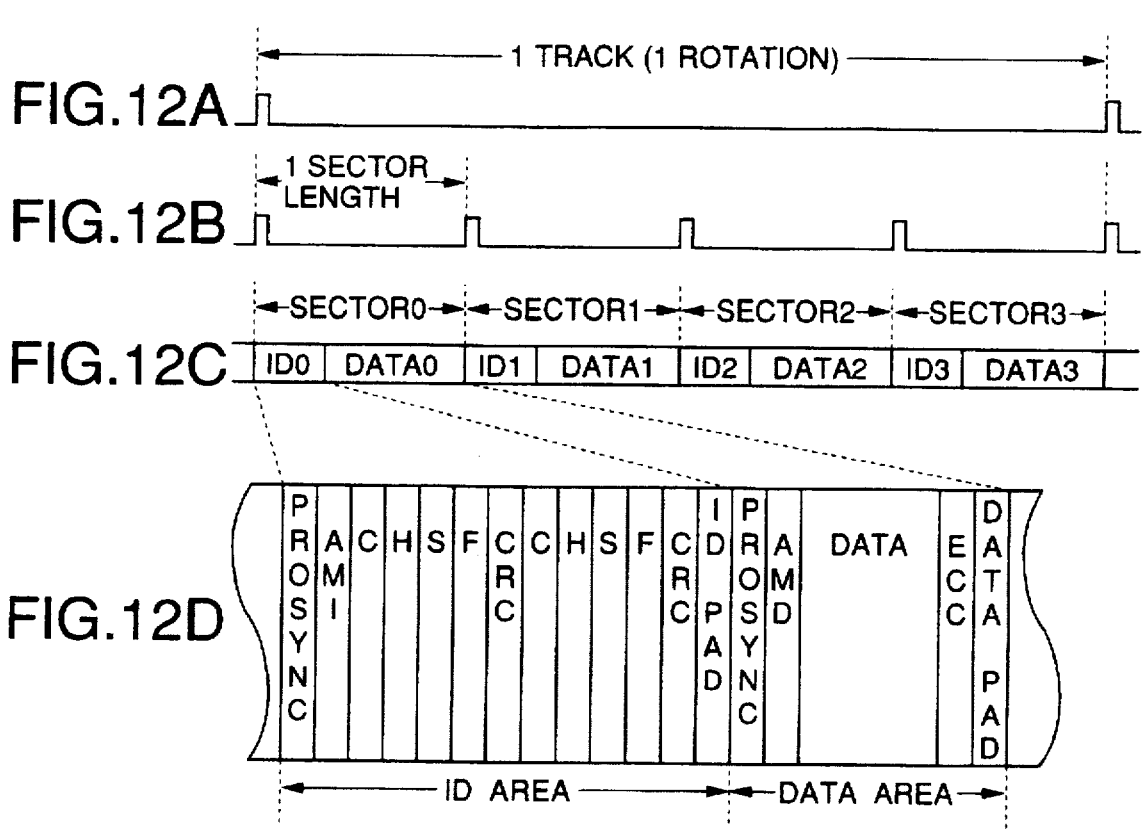
FIGS. 12A to 12D are configuration diagrams showing the format of the magnetic disk according to a third embodiment of the present invention.

FIGS. 12A to 12D are diagrams for showing the recording format of the magnetic disk according to the third embodiment of the present invention. FIG. 12A shows an index signal, one period of which corresponds to one rotation of the disk. The spacing of the index pulses corresponds to a track length, and one track length is divided into a plurality of sectors. FIG. 12B shows sector pulses which occur at every sector. FIG. 12C is a diagram showing the recording format, and an enlarged recording format is shown in FIG. 12D.

FIG. 4 is a diagram showing the system configuration which realizes the first embodiment of the present invention, but it also serves as a diagram showing the system configuration which realizes the third embodiment.

Figure 13:
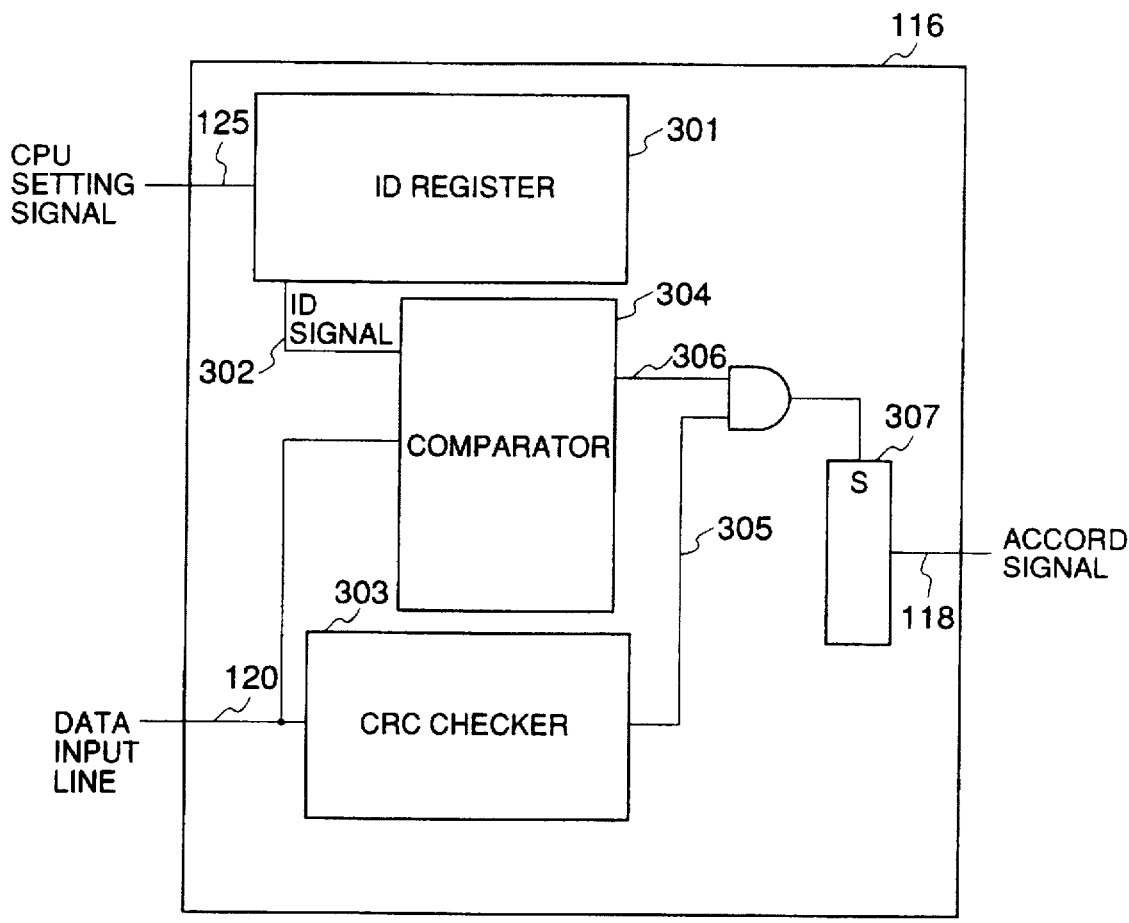
FIG. 13 is a block diagram showing an ECC block for ID according to the third embodiment of the present invention.

FIG. 13 is a block diagram of the ECC block 116 for ID. Numeral 301 denotes an ID register for storing an ID number of a sector set by the earlier-mentioned CPU setting signal 125 where data is to be read or written, and outputting the ID number as an ID signal 302, and 303 denotes a CRC checker which performs a CRC check on the ID information read out through the data input line 120, and if the result of the CRC check is normal, controls a normalcy signal 305 to be "true", or if the result of the CRC check shows an error, controls the normalcy signal 305 to be "false". Numeral 304 denotes a comparator which compares the ID number of the sector supplied by the ID signal 302 where data is to be read or written and the ID number read from the hard disk and supplied through the data input line 120, and if they accord with each other, controls an ID accord signal 306 to be "true" or if they discord with each other, controls the ID accord signal 306 to be "false". Numeral 307 denotes a latch which is set when the ID accord signal 306 and the normalcy signal 305 are both "true", and outputs the accord signal 118.

Figure 14:
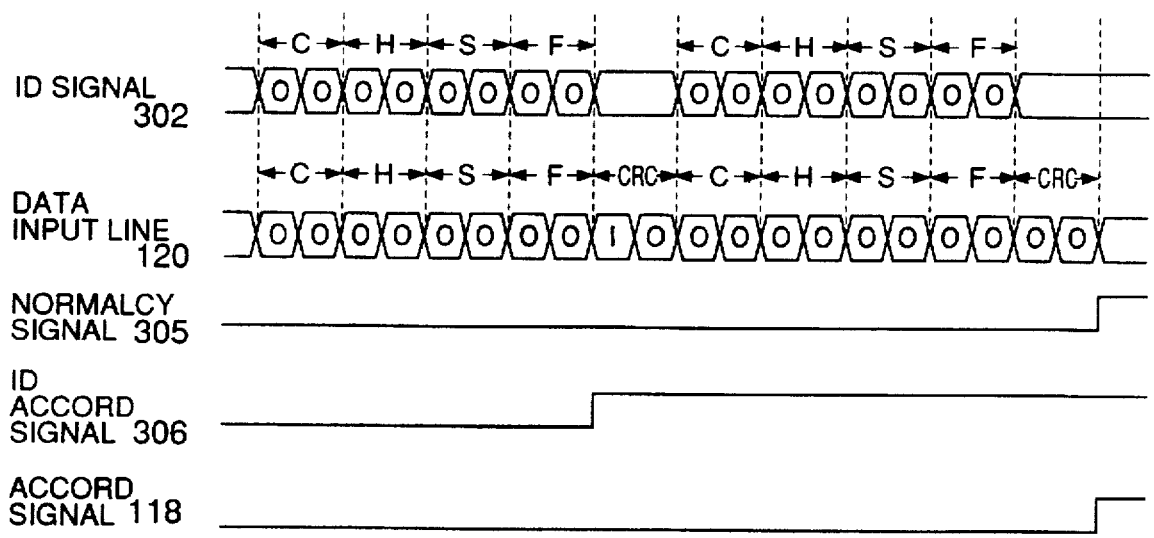
FIG. 14 is an operation timing chart of the third embodiment of the present invention.

The operation of the third embodiment will be described with reference to FIG. 14. Suppose that "00000000" is set by the CPU as the ID number of the sector on which a read/write operation is to be performed. The ID register 301 outputs "00000000" twice onto the ID signal at the timing of input of ID information through the data input line 120. Suppose that "0000000010" is read as the first ID information as an error enters through the data input line 120. Since the ID signal 302 and the ID number supplied by the data input line 120 accord with each other, the comparator 304 controls the ID accord signal 306 to be "true". However, because the result of the CRC check shows an error, the normalcy signal 305 is not "true". Suppose if "0000000000" is read as the second ID information, because the ID signal 302 and the information on the data input line 120 accord with each other, the comparator 304 controls the ID accord signal 306 to be "true". In addition, since the result of the CRC check turns out to be normal, the normalcy signal 305 becomes "true" and the latch 307 is set so that the accord signal 118 is "true". By control arranged as described, in the third embodiment, if one of the two pieces of ID information in the ID area is read correctly, data of the sector can be read correctly, thus making it possible to improve the reliability of ID information. As an accord/discord decision can be finished before access is made to the data area placed just behind the ID area, even if a data area corresponding to the ID area is placed just behind the ID area, even when an error occurs in the data in the ID area, data can be read from or written in the data area corresponding to the ID area without deterioration of access time to perform the read/write operation. Note that though ID information is stored twice in the ID area in FIG. 12D, the ID information may be stored three or more times.

Figures 17A, 17B, 17C:
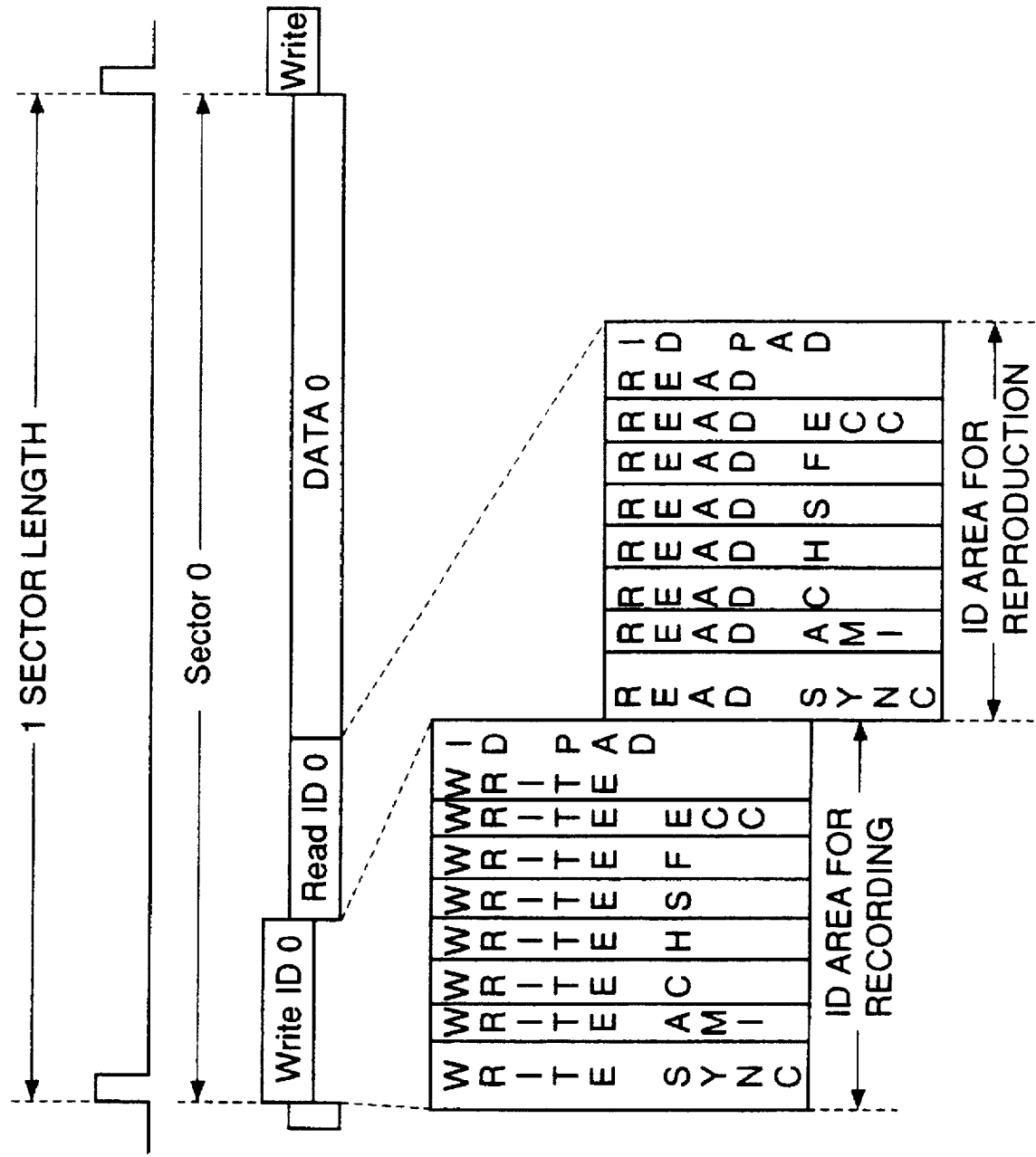
FIGS. 17A to 17C are explanatory diagrams showing the recording format of the magnetic disk according to the fourth embodiment of the present invention.

A fourth embodiment of the present invention will now be described with reference to FIGS. 15, 4, 17A to 17C, and 18. FIGS. 17A to 17C are diagrams showing the recording format of the magnetic disk according to the fourth embodiment of the present invention. FIG. 17A shows sector pulses which occur at every sector. FIG. 17B shows a recording format, and FIG. 17C is an enlarged view of the recording format of the ID area of each sector. FIG. 4 shows the first embodiment and also shows the configuration of a system for realizing the fourth embodiment. This embodiment shows a case where the present invention is applied to a small-size disk serving as a magnetic recording and reproducing unit.

This small-size disk comprises a hard disk controller 101 (referred to as HDC for short; functions as the control circuit and reading means for the magnetic recording and reproducing unit) for controlling the format, read and write operations on the hard disk, CPU102 (data transfer control means, data invalidating means, format means) for controlling the servo control circuit 107 and the HDC101, a host interface 103 for transferring data to the host computer, a data buffer 104 for temporarily storing data received through the SCSI bus from the host computer or data received from the drive controller, a disk 7 for storing data, a dual head 6 including a recording head for converting electrical signal information into magnetic information on the disk 7 and a reproducing head for reading magnetic information on the disk and converting it into electrical signal information, a read/write control circuit 106 for converting an analog signal read with the dual head 6 into a digital signal or a digital signal to be written on the disk into an analog signal, and an encoder/decoder for converting a digital signal such as a 1–7 code converted by the read/write control circuit 106 into an NRZ signal or converting an NRZ signal supplied from the HDC101 into a code formed taking the characteristics of the disk 7 into consideration, such as a 1–7 code.

The HDC 101 comprises a host interface control section 110 for controlling the host interface, a drive control section (read-out directive outputting means) 3111 for controlling the encoder/decoder 105 and controlling writing and reading on the disk 7, an ECC control section (error correcting means) 112 for calculating an error correcting code to be added to data which is written on the disk 7 or performing an error detection calculation on data read from the disk 7, and correcting an error if there is in the data, a buffer control section 113 for controlling the data buffer 104, and a CPU input/output control section 114 for controlling transmission of information from CPU to the host interface control section 110, the drive control section 111, the ECC control section 112 and the buffer control section 113. And, the ECC control section 112 includes an ECC block 115 for data and an ECC block 116 for ID.

Numeral 121 denotes a drive data input line for inputting in the form of an NRZ signal a signal read from the hard disk to the drive control section, 122 denotes a drive data output line for outputting in the form of an NRZ signal data to be written on the hard disk, 123 denotes a write gate which becomes active when data is going to be written on the disk 7, 124 denotes a read gate which becomes active when data is going to be read from the disk 7, and 120 denotes a data input line for inputting data for ECC calculation to the ECC control section and also serves as a signal line for inputting data from the disk 7 or data sent through the SCSI bus from the host computer into the ECC arithmetic section. Numeral 119 denotes an ECC output line for outputting the result of ECC calculation, which is to be written on the disk in an write operation, 118 denotes an accord signal indicating that the ECC correction result of the ID area accords with the ID being searched, 117 denotes a discord signal indicating that the ECC correction result of the ID area does not accord with the ID being searched. Numeral 125 denotes a CPU setting signal by which the CPU sets an expected value of ID or the like. Numeral 126 denotes data (ECC-NG signal 410, etc.) transferred between the ECC control section 112 and the CPU input/output control section 114.

Figure 15:
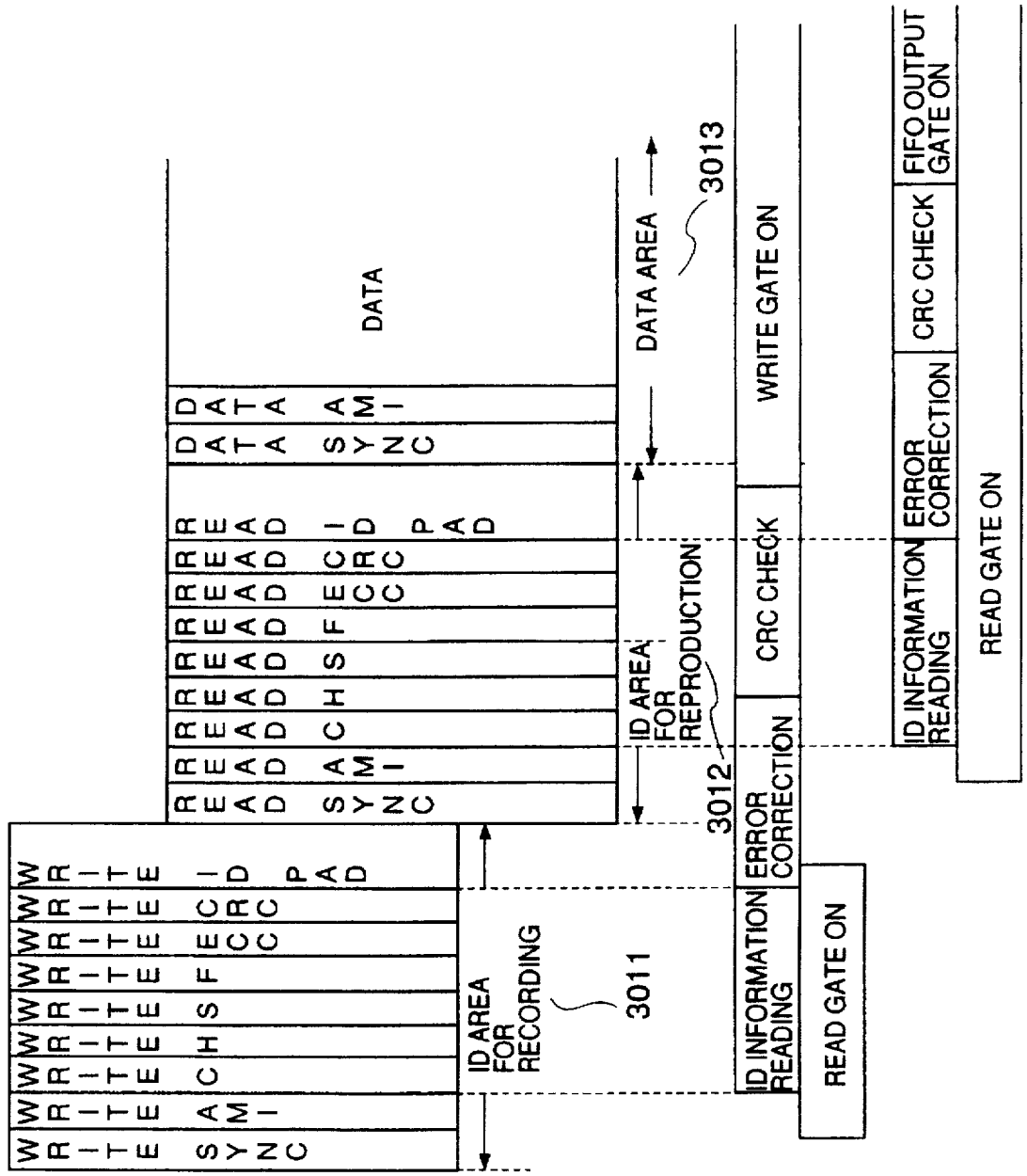
FIG. 15 is a schematic diagram showing a track format of the magnetic disk according to a fourth embodiment of the present invention.

The ID division (ID area) provided on the magnetic disk will be described with reference to FIG. 15. FIG. 15 is a schematic diagram showing a track format. A track is divided into a plurality of sectors (recording areas), and each sector has written therein an ID (identification) area for recording 3011, an ID (identification) area for reproduction 3012, and a data division (data area) 3013 of a fixed length. Since the sector servo system is used, a servo signal division, not shown, is also written. Described in the above-mentioned two ID areas are a synchronization pattern signal (SYNC), an area showing a leading end of each area (AMI), a cylinder number (C), a head number (H), a sector number (S), a flag (F) showing whether or not the sector is defective, etc. The ID areas have data already recorded before the magnetic disk is shipped, and can be rewritten while in use.

Figure 16:
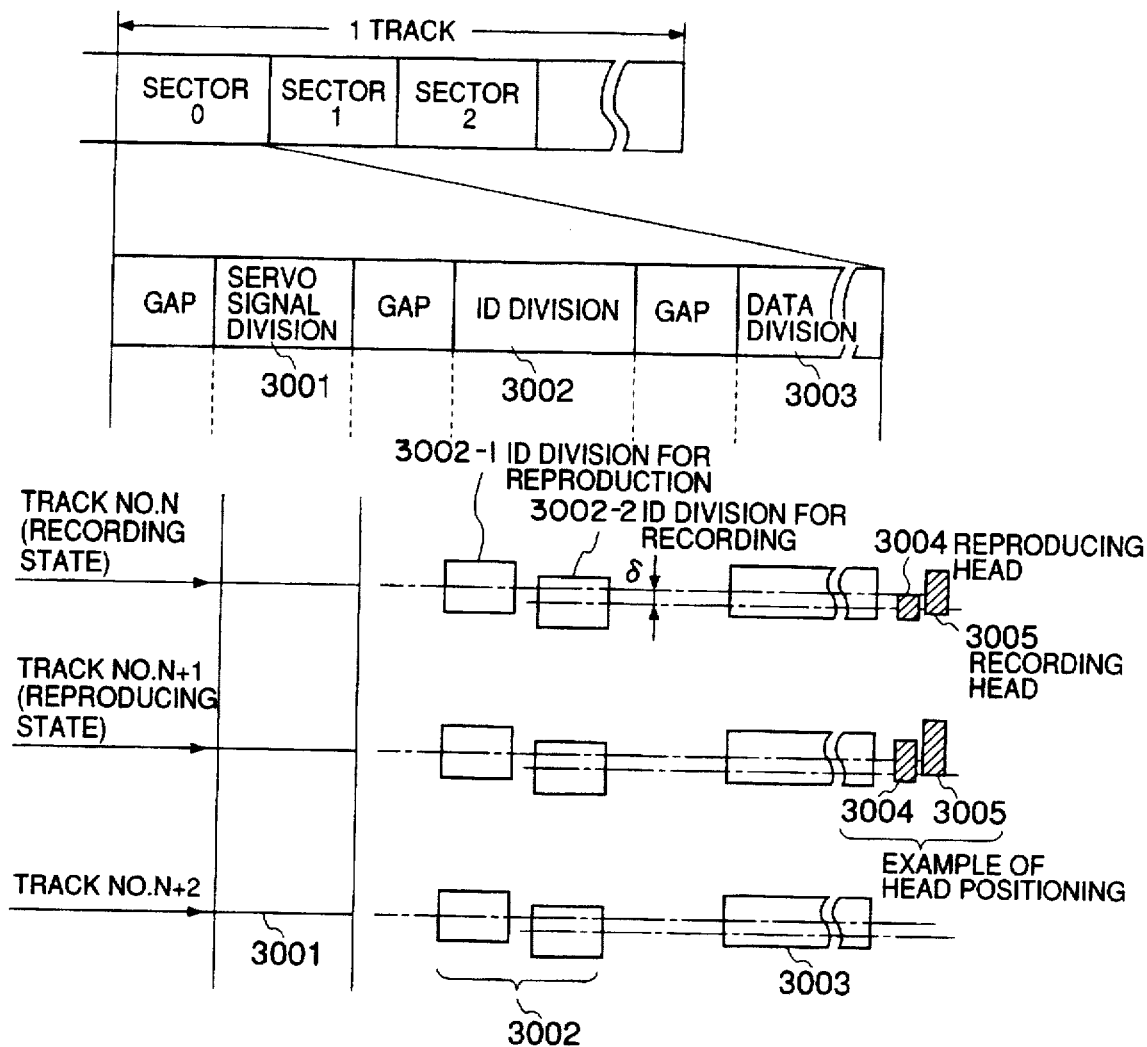
FIG. 16 is an explanatory diagram showing a track format of the magnetic disk of the prior art.

The same contents are written in the recording ID area 3011 and the reproduction ID area 3012 as in the conventional magnetic disk. The recording ID area 3011 and the reproduction ID area 3012 are offset from each other by the positional shift ($\delta$) between the recording head and the reproducing head (see prior-art FIG. 16). If, in a recording operation, the reproducing head is positioned to the recording ID area 3011, the recording head can be positioned to the center position of writing. In a reproduction operation, the reproducing head is positioned to the reproduction ID area 3012. In the manner described, by selectively using the two ID areas between the recording and reproducing operations, even if the positions of the heads are changed between the recording and reproducing operations, an ID area can always be detected without any positional shift.

Figure 18:
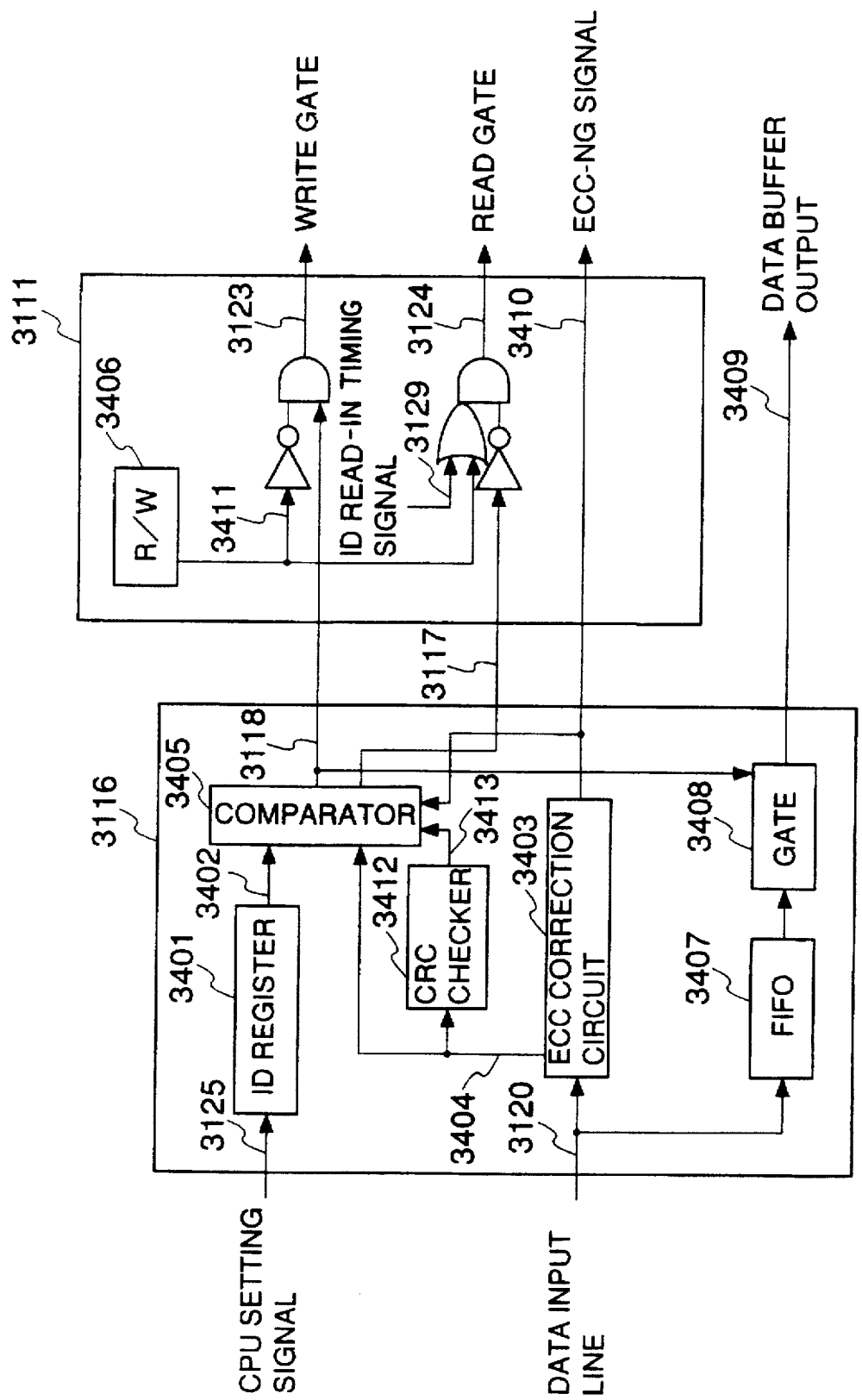
FIG. 18 is a block diagram of an ECC circuit for ID and a drive control section according to the fourth embodiment of the present invention.

FIG. 18 is a block diagram of an ECC block for ID 3116 and a drive control section 3111. Numeral 3401 denotes an ID register (identification information memory means) for storing an ID number of a sector set by a CPU setting signal line 3125 where information is to be read or written, and outputting the ID number as an ID signal 3402. 3403 denotes an ECC correction circuit for performing ECC correction on ID information read through a data input line 3120, and outputting corrected ID information as an ID corrected signal 3404 when an error is correctable or an ECC-NG signal 3410 to the CPU when the error is not correctable. Numeral 3412 denotes a CRC checker which performs a CRC check on the ID corrected signal 3404, and if the result of the CRC check is OK, controls a CRC error signal 3413 to be "false", or if the result of the CRC check shows an error, controls the CRC error signal 3413 to be "true". Numeral 3405 denotes a comparator which compares the ID signal 3402 and the ID corrected signal 3404, and if they accord with each other and the ECC-NG signal 3410 is "false" and the CRC error signal 3413 is "false", asserts an accord signal 3118, or if they discord with each other or the ECC-NG signal 3410 is "true" or the CRC error signal 3413 is "true", asserts a discord signal 3117. Numeral 3407 denotes a FIFO unit for temporarily storing data read from the data area while ECC decision/correction is in progress, and 3408 denotes a gate for performing control of whether or not to output data accumulated in the FIFO unit to a data buffer according to the value of the accord signal 3118. Numeral 3406 denotes a R/W register showing whether data is being read or written, and if the R/W register 3406 shows "read", a read mode signal 3411 is "true". When the R/W register 3406 shows "write", the read mode signal 3411 becomes "false". Numeral 3129 denotes an ID read timing signal which is asserted when ID is read in.

The operation of the fourth embodiment will be described with reference to FIG. 15. Generally, when a burst error is corrected by hardware, error correction requires about the same time as the time taken for reading data. Furthermore, when a CRC check is adopted, after errors are corrected, the CRC check needs to be conducted, so that an additional time of about the same length as the time for reading data is required.

Description will start with the operation in writing data. In the fourth embodiment, a recording ID area is placed ahead of a reproduction ID area, and therefore, when writing data, after ID information is read in from the recording ID area, while the dual head passes the reproduction ID area, error correction and the CRC check of the recording ID area can be finished. If, at the end of the CRC check, the ID corrected signal 3404 and the ID signal 3402 accord with each other and the CRC error signal 3413 and the ECC-NG signal 3410 are both "false", the comparator 3405 asserts the accord signal 3118. In a data write operation, the read mode signal 3411 is set to be "false", so that a write gate 3123 is asserted.

The operation in reading data will next be described. When data is read, ID information is first read in from the reproduction ID area, and then the ID information is subjected to error correction and the CRC check. When data is read, there is no time for error correction and the CRC check to be finished before the data area starts to be read by the head. Therefore, at the start of the data area, a read gate 3124 is asserted unconditionally, and data read in is accumulated in the FIFO unit 3407. After error correction is finished, if the CRC check is OK, the accord signal 3118 is asserted, the gate 3408 is put in the open state to allow data to be transferred from the FIFO unit 3407 to the data buffer. When error correction is impossible or the CRC check ends with an error having been detected, the discord signal 3117 is asserted, and the read gate 3124 is negated. The accord signal 3118 is kept negated, so that the gate 3408 stays in a state in which it is unable to output data. By abandoning data in the FIFO unit 3407, data on a wrong sector is prevented from being read in. By control arranged as described, in the fourth embodiment, even if a data area corresponding to the ID area is placed just behind the ID area, after ECC correction of the ID area has been finished, data can be read from or written in the data area corresponding to the ID area without any rotational delay.

In the fourth embodiment, CPU 102 which functions as the data transfer control means, data invalidating means and format means, is installed outside HDC 101, but the present invention is not limited to this arrangement, so that CPU 102 may be included in HDC 101.

In the fourth embodiment, the recording head and the reproducing head are shifted with respect to each other by a positional shift (δ) between them, and therefore the heads are locked in this positional arrangement when they pass over the recording ID area 3011, the reproduction ID area 3012, and the data division 3013, so that an ID area can be read at the most optimum position both in recording and reproducing operations. Positioning of the heads is done by the servo control circuit 107 shown in FIG. 4.

Figure 28:
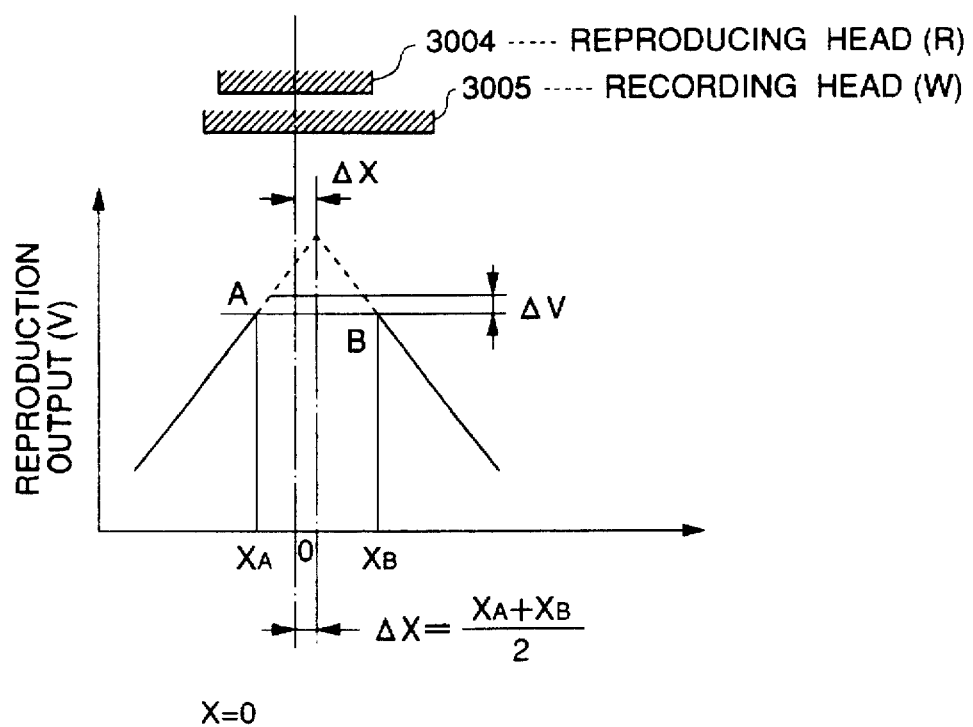
FIG. 28 is an explanatory diagram regarding how to obtain the amount of shift of the heads with respect to each other.

An example of a method for obtaining δ will now be described. For instance, the positional discrepancy between the recording head and the reproducing head can be measured directly by an SEM (scanning electron microscope) or the like, but the physical shape of the reproducing head and the reproduced area do not necessarily agree with each other. For this reason, it is desirable to obtain the positional shift from a reproduction output as shown in FIG. 28. In FIG. 28, the reproducing head (R) 3004 and the recording head (W) 3005 are shifted with respect to each other by a certain positional shift (ΔX), while changing a head position (X) with respect to a head position (X=0) constituting a datum, recorded data is reproduced. By this operation, a relation between the reproduction output (V) and the head position (X) is obtained. Output points A and B, which are a fixed value (ΔV) lower than the maximum output value, are identified, and from their positions $X_A$ and $X_B$ the positional shift (ΔX) is obtained as $(X_A+X_B)/2$. Alternatively, tangent lines (differential values of output) are drawn at points $X_A$ and $X_B$ as indicated by the dashed lines, and from the point of intersection of the tangent lines, the positional shift (ΔX) can be obtained (FIG. 28). The above-mentioned methods can be used with a disk unit having the heads mounted as described. Therefore, the positional shift between the heads can be obtained automatically when servo information is recorded, for example, which results in an improved productivity.

Figure 19:
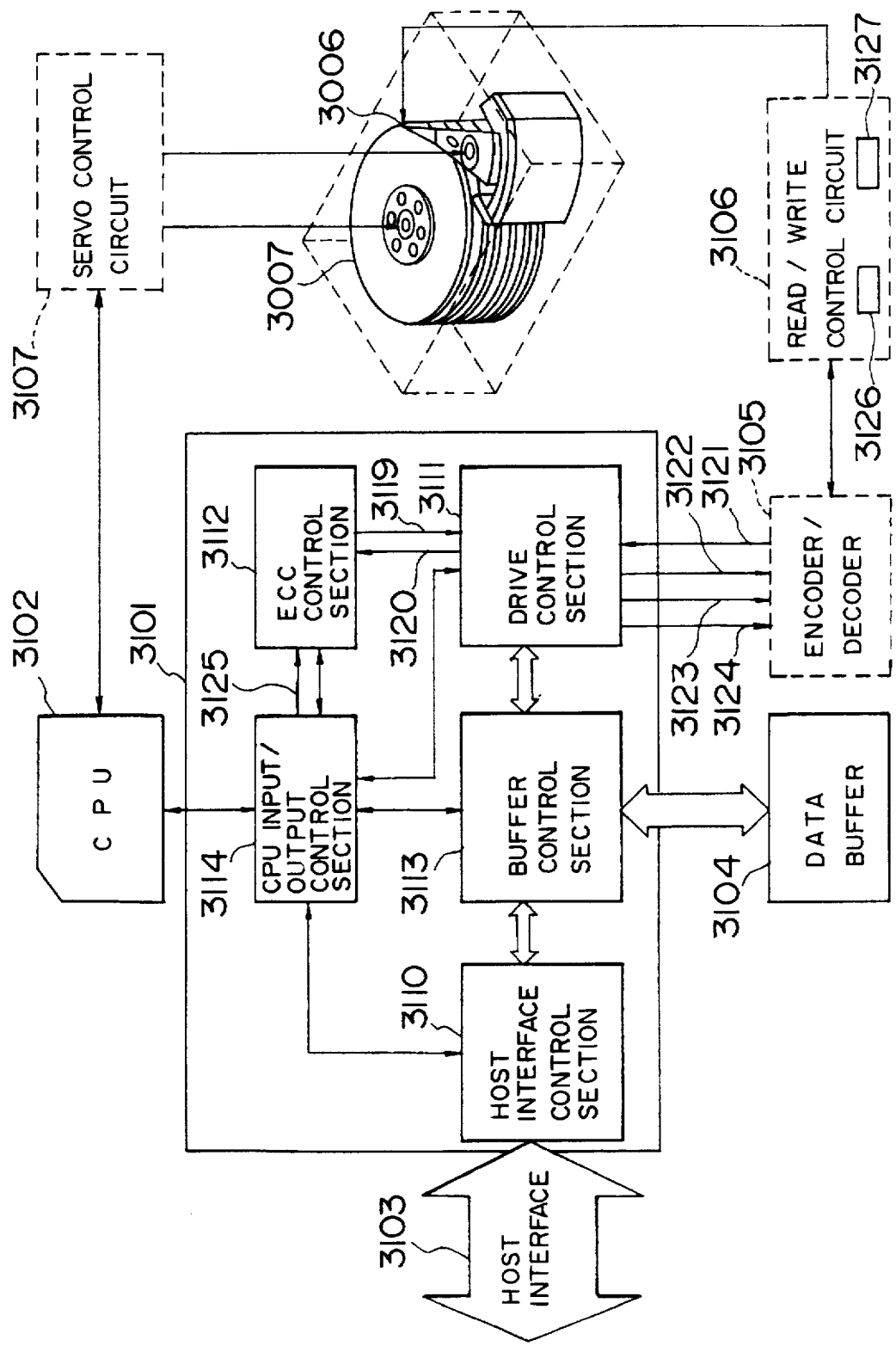
FIG. 19 is a block diagram of a small-size disk for realizing a fifth embodiment of the present invention.

A fifth embodiment of the present invention will be described with reference to FIGS. 19, 20 and 21. FIG. 19 is a diagram showing the configuration of a system for realizing the fifth embodiment. This system configuration diagram is almost identical to FIG. 4 showing the system configuration of the first embodiment, except that the ECC control section 3112 performs ECC only for the data area, and that the read/write control circuit 3106 includes a digital filter 3126 and a Viterbi decoder 3127.

Using FIG. 21, description will be made of problems accompanying a case where the ID for reproduction is written ahead of the ID for recording. As shown in FIG. 21, the use of a digital filter processing and Viterbi decoding improves the data reproduction capability and reliability, but the digital filter processing and the Viterbi decoding process take time, so that a delay time is required from when data is read in until the data is recognized by the HDC. For a while after the ID for recording is read until the HDC recognizes that this ID information agrees with the ID of a sector as the destination, data cannot be written on the disk 3007. As a result, it is necessary to put an invalid area between the ID area for recording and the data area as shown in FIG. 21, so that the overall format efficiency falls.

Figure 20:
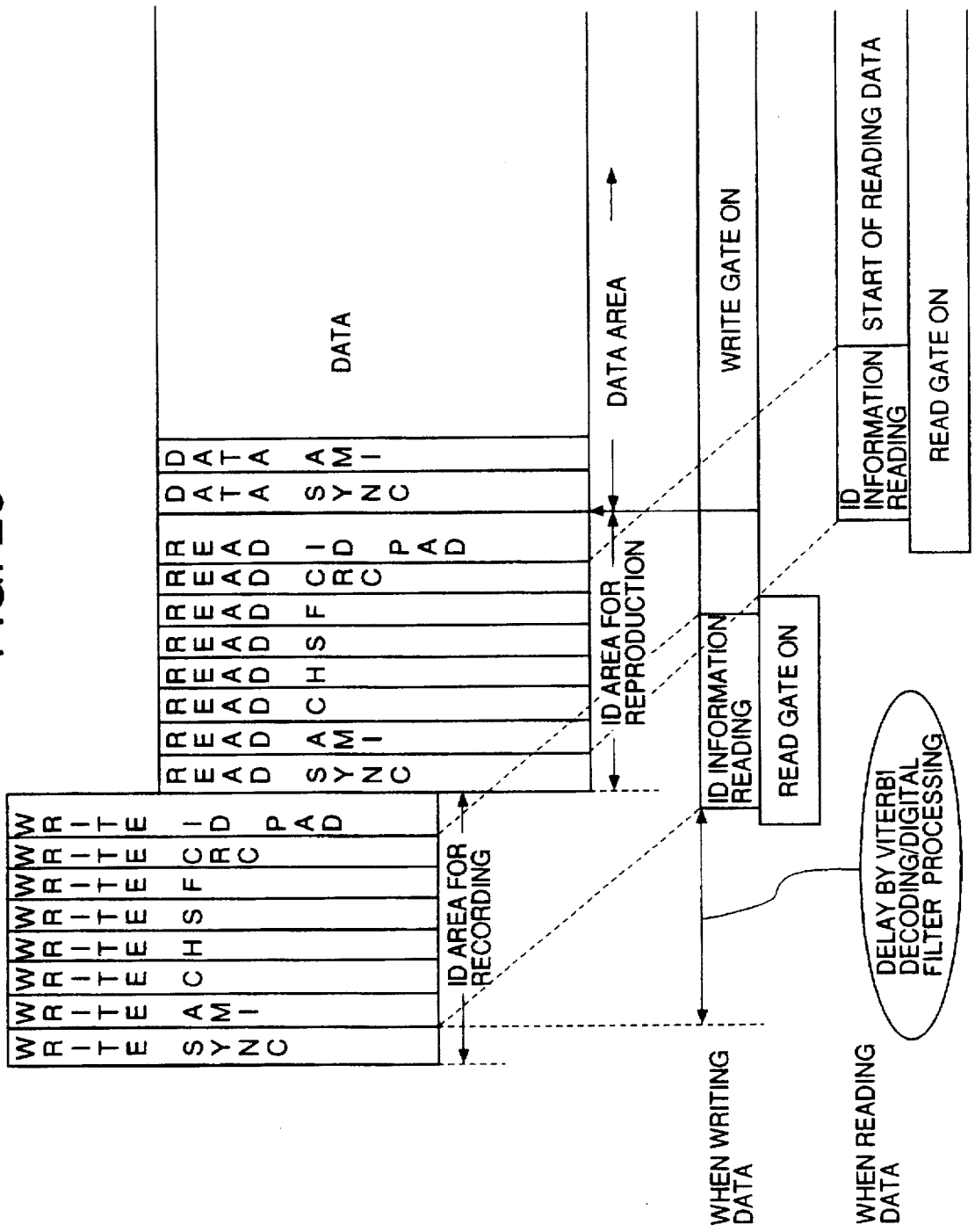
FIG. 20 is an operation timing chart of the fifth embodiment of the present invention.
Figure 21:
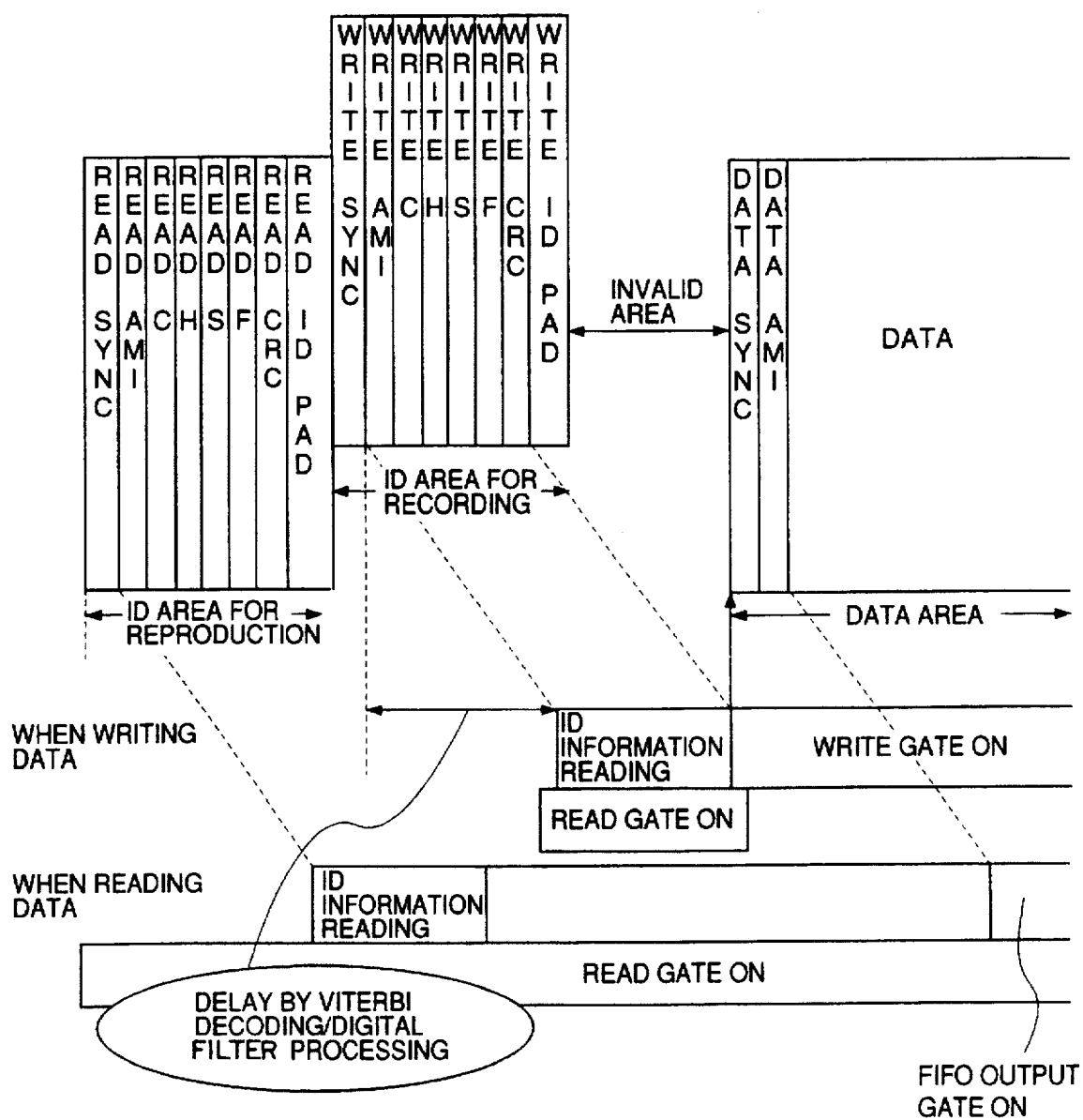
FIG. 21 is a timing chart in a case where the maximum likelihood decoding is conducted and identification information for reproduction is written ahead of that for recording.

Referring to FIG. 20, the fifth embodiment will be described next. When data is written, after an ID for recording is read before the head proceeds to the data area, there is an ID for reproduction, and while the head is passing over the ID for reproduction, the ID for recording can be recognized, so that data can be written in the data area without an invalid area being required. When data is read, it takes time for the ID for reproduction to be recognized, but likewise the digital filter processing and the Viterbi decoding take time, so that no problem arises when an ID area for reproduction and a data area are arranged continuously without an invalid area therebetween. As illustrated, the effect of the delay due to the Viterbi decoding and the digital filter processing can be lessened by arranging an ID for recording physically ahead of the ID for reproduction.

Figure 22:
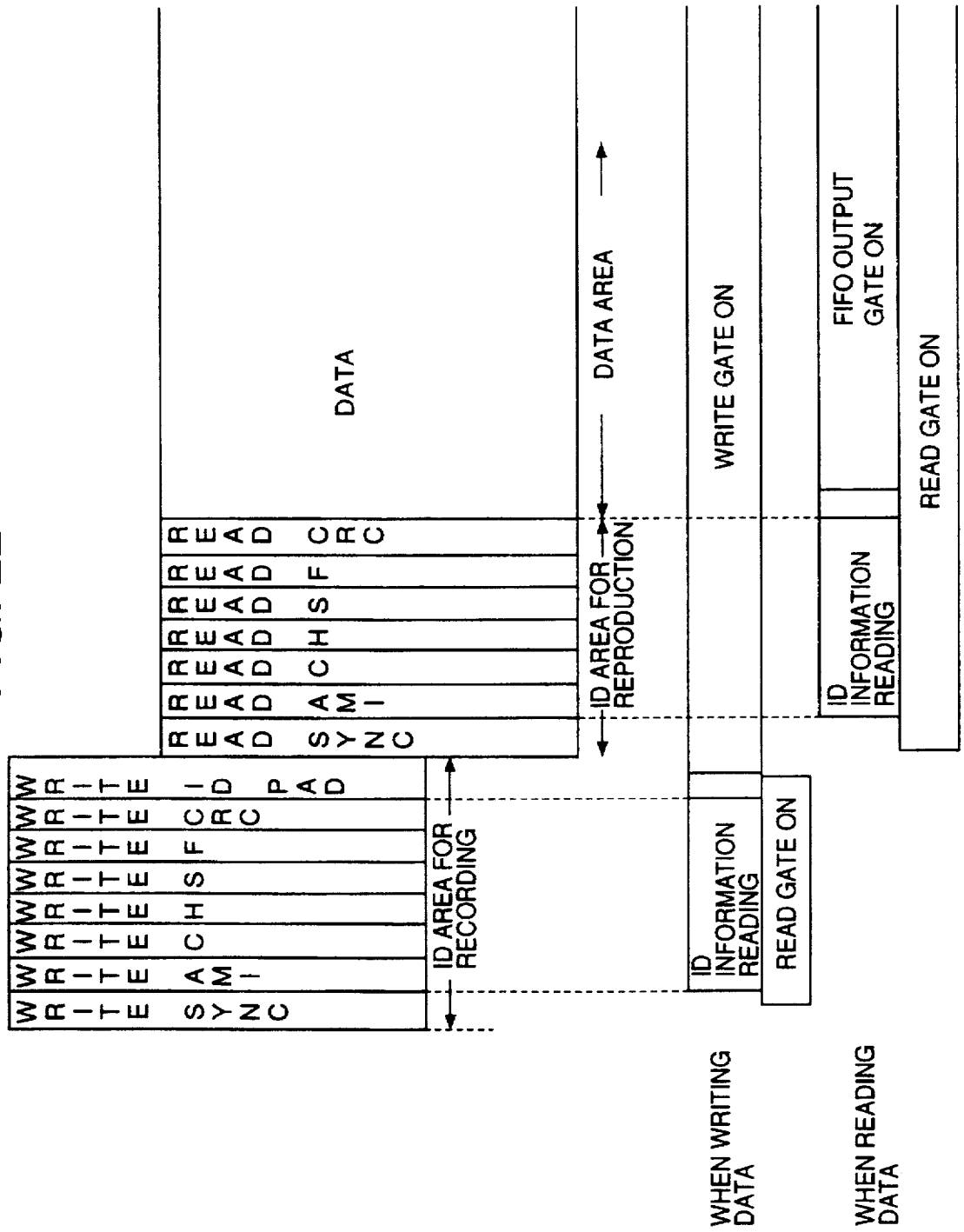
FIG. 22 is an operation timing chart in a sixth embodiment of the present invention.
Figure 23:
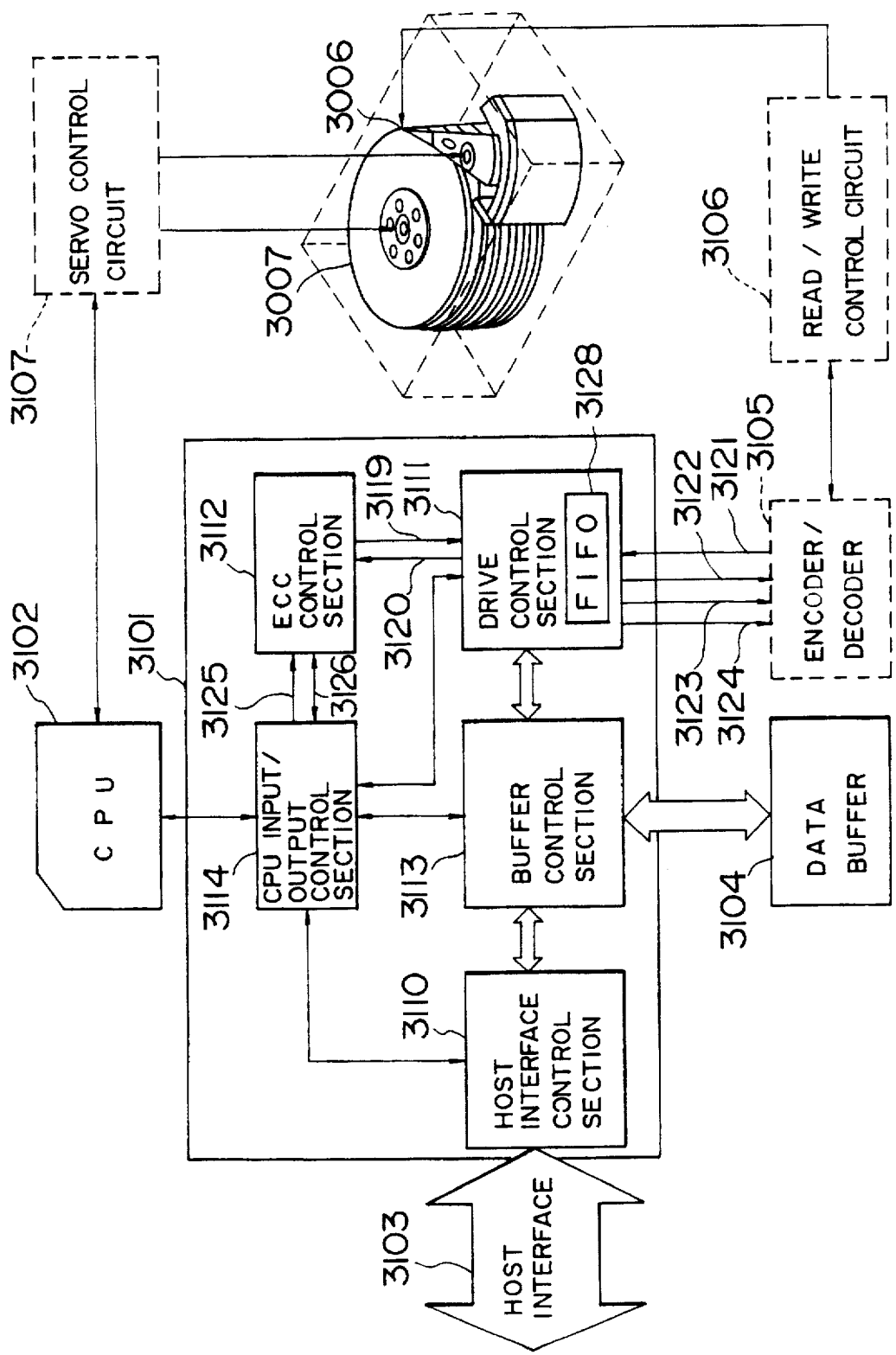
FIG. 23 is a block diagram of a small-size disk for realizing the sixth embodiment of the present invention.

A sixth embodiment of the present invention will be described with reference to FIGS. 22 and 23. FIG. 23 is a diagram showing the configuration of a system for realizing the sixth embodiment. This system configuration diagram is almost identical with FIG. 4 showing the system configuration of the fourth embodiment, except that the ECC control section 3112 performs ECC only for the data area, and that a FIFO unit 3128 for storing data read from the drive is installed in the drive control section 3111.

The sixth embodiment will be described next with reference to FIG. 22. The separate provision of the ID for recording and the ID for reproduction so as to correspond to the construction of the dual head 3006 gives rise to problems of an increased ID area and a decreased formatting efficiency. In the sixth embodiment, when data is written, the ID area for recording is read, and if the read ID information agrees with the ID of an object sector in which information is to be written, the ID for reproduction and data are written successively. When data is read, the ID area for reproduction and the data area are read successively, and data is input into the FIFO 3128. If the read ID information is the ID of the object sector, the data stored in the FIFO 3128 is transferred to the data buffer 3104. If the read ID information is not the ID of the object sector, the data stored in the FIFO 3128 is invalidated. Since the ID for reproduction and the data can be read with the same reading head, by performing control as described, if the ID for recording is placed physically ahead of the ID for reproduction, the synchronization pattern area (DATA SYNC, DATA AMI) between the ID area for reproduction and the data area shown, for example, in FIG. 20 can be omitted.

Figure 24:
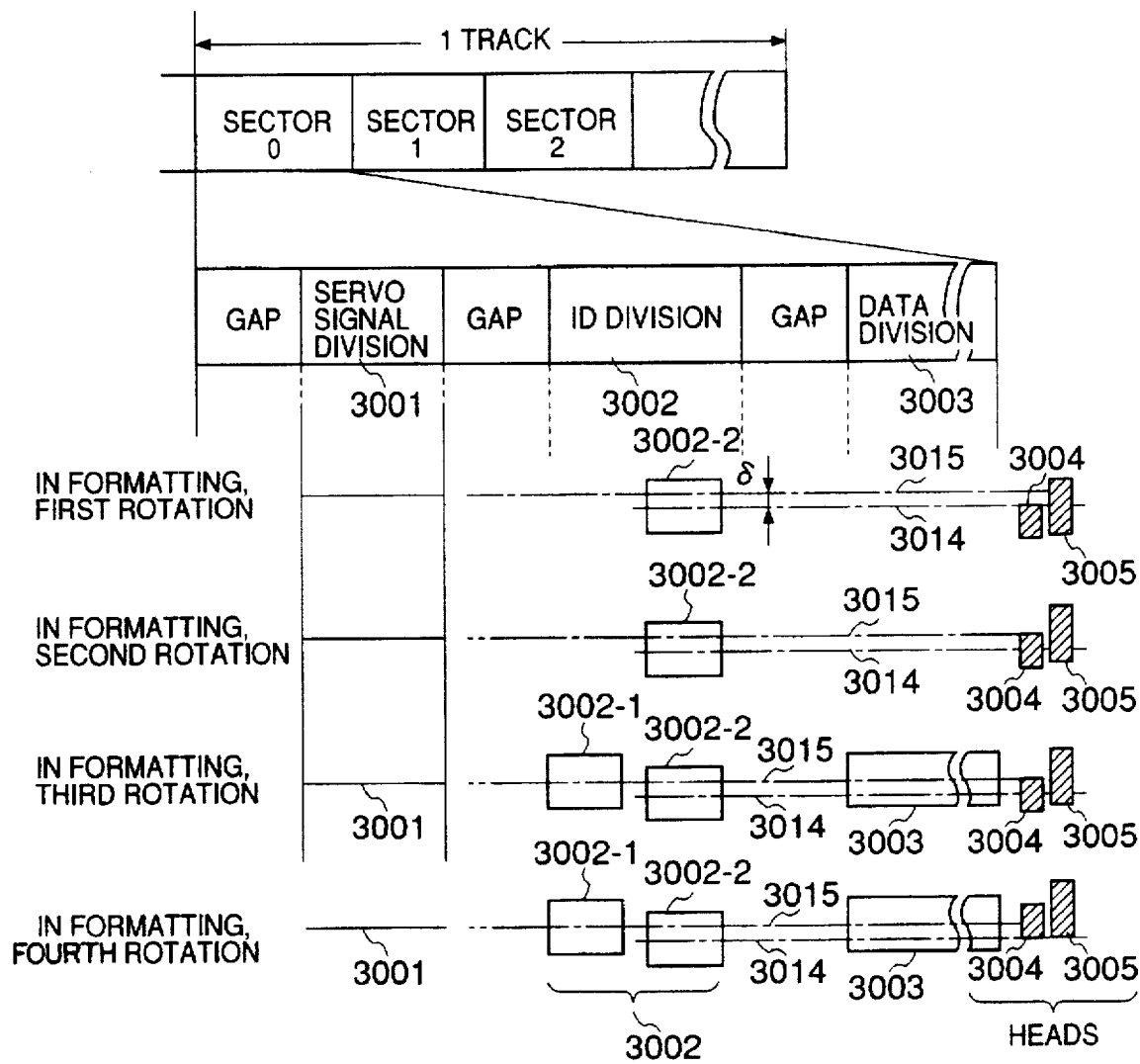
FIG. 24 is a format operation timing chart in a case where identification information for reproduction is written ahead of that for recording.
Figure 25:
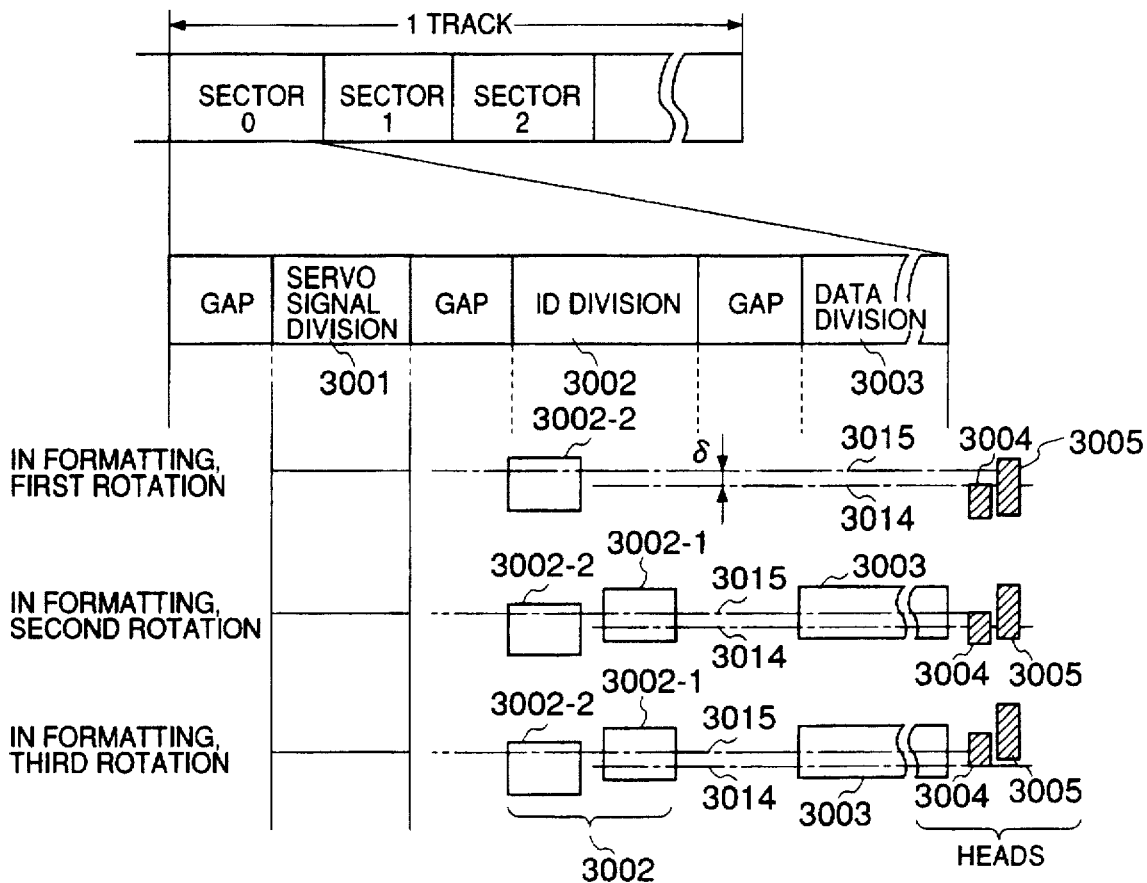
FIG. 25 is an operation timing chart in a seventh embodiment of the present invention.

Next, a seventh embodiment of the present invention will be described with reference to FIGS. 24 and 25. The seventh embodiment concerns formatting. FIGS. 24 and 25 are schematic diagrams showing the track format.

Referring to FIG. 24, description will be made of problems with a case where the ID for reproduction is written first. As shown in FIG. 24, in formatting, in the first rotation, the center of the recording head 3005 is positioned to the recording ID writing line 3014 and a recording ID division 3002-2 is recorded. In the second rotation, the center of the reproducing head 3004 is positioned to the recording ID writing line 3014 and the recording ID division 3002-2 is checked to see if it has been written correctly. In the third rotation, with regard to the ID number written correctly, the center of the recording head 3005 is positioned to the reproduction ID writing line 3015, and the reproduction ID division 3002-1 and the data division 3003 are written. In the fourth and final rotation, the center of the reproducing head 3004 is positioned to the reproduction ID writing line 3015 and the reproduction ID division 3002-1 and the data division 3003 are checked to see if they have been written correctly. In the case where the ID for reproduction is written first as described above, a minimum time of four rotations and the head positioning time is required to format one track. To know whether the recording ID and the reproduction ID accord with each other, there is no other way but to count the number of sectors from the start of writing.

Next, a case where the ID for recording is written first will be described with reference to FIG. 25. As shown in FIG. 25, in formatting, in the first rotation, the center of the recording head 3005 is positioned to the recording ID writing line 3014 and the recording ID division 3002-2 is recorded. In the second rotation, the center of the reproducing head 3004 is positioned to the recording ID writing line 3014, and the recording ID division 3002-2 is checked to see if it has been written correctly. In addition, at this time, the center of the recording head 3005 is positioned to the reproduction ID writing line 3015, and the reproduction ID division 3002-1 and the data division 3003 are written. In the third and final rotation, the center of the reproducing head 3004 is positioned to the reproduction ID writing line 3015, and the reproduction ID division 3002-1 and the data division 3003 are checked to see if they have been written correctly. In the case where the ID for recording is written first, formatting one track can be done in a minimum time of three rotations and the head positioning time. And, the ID for reproduction can be written after the ID for recording has been read and confirmed, which results in an improvement of reliability of the ID.

Figure 26:
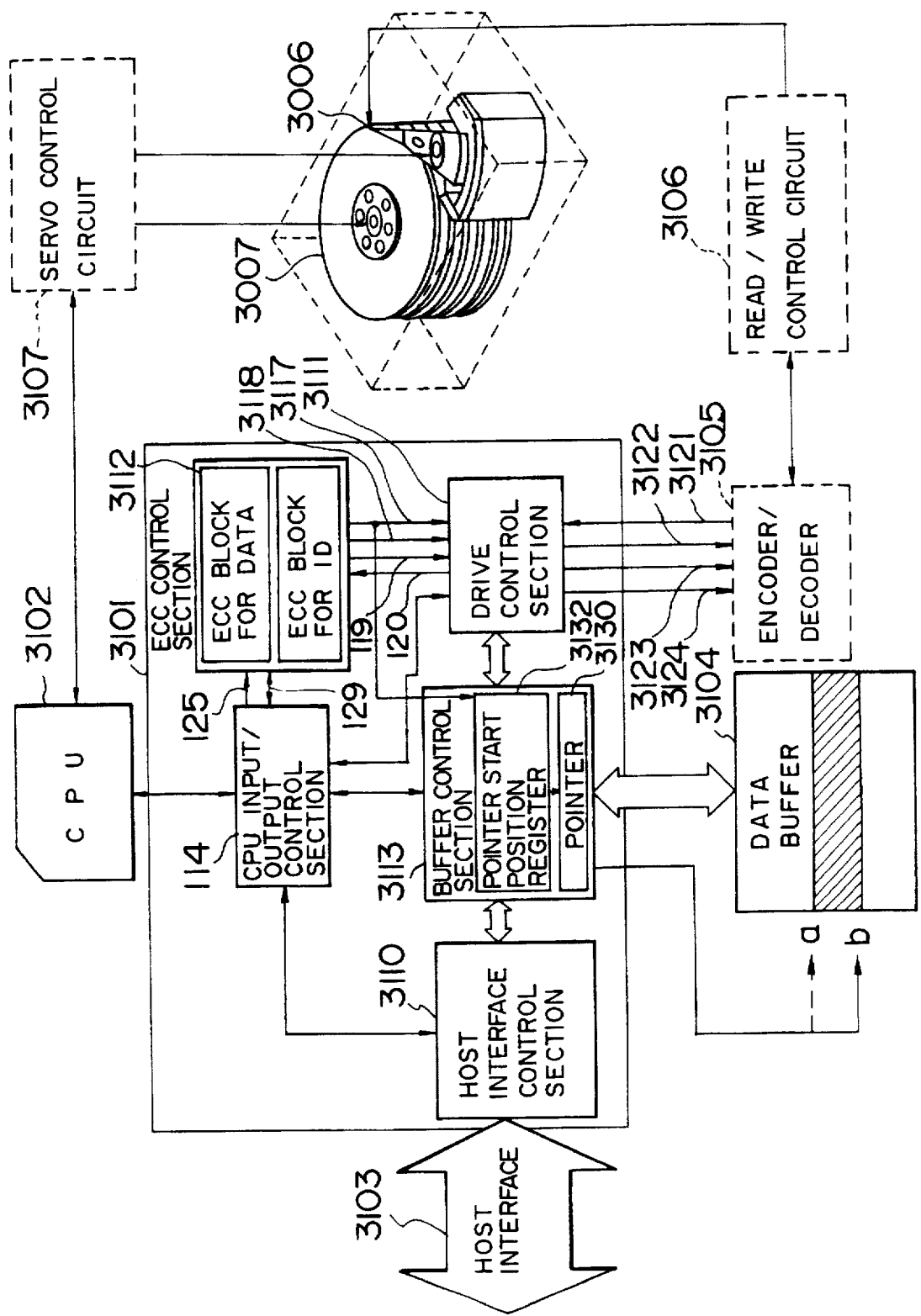
FIG. 26 is a block diagram of a small-size disk for realizing an eighth embodiment of the present invention.
Figure 27:
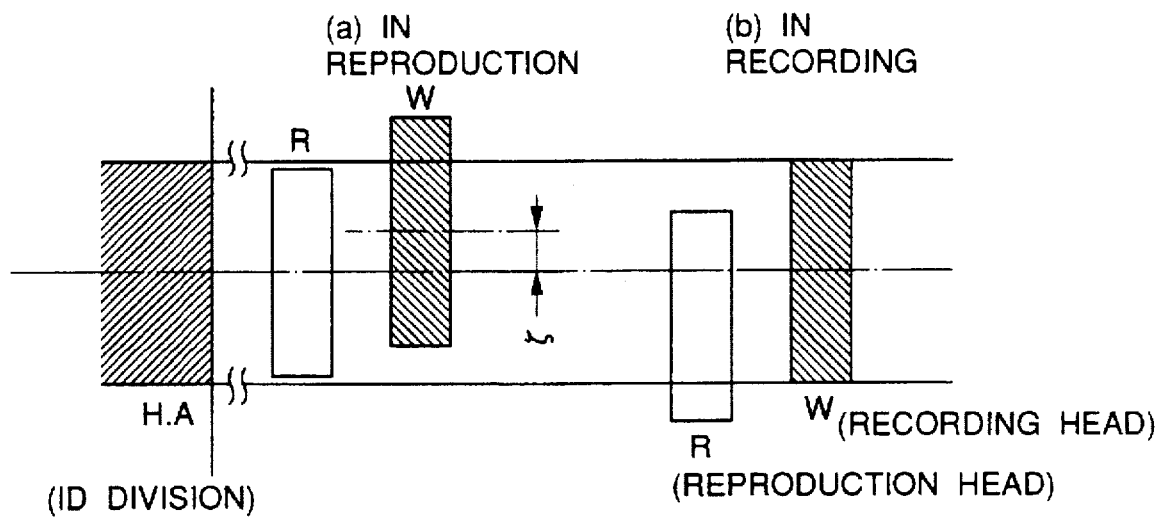
FIG. 27 is an explanatory diagram of head positions for recording and reproduction.

An eighth embodiment of the present invention will be described with reference to FIG. 26. FIG. 26 is a diagram showing the configuration of a system for realizing the eighth embodiment. This system configuration diagram is almost identical with FIG. 4 showing the system configuration of the first embodiment, except that the buffer control section 3113 includes a pointer 3130 showing the current address of a data buffer 3104 and a pointer start position register 3132 for storing the pointer at the start position of a sector. The operation in recording data is the same as in the fourth embodiment. When data is reproduced, ECC correction of the ID for reproduction is performed. If the data area starts to be read by the head while ECC correction is in progress, the moment data starts to be read, the value "a" of the pointer indicating the current address of the data buffer is stored in the pointer start position register 3132. Data read from the disk 3007 is sent through the drive control section 3111 and the buffer control section 3113, and written beginning at the address "a" of the data buffer 3104. If at the end of ECC correction of the ID for reproduction, if the ECC correction is successful and the corrected value of the ID for reproduction is the same as the expected ID value, the data to be read out continues to be read and transferred to the data buffer. If at the end of ECC correction of the ID for reproduction, the ECC correction turns out to be a failure or if the corrected value of the ID for reproduction does not accord with the expected ID value, the reading of data is terminated and the transfer of read-out data to the data buffer is terminated, too. Then, the value "a" in the pointer start position register 3132 is loaded in the pointer 3130 and a start of the next sector is awaited. By the arrangement described, data of the next sector is written beginning again at the address "a" of the data buffer. By control implemented as described, in the eighth embodiment, even if a data area corresponding to the ID area is placed just behind the ID area, after the ECC correction of the ID area is finished, data can be read or written in the data area corresponding to the ID area without any rotational delay. Furthermore, wrong data is prevented from being transferred to the host computer. Yet another embodiment of the disk type recording and reproducing apparatus according to the present invention will be described taking its application to a magnetic disk unit as an example.

This embodiment relates to a magnetic disk unit which is provided with a dual head and which positions the magnetic head using the data surface servo system.

A ninth embodiment of the present invention will be described.

Figure 29:
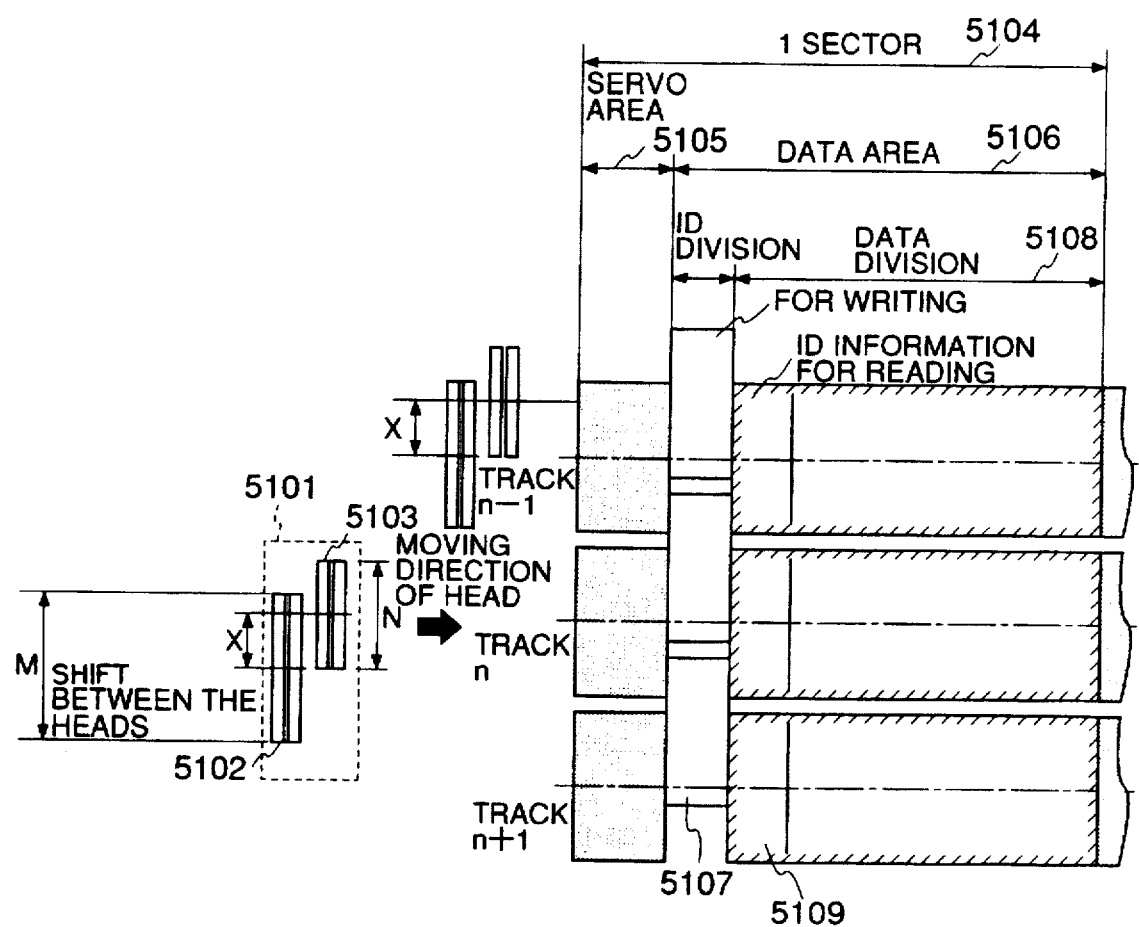
FIG. 29 is an explanatory diagram showing a format pattern in a ninth embodiment of the present invention.

FIG. 29 shows a format pattern of the magnetic disk type recording medium according to this embodiment.

In FIG. 29, numeral 5101 denotes the magnetic head viewed from a direction perpendicular to the disk surface. This magnetic head is a dual head including a writing head 5102 and a reading head 5103. As mentioned earlier, the use of a dual head is accompanied by a problem of a shift between the core centers of the writing head 5102 and the reading head 5103. The reason is that currently the following accuracy of the head permissible in reading and writing data with the magnetic head is 0.5 lmpp, but the shift of the core centers that occurs in the manufacturing process is as large as about 2 lm.

As shown in FIG. 29, the format pattern in this embodiment is formed by a servo area 5105 for servo control over the data surface and a data area 5106. The data area includes an ID division 5107 and a data division 5108. The ID division 5107 is located in a position shifted with respect to the servo area 5105 and the data division 5108 by the shift X between the core centers of the writing head 5102 and the reading head 5103.

In this case, only one servo area 5105 for servo control over the data surface is provided for common use in writing and reading. The center line of the servo area 5108 coincide with the center line of the data division 5108. In a reading operation, the heads can be positioned in the conventional manner, that is, by reading the servo information in the servo area 5105 and ID information 5109 in an ID area of the data division 5108 with the reading head 5103. In formatting, the shift X between the core centers of the writing head 5102 and the reading head 5103 is first obtained. When writing, the signal strength, as the target of positioning, of the position signal of the servo area 5105 to be read with the reading head 5103 is set so that the reading head 5103 is positioned offset by the shift X between the core centers, and as a result, the reading head 5103 is positioned to coincide with the center of the write ID division 5107 and the writing head 5102 is positioned to coincide with the center of the data division 5108. The positioning as described above is referred to as offset positioning. By offset positioning, when writing data, the reading head 5103 reads the write ID division 5107 and the writing head 5102 can write data correctly in the data division 5108.

In this embodiment, only the ID division for writing is provided in advance, and the ID for reading is added as ID information 5109 at the beginning of the data division. By so doing, in contrast to a case where ID information for reading is provided in the ID division, information, such as SYNC, AM, PAD, WSPLICE, other than fundamental information such as a sector address can be obviated.

Therefore, unlike in the conventional magnetic disk unit using a dual head, the capacity for storing user data can be increased in the whole disk unit.

Figures 30A, 30B, 30C:
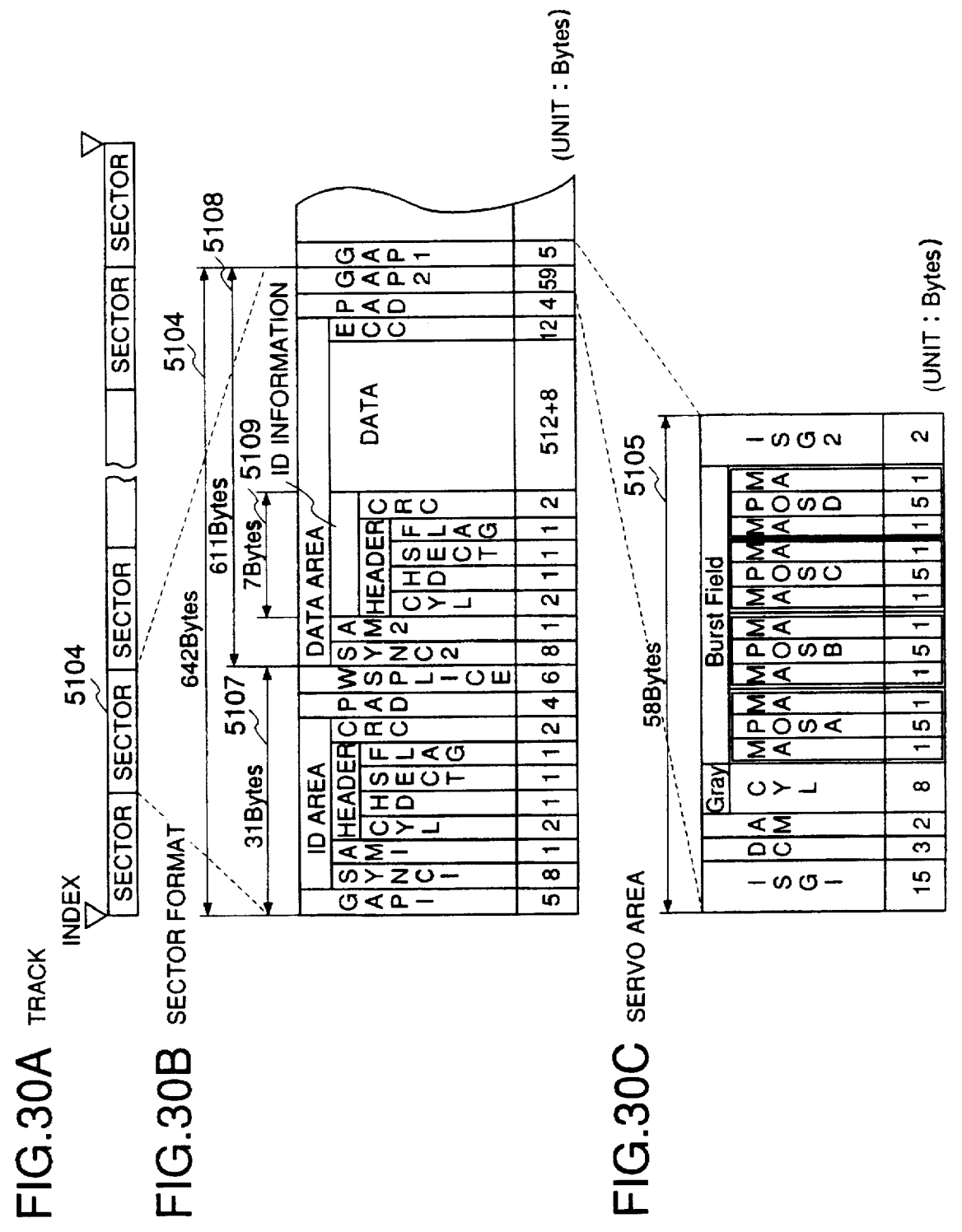

FIGS. 30A to 30C show details of the format pattern.

Those portions shown in FIGS. 30A to 30C are the same as those portions shown in FIGS. 39A to 39C using the same names.

As shown in FIGS. 30A to 30C, in this embodiment, ID information for reading is included in the data area. The number of bytes required in the write ID area to represent the same contents as the ID information for reading amounts to 31 bytes because the write ID area has to include additional information, such as GAP, etc., required for existence of this write ID area. In contrast, the capacity for the ID information for reading is no more than seven bytes, which is equal to or less than one-fourth of the capacity for the ID information for writing. Accordingly, in a magnetic disk unit adopting a dual head, if this format is used, the sector capacity is 642 bytes.

On the other hand, if both write and read ID areas are provided in the conventional disk unit, the sector memory capacity amounts to about 666 bytes. This means that according to this embodiment, a sector with a smaller capacity, specifically 24 bytes (about 4%) smaller, than the capacity of the conventional sector can store the same amount of user data as in the conventional sector.

As described above, by using the format shown in FIG. 29, a large-capacity magnetic disk unit with the dual head can be realized.

In the format shown in FIGS. 30A to 30C, HEADER information is recorded only once in each of the write ID area and the read ID area. However, because today the recording medium is acquiring a progressively higher density and the bit error rate is deteriorating, in order to avoid ID unreadability at sector addresses resulting from bit errors, HEADER information may be recorded more than once in both the write ID area and the read ID area.

Also, in the ECC area in the data area, ECC data, including ECC data for both the ID information for reading and user data, may be stored. Alternatively, ECC data specifically for the ID information for reading may be stored with the ID information for reading and ECC data specifically for the user data may be stored in the ECC area in the data area. By this arrangement, the reliability of ID information is improved, so that the verification step of the ID information, which has conventionally been performed each time ID information is written, may be omitted in the case of ID information for reading. Furthermore, the reliability of the write ID area division may be enhanced by adding ECC data to the CRC data in the write ID area division.

The format used with the magnetic disk unit in the ninth embodiment has been described. Description will now be made of a formatting process for realizing this format.

The formatting process is a series of steps, such as assigning addresses to the sectors on the recording medium, verifying if recorded data can be read correctly from the medium to detect defects of the medium, and an alternate sector process and an alternate track process which prevent sectors or tracks having defective portions from being used to store user data.

The formatting process is performed as described below.

Figure 31:
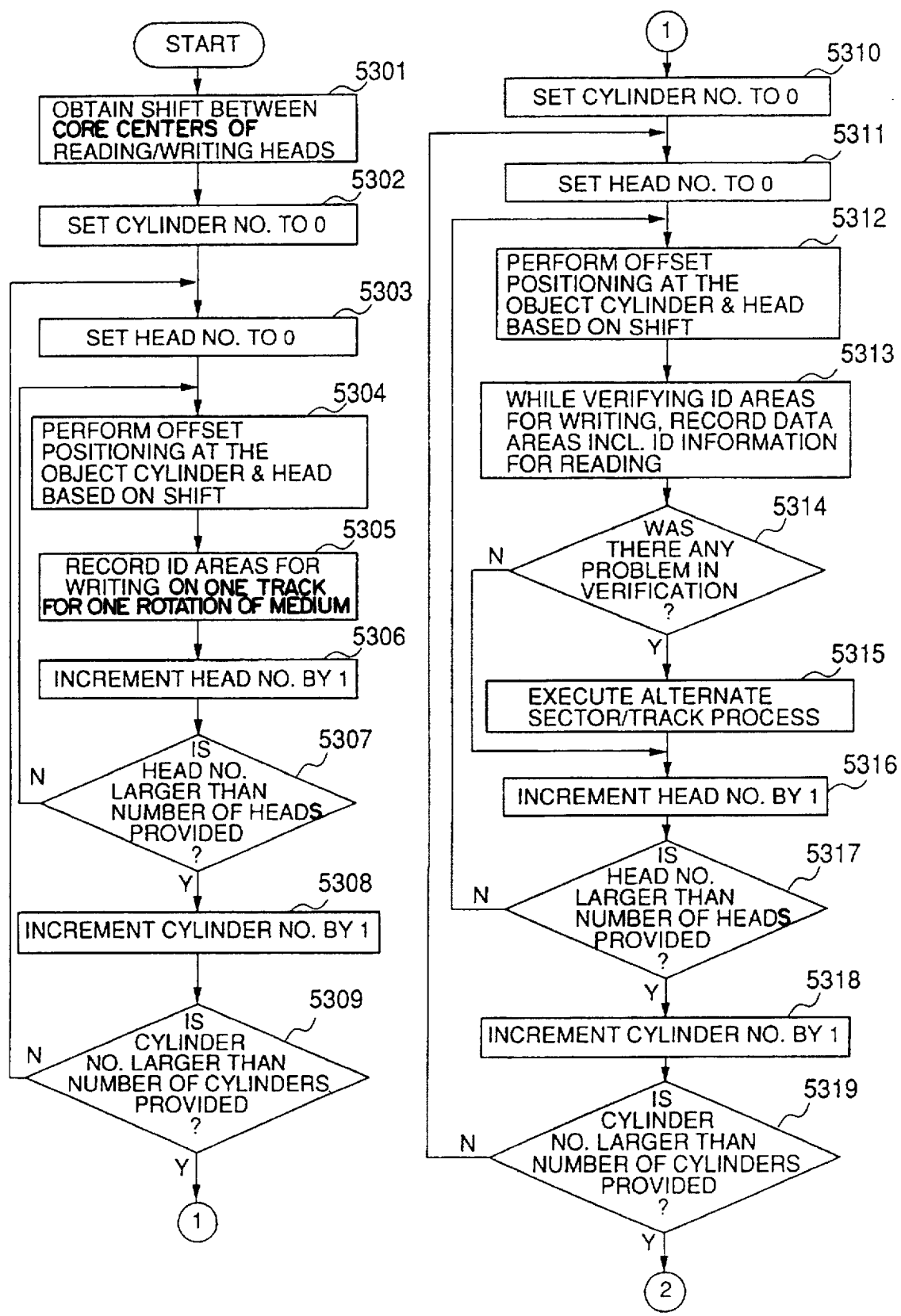
FIG. 31 is a flowchart showing a first half of the formatting procedure in the ninth embodiment of the present invention.
Figure 32:
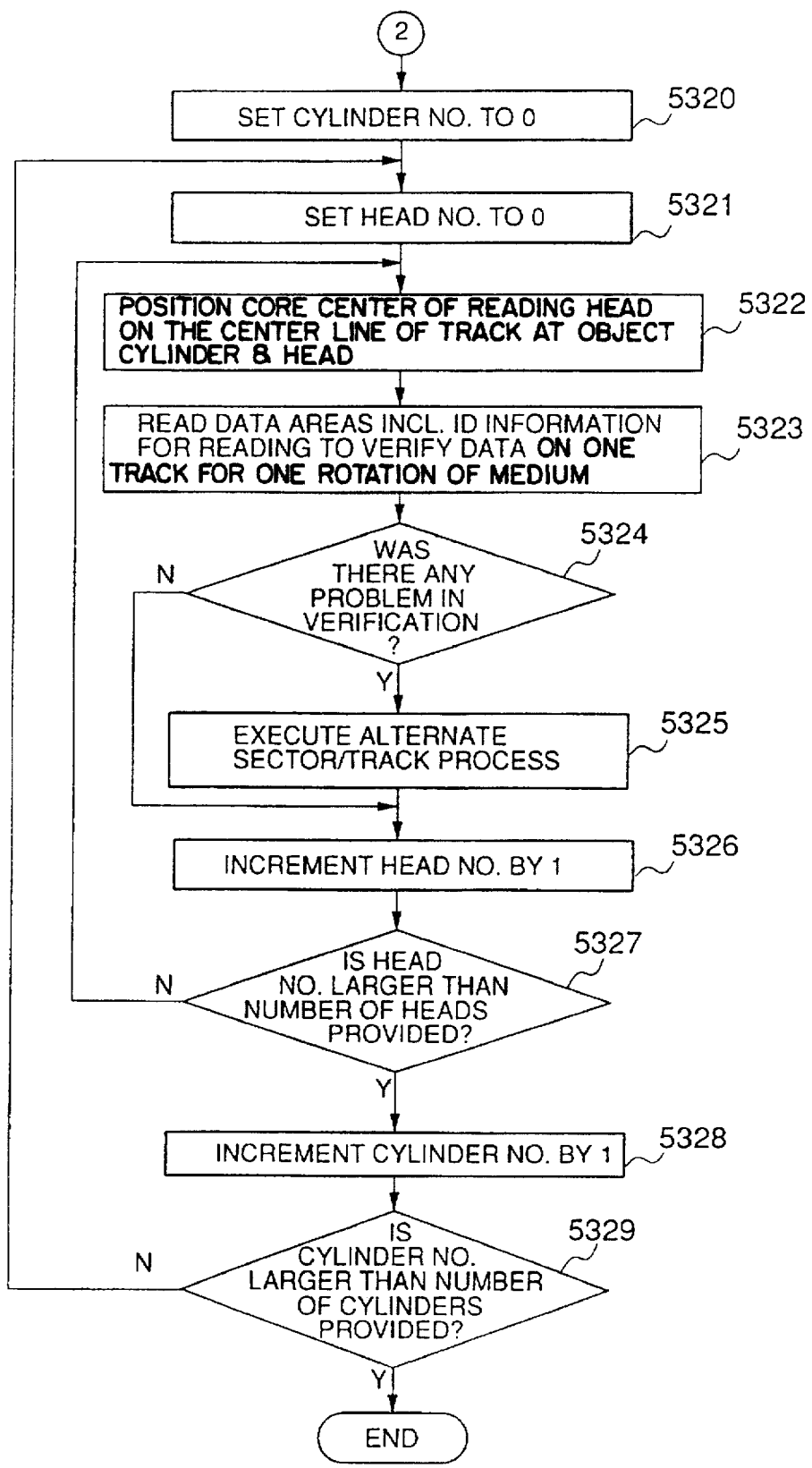
FIG. 32 is a flowchart showing a second half of the formatting procedure in the ninth embodiment of the present invention.

FIGS. 31 and 32 show the steps of the formatting process.

When data is written in the servo area by a servo writer prior to the formatting process, the shift between the core centers of the reading head and the writing head is recorded in a ROM or on the magnetic disk recording medium in the magnetic disk unit. The shift between the core centers is measured as follows. Specifically, the position of the writing head is measured accurately by a laser length measuring system and data is recorded on a track on the medium. Then, the dual head is moved to a position where the value of the output of the reading head when reading the recorded data is at a maximum. The distance the dual head is moved is the shift between the core centers, and this shift is recorded in the ROM or on the recording medium. Alternatively, servo information is recorded on the medium with the writing head, the servo information recorded on the medium is read with the reading head, and from a difference between the expected value of the output of the reading head when reading the recorded servo information and the actual value of the output of the reading head when reading the recorded servo information, a shift between the core centers of the writing head and the reading head is obtained, and this shift is recorded on the magnetic disk recording medium or in the ROM.

In executing an actual formatting process, the recorded shift between the core centers of the dual head is input to the controller (chiefly the CPU) in the magnetic disk unit (Step 5301). Or, instead of previously recording the shift between the core centers of the dual head, a pattern for measuring a shift between the core centers of the dual head is recorded on a specific track on the medium, and each time power is supplied to the disk unit or at fixed periods, the dual head is moved to this track to measure the shift between the core centers, and the measured shift is stored in RAM, for example. In a formatting process, the stored shift is input into the controller in the magnetic disk unit.

In order to start formatting, the cylinder number is set to 0 (5302) and the head number is set to 0 (5303). The writing head is positioned to record the write ID areas at the object cylinder and head (5304). This can be done by positioning the core center of the reading head on the center line of the servo area.

The write ID areas (ID divisions) are recorded at the object cylinder and on one track for one rotation of the medium (5305).

Next, the head number is incremented by one (5306). If at this time the head number is not larger than the number of heads provided in the disk unit, the write ID areas (ID divisions) continue to be recorded at the same cylinder on the medium (5307). If the head number is larger than the number of heads provided, the cylinder number is incremented by one (5308). If the cylinder number is not larger than the number of cylinders provided in the disk unit, the write ID areas are recorded on the tracks of this cylinder (5309). If the cylinder number is larger than the number of cylinders provided, this means that the write ID areas (ID divisions) have been recorded on all disk surfaces.

Then, the read ID information is recorded on the medium. In this writing operation, by taking the shift between the core centers into consideration, the reading and the writing heads are positioned offset with respect to each other in such a way that the core center of the writing head is positioned on the center line of the track. Like the write ID areas (ID divisions), the data areas (data divisions) including ID information for reading are recorded (5310 to 5319).

In order to detect defects on the medium, it is necessary to perform a verification process.

However, while the data areas (data divisions) are being recorded on the medium, the reading head passes right above the write ID areas (ID divisions) previously recorded on all disk surfaces, and if the write ID areas (ID divisions) are read and verified when the reading head passes over them, the formatting time can be reduced (5313 to 5315).

When any problem is detected in the write ID areas (ID divisions) during the verification, if there remains an alternate sector, an alternate sector process is executed, and if there is no alternate sector remaining, an alternate track process is executed (5315).

If no problem is found in the write ID areas (ID divisions), the head number is incremented by one (5316). If at this time the head number is not larger than the number of heads provided, the data areas (data divisions) including ID information for reading continue to be recorded at the same cylinder on the medium (5317). If the head number is larger than the number of heads provided, the cylinder number is incremented by one (5318). If the cylinder number is not larger than the number of cylinders provided, the data areas (data divisions) including ID information for reading are recorded on the tracks of this cylinder (5319). If the cylinder number is larger than the number of cylinders provided, this means that the data areas (data divisions) including ID information have been recorded on all disk surfaces.

Finally, as in the verification of the write ID areas (ID divisions), the data areas including ID information for reading recorded on all disk surfaces are verified (5320 to 5329).

The format as shown in FIG. 29 has thus been realized.

The ID areas or divisions may be recorded at the same time the servo divisions are recorded. By so doing, the ID divisions can be recorded more accurately.

By the formatting process according to this ninth embodiment, while the write ID areas are being checked, the data areas including ID information for reading can be recorded on the medium, with a result that a high-speed formatting process can be realized.

A tenth embodiment of the present invention will now be described.

Figure 33:
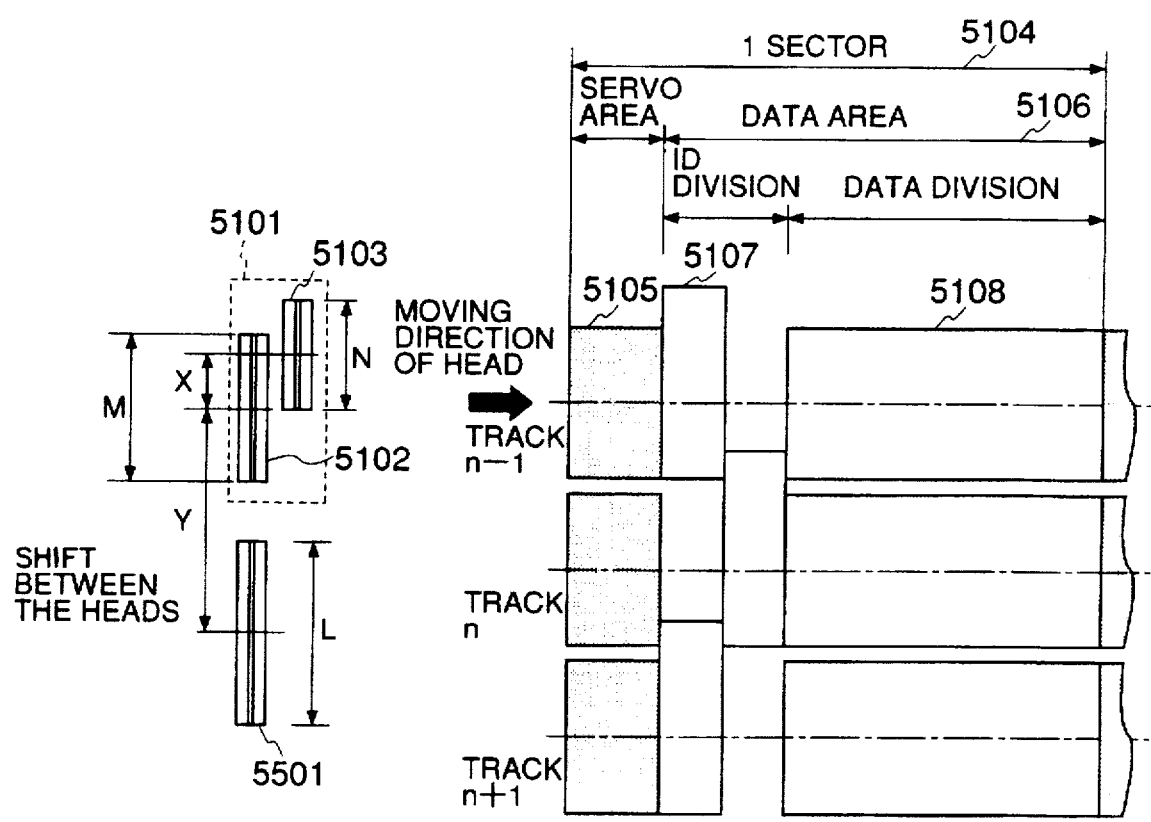
FIG. 33 is an explanatory diagram showing a format pattern in a tenth embodiment of the present invention.

FIG. 33 is a diagram showing the format pattern in the tenth embodiment. Those parts which are the same as those in the format pattern in the ninth embodiment in FIG. 29 are designated by the same reference numerals.

The format pattern in the tenth embodiment realizes a reduction in the time required for writing the ID divisions and for rewriting in the alternate sector process because of common use of a write ID division and a read ID division.

As has been described, in the magnetic disk unit using the dual head, the reason why separate ID divisions for writing and reading are required is because of the shift which occurs between the center cores of the two heads. However, since the ID for writing and the ID for reading are composed of the same items of information, basically it is enough to provide one sector with one ID.

In the tenth embodiment, in the case where the core width of the writing head is denoted by M, the core width of the reading head by N, and the shift between the core centers of the two heads by X, an ID writing 5501, which has a core width of about L, is provided in addition to the writing head and the reading head. L is defined by the following equation 1.

$$((M+N)/2)+X \supset L \qquad \text{Eq.1}$$

The ID writing head 5501, if manufactured using a thin-film head manufacturing process, can achieve a balance with the reading head, so that the output of the read signal hardly attenuates. By writing an ID division with this ID writing head 5501, an ID division corresponding to the wide core width L can be realized. Since this core width L can be obtained from the above equation, even in offset servo control by which the core center of the writing head is positioned on the center line of a track to enable data to be written in the data division, or even when the core center of the reading head is positioned to the center line of a track, it never occurs that the reading head 5103 extends beyond the writing width (in the radial direction) of the ID division, so that one ID division is enough for each sector.

However, since the ID writing width in the radial direction is wide, if the ID areas are located in the same positions in the circumferential direction, the spacing between the tracks depends on the radial recording width of the ID division. So, by shifting the ID divisions in such a way that they have mutually overlapping portions, the track pitch is shortened, by which better use can be made of the recording medium.

As has been described, according to the tenth embodiment, ID division writing can be finished in a single writing operation for each sector, and the track pitch is not increased so that the recording medium can be used to maximum advantage.

FIGS. 34A to 34C show details of the format presented in FIG. 33.

As illustrated, in the tenth embodiment, in addition to the ID area of a given sector itself, because the ID writing head has a large core width, this given sector needs to have a portion of it used as one portion of the ID area of the adjacent track. As a result, the sector capacity of a sector is 666 bytes. However, unlike with a magnetic disk unit with a conventional type dual head which requires two servo areas, one for writing and the other for reading, in this embodiment it is only necessary to provide a sector with a single servo area, so that the required number of bytes is only 58 bytes. This means that in comparison to the conventional sector capacity of 725 bytes, in this embodiment, the user area that can be used to store the user's information is larger by as much as 8%.

The formatting procedure for the format in FIG. 33 is almost the same as in the above-mentioned ninth embodiment (FIGS. 31 and 32). When writing servo data, the shift X+Y between the ID writing head 5501 and the reading head 5103 is obtained and stored in advance. In the flowchart in FIG. 31, when writing the write ID areas on the medium, according to the servo information read with the reading head 5103, the ID writing head 5501 with a wide core width is positioned to the object track while maintaining an offset X+Y with respect to the reading head 5103. In the manner described, ID information can be recorded in desired positions on the medium. When writing data areas (data divisions), the data areas (data divisions) may be recorded on the medium by skipping over spaces for the ID areas (ID divisions) of the adjacent tracks. Needless to say, the data areas (data divisions) in this embodiment do not include ID information for reading.

Figure 35:
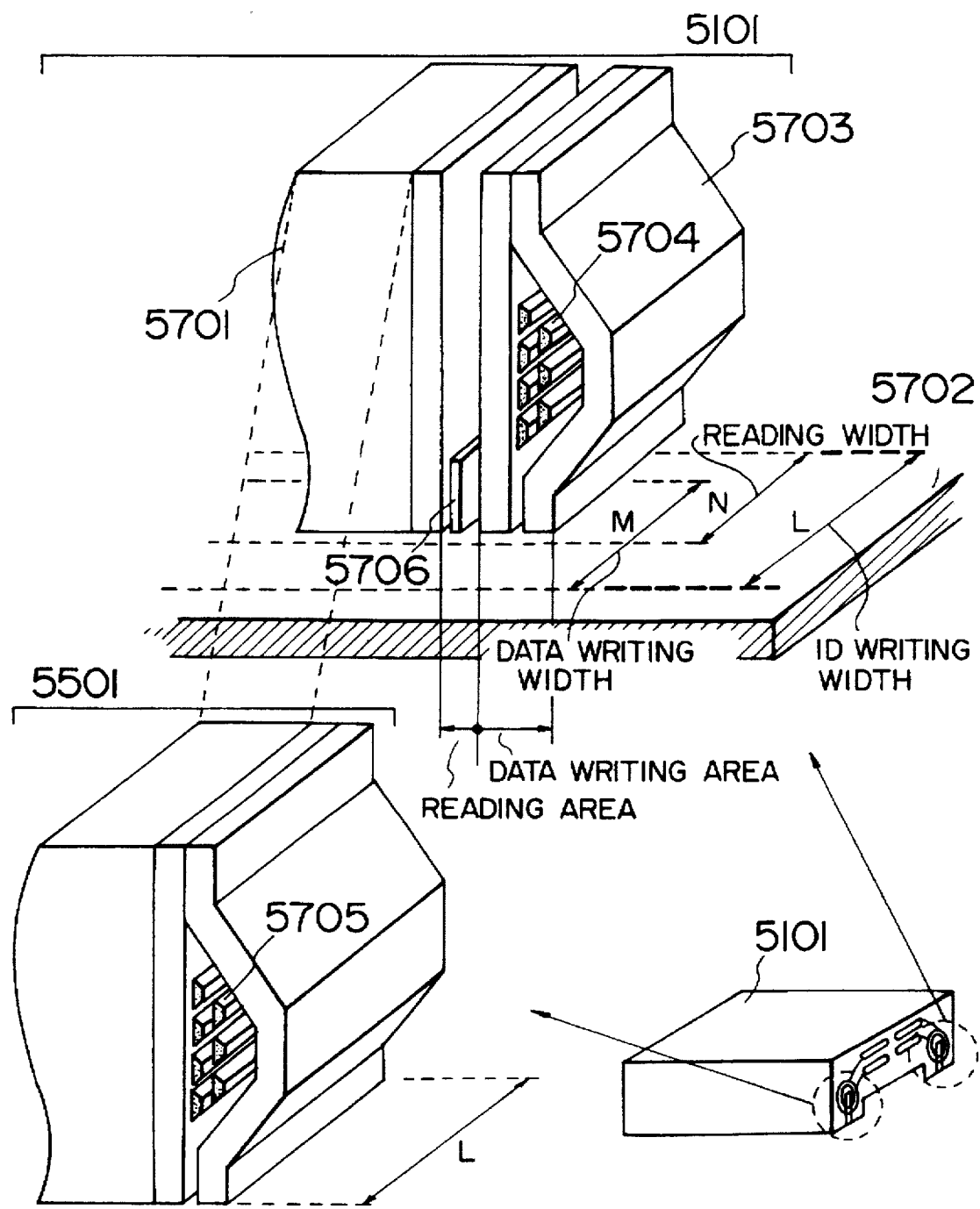
FIG. 35 is an explanatory diagram showing the construction of the magnetic head according to the tenth embodiment of the present invention.

FIG. 35 shows the construction of the dual head according to the tenth embodiment of the present invention.

The magnetic head 5101 has cores formed on a slider 5701 by the thin film process. The magnetic head 5101 includes a data writing head 5703, a data reading head, and an ID writing head 5501.

As for the types of heads, the data writing head 5703 and the ID writing head 5501 are inductive heads, while the data reading head is an MR head utilizing an MR element 5706 having a magnetoresistive effect. As described above, the tenth embodiment requires three cores and the three cores can be manufactured easily by the thin film process. For example, there has been manufactured a type of head, which has inductive heads fabricated at the left and right portions of the slider as shown in the lower right corner of FIG. 35, and one of the inductive heads which has better characteristics is selected and used.

If the core width of the ID writing head is denoted by L, the core width of the data reading head by N, and the shift between the core centers of the data write/read head by X, by designing the magnetic head so that L satisfies the equation 1, the ID area (ID division) can be read at the same rotational angle of the medium when reading and writing data. By the arrangement described, a magnetic head capable of recording the format pattern shown in FIG. 33 can be realized.

Accordingly, in the ninth and the tenth embodiments, in reading, the reading head is positioned to the center of the track, and in writing, the reading head is positioned to the offset position, so that the servo information for reading and writing is used by the reading and the writing heads by taking turns.

Figure 36:
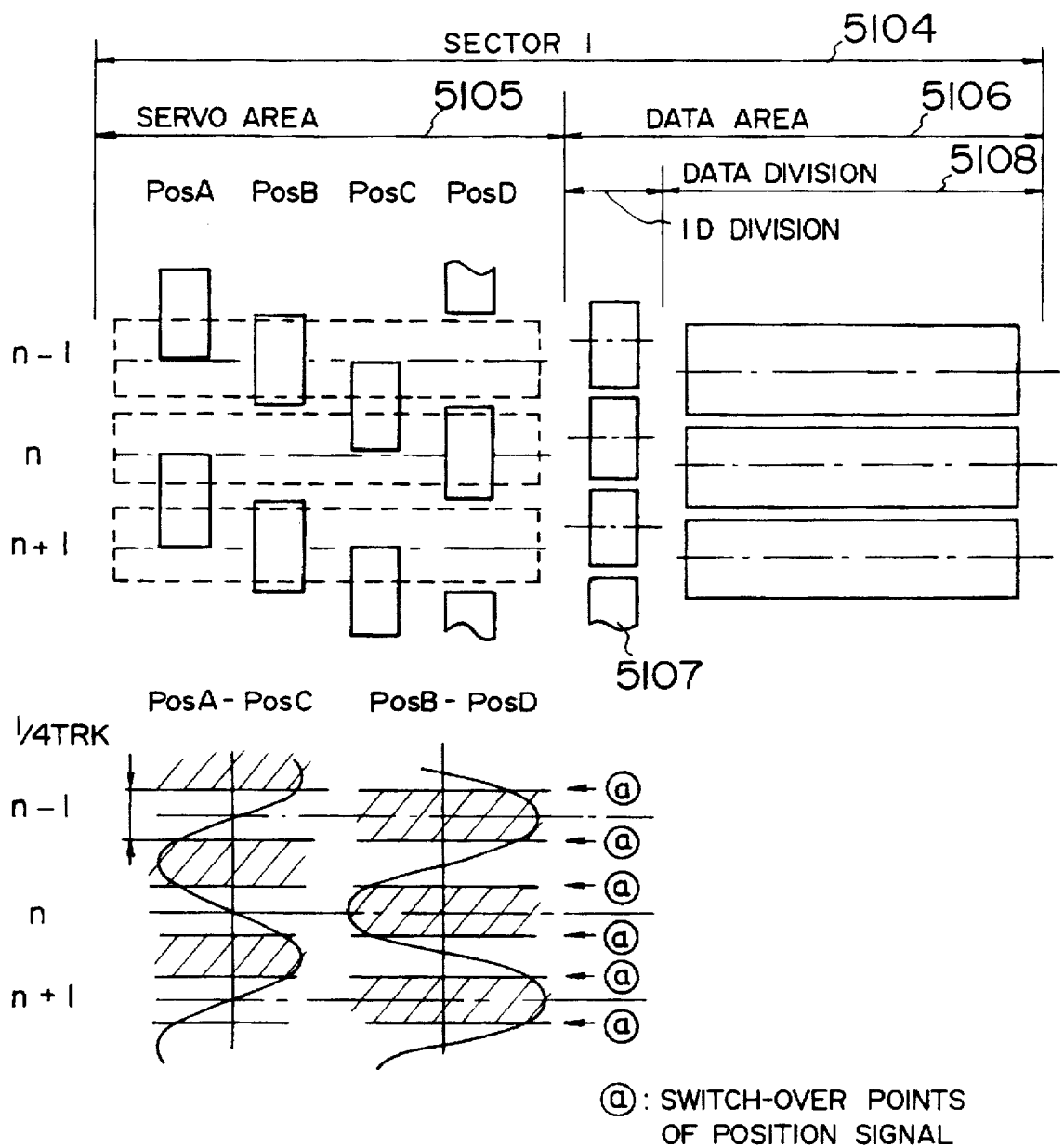
FIG. 36 is a diagram for explaining the relation between the center of the servo signal and the center of the data area using a two-phase servo as an example.

As shown in FIG. 36, in the case of a 2-phase position signal used hitherto, to extract signal portions having linearity, a position signal needs to be switched over from one track to another. When the position signal is switched over, theoretically the position signal strength ought to continue accurately, but it does not owing to switch-over timing or for other reasons, resulting in discontinuity of signal strength at switch-over points.

Therefore, if the position signal at points of such discontinuity is used for offset positioning, the magnetic head vibrates or cannot be positioned properly. Meanwhile, the range in which the linearity of the position signal can be maintained is about ±¼ track from the center of the position signal (in the case of a 2-phase servo signal, the range depends on the travel of the head in the radial direction of the servo signal when servo information is written). In order that the position signal for offset positioning may always stay away from the switch-over points, the servo areas are located offset from the data divisions, and not only in writing but also reading, the magnetic head may be positioned with respect to the write ID division or the read ID division (including the data division) by offset positioning.

In FIG. 36, the hatched regions indicate the portions of the position signal which lack linearity. The symbol ⓐ indicates the switch-over points of the position signal.

Description will now be made of the construction and the operation of the magnetic disk unit which positions the magnetic head according to the various formats described when the ninth and tenth embodiments were described.

Figure 37:
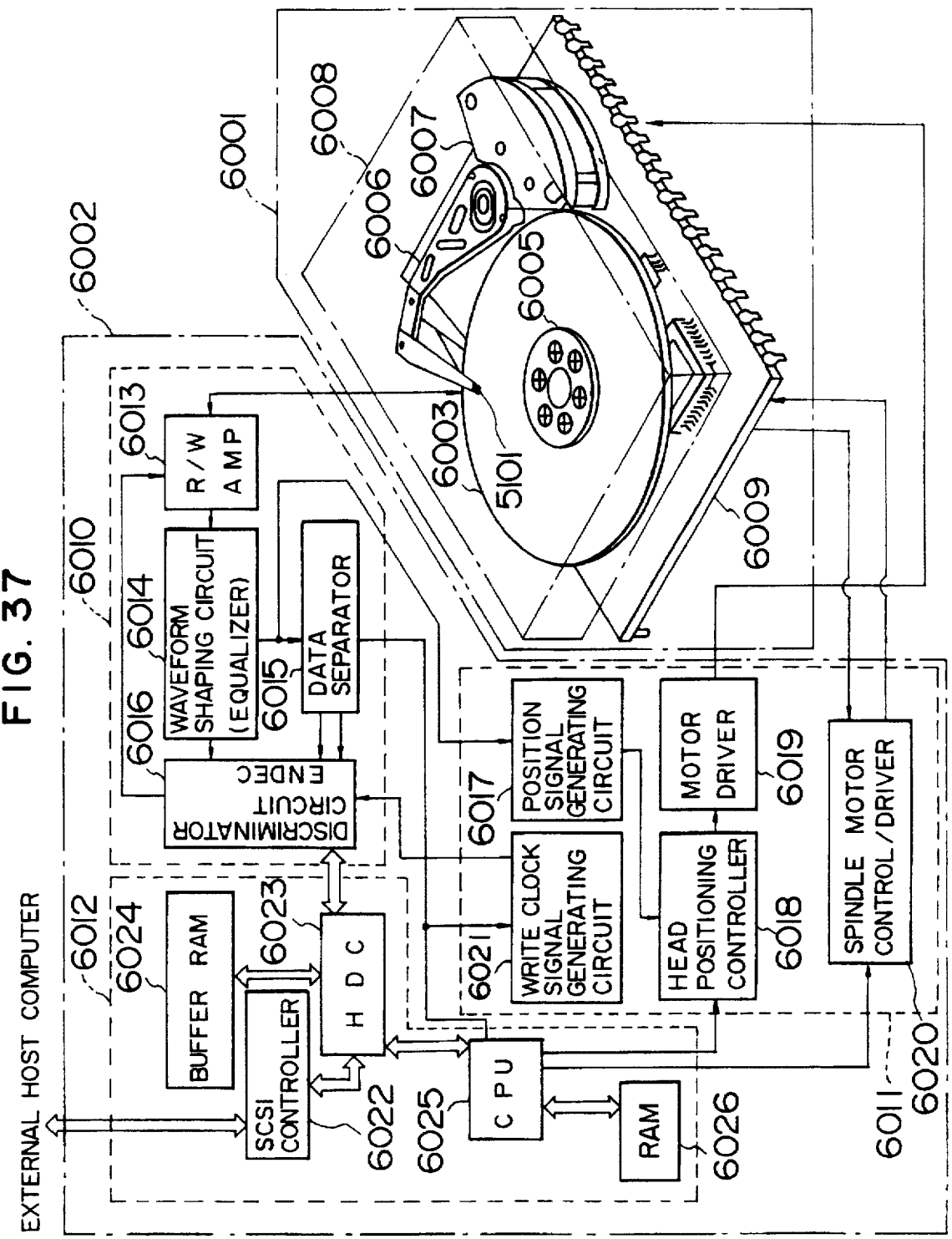
FIG. 37 is a block diagram showing the construction of the magnetic disk unit.

FIG. 37 shows the construction of such a magnetic disk unit.

As illustrated, the magnetic disk unit includes a mechanical section 6001 and an electronic circuit section 6002.

The mechanical section 6001 includes a magnetic disk 6003 for recording data, a magnetic head 5101 for writing and reading data to and from the magnetic disk 6003, a spindle motor 6005 for rotating the magnetic disk, a guide arm 6006 supporting the magnetic head 5101, a VCM (Voice Coil Motor) 6007 for moving the magnetic head 5101, a case 6008 containing the above-mentioned component parts, and a board 6009 having mounted thereon an electronic circuit for controlling the component parts.

On the other hand, the electronic circuit section 6002 includes a read/write functional section 6010 for writing data on the magnetic disk and reading data from the magnetic disk, a mechanism control section 6011 for controlling the position of the magnetic head 5101 so as to position the magnetic head 5101 to a target track on the magnetic disk 6003 and for controlling the rotational speed of the magnetic disk 6003, and a data control section 6012 to transmit data between the read/write functional section 6010 and an external system.

The read/write functional section 6010 includes an R/W amplifier 6013 for recording and reproducing data to and from the magnetic disk 6003, a waveform shaping circuit 6014 for shaping the waveform of the signal read from the magnetic head, a data separator 6015 for extracting basic clock pulses from a read signal, the waveform of which has been shaped by the waveform shaping circuit 6014, and a discriminator circuit 6016 for converting a signal read from the magnetic disk into an NRZ code by using the read signal which has been waveform-shaped by the waveform shaping circuit 6014 and by also using the basic clock pulses extracted by the data separator 6015, and converting an NRZ signal sent from the data control section 6012 into a code suitable for recording on the magnetic disk.

The mechanism control section 6011 includes a position signal generating circuit 6017 for generating position information from a positioning signal read with the magnetic head, a head positioning controller 6018 for performing a magnetic head positioning process based on the generated position information, a motor driver 6019 for sending an output result obtained by the magnetic head positioning process to VCM 6007, a spindle motor control/driver 6020 for controlling the rotational speed of the spindle motor, and a write clock signal generating circuit 6021 for sending a write clock signal to the read/write functional section 6010 according to an output of the position signal generating circuit.

The data control section 6012 includes an SCSI controller 6022 for transferring data to and from an external system according to an SCSI (Small Computer System Interface) protocol, an HDC (Hard Disk Controller) 6023 for converting parallel data received from an external system into data (normally, serial data) suitable for recording and reproduction on the magnetic disk, a buffer RAM 6024 for eliminating a difference between an external system-HDC 6023 data transfer speed and an HDC 6023-magnetic disk 6003 data transfer speed, a CPU 6025 for control of the whole magnetic disk unit, and a RAM 6026 serving as the working area of the CPU.

The magnetic head 5101 is a dual head having a reading head 5103 and a writing head 5102 provided separately.

As described above, in this embodiment, in reading and writing data, the reading head 5103 and the writing head 5102 are positioned to the center of the track (data division), and this positioning of the heads is controlled by the mechanism control section 6011.

The above-mentioned positioning operation will be described in the following.

From an external system (host computer), a command is sent to the magnetic disk unit according to the SCSI protocol. This command is sent through the SCSI controller 6022 and the HDC 6023 to the CPU 6025. The CPU 6025 interprets the received command, and decides if a request from the external system is to read data or write data, and according to the result of decision, issues an instruction to the section concerned. The CPU 6025, in compliance with the result of interpretation of the command, issues an instruction that the magnetic head should be positioned to an object track.

The RAM 6026 stores in advance a correction value which indicates the shift from the track center, by which shift the magnetic head is to be offset when the magnetic head is positioned for reading or writing. When the format pattern shown in FIG. 29 or 33 is used, the correction value is zero in reading, and the correction value is the shift between the core centers of the reading head and the writing head in writing. As has been described, not only in writing but also in reading, when the magnetic head is positioned with respect to the write ID division or the read ID division (including the data division) by offset positioning, the correction value is not zero either in reading or writing.

The CPU 6025 issues an instruction to the mechanism control section 6011 to position the magnetic head to an object track, and depending on whether the operation is to write or read, reads a correction value from RAM 6026 and supplies it to the mechanism control section 6011.

The head positioning controller 6018 of the mechanism control section 6011, by using position information generated by the position signal generating circuit 6017 and the specified object track and the correction value, obtains the amount of travel for positioning the magnetic head as discussed in the description of the first and second embodiments, and sends the result to the motor driver 6019. By these steps, offset positioning can be achieved. Therefore, the dual head can be positioned accurately both in writing and reading.

As mentioned earlier, as the correction value stored in the RAM 6026, the shift measured in the formatting process by using a laser length measuring system may be stored on the magnetic disk or in ROM under supervision of the CPU 6025, and read into the RAM 6026 when turning on the power supply. Or, when the power is supplied to the magnetic disk unit, the shift between the writing head and the reading head may be measured and stored in memory. If the shift varies due to thermal expansion resulting from the operation of the magnetic disk unit, the shift may be updated at specified time intervals.

In the preferred embodiments described above, since ID information for reading is written in the data division, unlike in the case where ID for reading is provided independently of the data division, those areas which are required for reading, such as SYNC, AM, PAD, and WSPLICE areas, can be eliminated, resulting in an expansion of the user data area. In terms of capacity, an ID division has a capacity about 1.2 times as large as before, and therefore can contain the ID divisions for writing and reading so as to be compatible with the dual head, and as a result, the disk capacity can be utilized to advantage to store user data.

Further, due to the provision of the ID writing head having a core width that can cover the shift between the core centers of the dual head, the ID writing operation can be finished in a single operation. This ID area (ID division) shows the address of an object sector and also serves as a place for storing a code to indicate if the sector is defective. Therefore, even when an alternate sector process or the like is performed and it becomes necessary to update the ID information, it is only necessary to update the ID information once. This operation can be finished in the same time as in the conventional updating of the ID area. As a result, a disk unit with a dual head, which is capable of high-speed updating of ID information, can be realized.

Further, by measuring the shift between the core centers of the writing and the reading heads by using a laser length measuring system when writing servo data and writing the ID divisions, ID divisions can be recorded on the medium with high accuracy.

Considering the discontinuity at the switch-over points of the position signal, the write ID division and the read ID division (including the data division) are recorded by being respectively offset from the track center, so that accurate offset positioning can be realized.

In order to realize the various formats explained in the description of the embodiments, the formatting process function may be provided in the HDC (Hard Disk Controller).

The embodiments of the disk type recording and reproducing apparatus according to the present invention have been described as being applied to a magnetic disk unit, for example, but the present invention can be applied similarly to a floppy disk drive unit and other types of disk type recording mediums, such as an optical disk.

In the present specification, the objects of the present invention have been referred to as the first to fifth objects, but this is only for convenience of description, and this numerical order does not represent the order of importance, for example.

What is claimed is:

1. A method for recording on and reproducing from a magnetic disk, the magnetic disk having a recording area divided into a plurality of sectors, each of the sectors having an ID area for recording control information relating to data and a data area for recording the data, the data area corresponding to the ID area and being provided adjacent to and behind said ID area in the same sector as the ID area, the method comprising the steps of:

recording said control information in said ID area, the control information including an error correcting code; and correcting errors in said control information in said ID area using said error correcting code before reading the data from the data area corresponding to said ID area and provided in the same sector as the ID area or before recording data in the data area corresponding to said ID area and provided in the same sector as the ID area;

wherein said magnetic disk is a hard disk using an MR head, a write ID area for writing data, and a read ID area for reading data; and wherein said write ID area is provided ahead of said read ID area such that when data is written, error correction of said write ID area is finished before data is written in the data area corresponding to said write ID area and provided in the same sector as the write ID area.

2. A method for recording on and reproducing from a magnetic disk according to claim 1, wherein when data is read, read data is input to a FIFO (first-in first-out) unit, and when the error correction of said read ID area is successful, data is transferred from said FIFO unit to a data buffer, and if the error correction of said read ID area fails, the data is not transferred from said FIFO unit to said data buffer.

3. A method for recording on and reproducing from a magnetic disk according to claim 2, wherein when data is read, the error correction of said read ID area is finished while a synchronization pattern of said data area is read and before data in the data area corresponding to said read ID area and provided in the same sector as the read ID area is read.

4. A magnetic disk recording and reproducing apparatus comprising:

means for inserting an error correcting code relating to control information in said control information, the control information relating to data;

recording control means for recording the control information and the data in a recording area of a magnetic disk, the recording area having a plurality of sectors, each of the sectors having an ID area for recording said control information and a data area for recording said data, said data area corresponding to said ID area and being provided adjacent to and behind said ID area in the same sector as the ID area; and error correcting means for correcting errors in said control information in the ID area using said error correcting code before said data in said data area corresponding to said ID area and provided in the same sector as the ID area is read or recorded;

wherein said magnetic disk is a hard disk using an MR head, a write ID area for writing data, and a read ID area for reading data, said write ID area being provided ahead of the read ID area; and wherein said error correcting means, when data is written, finishes the error correction of said write ID area before data is written in the data area corresponding to said write ID area and provided in the same sector as the write ID area.

5. A magnetic disk recording and reproducing apparatus according to claim 4, further comprising:

a FIFO (first-in first-out) unit for receiving read data when said data is read;

wherein said error correcting means performs control such that data is transferred from said FIFO unit to a data buffer when the error correction of said read ID area is successful, and the data is not transferred from said FIFO unit to said data buffer if the error correction of said read ID area fails.

6. A magnetic disk recording and reproducing apparatus according to claim 5, wherein said error correcting means, when data is read, finishes the error correction of said read ID area while the synchronization pattern of said data area is being read and before the data of the data area corresponding to said read ID area and provided in the same sector as the read ID area is read.

7. A magnetic recording and reproducing apparatus comprising:

a dual head including a recording head for recording identification information and data in a plurality of memory areas on a magnetic disk, each of the memory areas having an identification area for storing identification information identifying the memory area, the identification area including a recording identification area for storing recording identification information used in recording and a reproduction identification area for storing reproduction identification information used in reproduction, and a reproducing head, provided separately from said recording head, for reproducing said identification information and said data from said memory area; and reading means for reading said recording identification information from said recording identification area when recording information, and reading said reproduction identification information from said reproduction identification area when reproducing information;

wherein said reproduction identification area is provided between said recording identification area and said data area in the same memory area.

8. A magnetic recording and reproducing apparatus according to claim 7, wherein said recording identification information includes an error correcting code; and wherein said magnetic recording and reproducing apparatus further comprises:

error correcting means for correcting errors in said recording identification information using said error correcting code.

9. A magnetic recording and reproducing apparatus according to claim 7, wherein said reproduction identification information includes an error correcting code; and wherein said magnetic recording and reproducing apparatus further comprises:

identification information memory means for storing identification information supplied from outside said magnetic recording and reproducing apparatus, said identification information specifying a data area where data is to be reproduced;

data memory means for processing on a first-in first-out basis reproduced data from the magnetic disk;

a data buffer for storing data output from said data memory means;

error correcting means for correcting errors in said reproduction identification information read from the magnetic disk using said error correcting code, and if error correction is impossible, outputting a "not correctable" signal; and data transfer control means for transferring data stored in said data memory means to said data buffer when said error-corrected reproduction identification information accords with said identification information supplied from outside, and not transferring said data to said data buffer when said error-corrected reproduction identification information does not accord with said identification information supplied from outside or when a "not correctable" signal is received from said error correcting means.

10. A magnetic recording and reproducing apparatus according to claims 9, wherein said reproduction identification information and data are respectively recorded in said reproduction identification area and said data area without having intervene between said reproduction identification area and said data area at least any one of a data area indicating a border between the reproduction identification area and the data area, a gap area between the reproduction identification area and the data area, a synchronization pattern area, and an area indicating a leading end of the data area.

11. A magnetic recording and reproducing apparatus according to claim 7, wherein said identification area for reproduction has an error correcting code, and said magnetic recording and reproducing apparatus comprises:

identification information memory means for storing identification information supplied from outside to specify a data area where data is to be reproduced;

a data buffer for storing reproduced data from the magnetic disk;

error correcting means for correcting errors in said identification information for reproduction, read from the magnetic disk, by said error correcting code, and outputting a "not correctable" signal when error correction is impossible; and data invalidating means for invalidating the data transferred to said data buffer when said error-corrected identification information for reproduction does not accord with said identification information for reproduction supplied from outside or when a "not correctable" signal is received.

12. A magnetic recording and reproducing apparatus according to claim 7, further comprising:

decoding means for decoding said recording identification information while the recording head is passing the reproduction identification area, the decoding means finishing the decoding before data starts to be written into the data area in the same memory area as said recording identification area.

13. A magnetic recording and reproducing apparatus according to claim 12, wherein said decoding is Viterbi decoding.

14. A magnetic recording and reproducing apparatus according to claim 7, wherein formatting means is provided by which when formatting, identification information for recording is written during the first rotation, then the written identification information for recording is reproduced during the second rotation, and if said identification information has been written correctly, during the same rotation, identification information for reproduction is written just behind said identification information for recording.

15. A magnetic recording and reproducing apparatus comprising:

a dual head including
a recording head for recording identification information and data in a plurality of memory areas on a magnetic disk, each of the memory areas having an identification area for storing identification information identifying the memory area, the identification area including a recording identification area for storing recording identification information used in recording and a reproduction identification area for storing reproduction identification information used in reproduction, and a reproducing head, provided separately from said recording head, for reproducing said identification information and said data from said memory area;

control means, provided with a control circuit, for controlling said dual head; and read instruction outputting means for outputting an instruction that said identification information should be read from said recording identification area used in recording, and outputting an instruction that said identification information should be read from said reproduction identification area used in reproduction;

wherein in the same memory area, said reproduction identification area is provided between said recording identification area and said data area.

16. A magnetic recording and reproducing apparatus according to claim 15, wherein said recording identification information includes an error correcting code; and wherein said magnetic recording and reproducing apparatus further comprises:

error correcting means for correcting errors in said recording identification information using said error correcting code.

17. A magnetic recording and reproducing apparatus according to claim 16, wherein said identification area for reproduction has an error correcting code, said magnetic recording and reproducing apparatus further comprising:

identification information memory means for storing identification information supplied from outside and specifying a data area where data is to be reproduced;

a data buffer for storing reproduced data from the magnetic disk;

error correcting means for error correction of said identification information for reproduction, read from the magnetic disk, by said error correcting code, and outputting a "not correctable" signal when the error correction is impossible; and data invalidating means for invalidating reproduced data already transferred to said data buffer used for storing reproduced data from the magnetic disk when said error-corrected identification information for reproduction does not accord with said identification information supplied from outside or when a "not correctable" signal is received.

18. A magnetic recording and reproducing apparatus according to claim 15, wherein said reproduction identification information includes an error correcting code; and wherein said magnetic recording and reproducing apparatus further comprises:

identification information memory means for storing identification information supplied from outside said magnetic recording and reproducing apparatus, said identification information specifying a data area where data is to be reproduced;

data memory means for processing on a first-in first-out basis reproduced data from the magnetic disk, and outputting said data to an external data buffer;

error correcting means for correcting errors in said reproduction identification information read from the magnetic disk using said error correcting code, and outputting a "not correctable" signal if error correction is impossible; and data transfer control means for transferring data stored in said data memory means to said data buffer when said error-corrected reproduction identification information accords with said identification information supplied from outside, and not transferring said data to said data buffer when said error-corrected reproduction identification information does not accord with said identification information supplied from outside or when a "not correctable" signal is received from the error correcting means.

19. A magnetic recording and reproducing apparatus according to claim 18, wherein said identification information for reproduction and data are recorded respectively in said identification area for reproduction and said data area without having intervene between said areas at least any one of a data area indicating a border between said identification area for reproduction and said area, a gap area between said identification area for reproduction and said data area, a synchronization pattern area, and an area indicating a leading end of the data area.

20. A magnetic recording and reproducing apparatus according to claim 15, further comprising:

decoding means for decoding the recording identification information while the recording head is passing the reproduction identification area, the decoding means finishing the decoding before data is written in the data area in the same memory area as said recording identification area.

21. A magnetic recording and reproducing apparatus according to claim 20, wherein decoding is Viterbi decoding.

22. A magnetic recording and reproducing apparatus according to claim 15, wherein formatting means is provided by which when formatting, identification information for recording is written during first rotation, then the written identification information for recording is reproduced during the second rotation, and if said identification information has been written correctly, during the same rotation, identification information for reproduction is written just behind said identification information for recording.

* * * * *